United States Patent
Li et al.

(10) Patent No.: US 11,234,136 B2
(45) Date of Patent: Jan. 25, 2022

(54) METHOD AND APPARATUS FOR WIDEBAND PRACH CONFIGURATION FOR NR UNLICENSED

(71) Applicant: Samsung Electronics Co., Ltd., Suwon-si (KR)

(72) Inventors: Yingzhe Li, Mountain View, CA (US); Hongbo Si, Plano, TX (US); Eun Sun Kim, Austin, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/946,361

(22) Filed: Jun. 18, 2020

(65) Prior Publication Data

US 2021/0014694 A1 Jan. 14, 2021

Related U.S. Application Data

(60) Provisional application No. 62/872,654, filed on Jul. 10, 2019, provisional application No. 62/883,890, (Continued)

(51) Int. Cl.
*H04W 16/14* (2009.01)
*H04W 80/08* (2009.01)
(Continued)

(52) U.S. Cl.
CPC .......... *H04W 16/14* (2013.01); *H04L 5/0094* (2013.01); *H04L 27/2607* (2013.01); *H04W 74/0808* (2013.01); *H04W 80/08* (2013.01)

(58) Field of Classification Search
None
See application file for complete search history.

(56) References Cited

U.S. PATENT DOCUMENTS

| 2019/0074922 A1* | 3/2019 | Lee .................. H04W 74/0833 |
| 2019/0246425 A1* | 8/2019 | Zhang ............... H04W 74/0808 |
| 2020/0351955 A1* | 11/2020 | Jeon ...................... H04W 76/27 |

OTHER PUBLICATIONS

International Search Report and Written Opinion of the International Searching Authority in connection with International Application No. PCT/KR2020/009072, dated Oct. 13, 2020, 11 pages.
(Continued)

*Primary Examiner* — Diane L Lo

(57) ABSTRACT

A method of a user equipment (UE) in a wireless communication system supporting a shared spectrum channel access is provided. The method comprises: receiving, from a base station (BS), a set of higher layer parameters including a subcarrier spacing of a physical random access channel (PRACH) preamble, a logical root index ($i_{log}$) for the PRACH preamble, and an index (zeroCorrelationZoneConfg); determining a sequence length ($L_{RA}$) for the PRACH preamble based on the subcarrier spacing of the PRACH preamble; determining a physical root index ($i_{phy}$) for the PRACH preamble based on the logical root index ($i_{log}$); determining a cyclic shift ($N_{CS}$) for the PRACH preamble based on the index (zeroCorrelationZoneConfg); generating the PRACH preamble based on the determined sequence length $L_{RA}$, the determined physical root index $i_{phy}$, and the determined cyclic shift $N_{CS}$; and transmitting, to the base station (BS) over the shared spectrum channel, the PRACH preamble.

17 Claims, 22 Drawing Sheets

Related U.S. Application Data filed on Aug. 7, 2019, provisional application No. 62/891,695, filed on Aug. 26, 2019, provisional application No. 62/897,885, filed on Sep. 9, 2019, provisional application No. 62/907,202, filed on Sep. 27, 2019, provisional application No. 62/909,500, filed on Oct. 2, 2019, provisional application No. 62/913,483, filed on Oct. 10, 2019, provisional application No. 62/923,168, filed on Oct. 18, 2019, provisional application No. 62/923,448, filed on Oct. 18, 2019, provisional application No. 62/935,419, filed on Nov. 14, 2019.

(51) Int. Cl.
*H04L 27/26* (2006.01)
*H04W 74/08* (2009.01)
*H04L 5/00* (2006.01)

(56) References Cited

OTHER PUBLICATIONS

Huawei, et al., "Initial access signal and channels in NR unlicensed band," R1-1906041, 3GPP TSG RAN WG1 Meeting #97, Reno, USA, May 13-17, 2019, 13 pages.
LG Electronics, "Physical layer design of initial access signals and channels for NR-U," R1-1904619, 3GPP TSG RAN WG1 #96bis, Xi'an, China, Apr. 8-12, 2019, 16 pages.
Nokia, et al., "Initial Access Signals and Channels for NR-U," R1-1900347, 3GPP TSG RAN WG1 Meeting #AH-1901, Taipei, Taiwan, Jan. 21-25, 2019, 22 pages.
Qualcomm Incorporated, "Feature lead summary on initial access signals and channels for NR-U," R1-1907883, 3GPP TSG RAN WG1 Meeting #97, Reno, USA, May 13-17, 2019, 44 pages.
"LTE; Evolved Universal Terrestrial Radio Access (E-UTRA); Physical channels and modulation (3GPP TS 36.211 version 13.2.0 Release 13)", ETSI TS 136 211, V.13.2.0, Aug. 2016, 170 pages.
"LTE; Evolved Universal Terrestrial Radio Access (E-UTRA); Multiplexing and channel coding (3GPP TS 36.212 version 13.2.0 Release 13)", ETSI TS 136 212, V.13.2.0, Jan. 2016, 142 pages.
"LTE; Evolved Universal Terrestrial Radio Access (E-UTRA); Physical layer procedures (3GPP TS 36.213 version 13.2.0 Release 13)", ETSI TS 136 213, V.13.2.0, Aug. 2016, 383 pages.
"LTE; Evolved Universal Terrestrial Radio Access (E-UTRA); Medium Access Control (MAC) protocol specification (3GPP TS 36.321 version 13.2.0 Release 13)", ETSI TS 136 321, V.13.2.0, Aug. 2016, 93 pages.
"LTE; Evolved Universal Terrestrial Radio Access (E-UTRA); Radio Resource Control (RRC); Protocol specification (3GPP TS 36.331 version 13.2.0 Release 13)", ETSI TS 136 331, V.13.2.0, Aug. 2016, 834 pages.
"3rd Generation Partnership Project; Technical Specification Group Radio Access Network; NR; Physical channels and modulation (Release 15)", 3GPP TS 38.211 V15.4.0, Dec. 2018, 96 pages.
"3rd Generation Partnership Project; Technical Specification Group Radio Access Network; NR; Multiplexing and channel coding (Release 15)", 3GPP TS 38.212 V15.4.0, Dec. 2018, 100 pages.
"3rd Generation Partnership Project; Technical Specification Group Radio Access Network; NR; Physical layer procedures for control (Release 15)" 3GPP TS 38.213 V15.4.0, Dec. 2018, 104 pages.
"3rd Generation Partnership Project; Technical Specification Group Radio Access Network; NR; Physical layer procedures for data (Release 15)", 3GPP TS 38.214 V15.4.0, Dec. 2018, 102 pages.
"3rd Generation Partnership Project; Technical Specification Group Radio Access Network; NR; Radio Resource Control (RRC) protocol specification (Release 15)", 3GPP TS 38.331 V15.4.0, Dec. 2018, 474 pages.
ETSI EN 301 893 V2.1.1, "5 GHz RLAN; Harmonised Standard covering the essential requirements of article 3.2 of Directive 2014/53/EU", 2017, 135 pages.
ETSI EN 302 567 V2.1.1, "Multiple-Gigabit/s radio equipment operating in the 60 GHz band; Harmonised Standard covering the essential requirements of article 3.2 of Directive 2014/53/EU", 2017, 40 pages.
"3rd Generation Partnership Project; Technical Specification Group Radio Access Network; Study on Licensed-Assisted Access to Unlicensed Spectrum; (Release 13)", 3GPP TR 36.889 V13.0.0, Jun. 2015, 87 pages.
IEEE Std 802.11—2016, "Part 11: Wireless LAN Medium Access Control (MAC) and Physical Layer (PHY) Specifications", 2016, 3534 pages.

\* cited by examiner

Bitmap = (1, 0, 0, 1)

RACH slot with 6 configured ROs of format A1

RACH slot with 3 configured ROs of format A2

RACH slot with 2 configured ROs of format A3

RO configured for LBT

RO for actual PRACH transmission

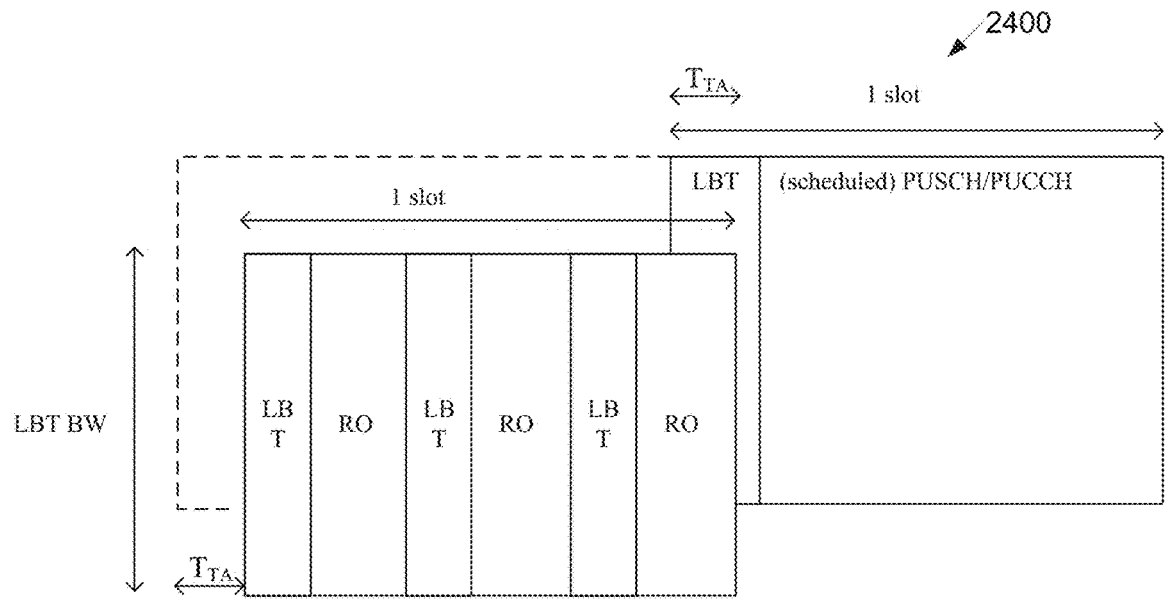
FIG. 24
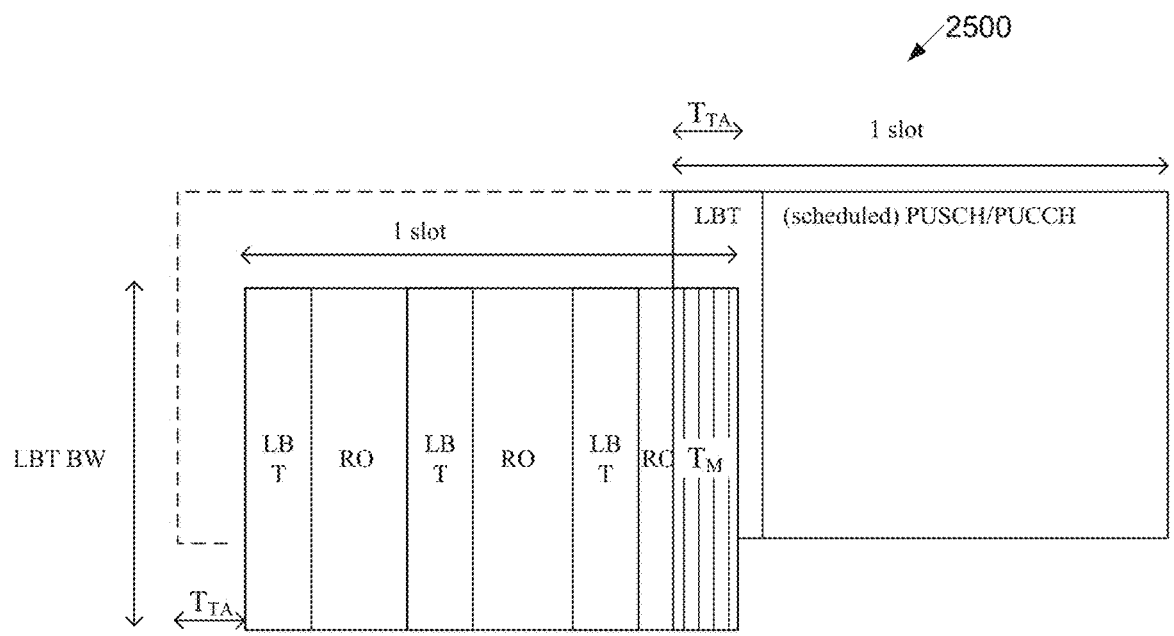
FIG. 25
 Muting Time

METHOD AND APPARATUS FOR WIDEBAND PRACH CONFIGURATION FOR NR UNLICENSED

CROSS-REFERENCE TO RELATED APPLICATIONS AND CLAIM OF PRIORITY

The present application claims priority to:
U.S. Provisional Patent Application No. 62/872,654, filed on Jul. 10, 2019;
U.S. Provisional Patent Application No. 62/883,890, filed on Aug. 7, 2019;
U.S. Provisional Patent Application No. 62/891,695, filed on Aug. 26, 2019;
U.S. Provisional Patent Application No. 62/897,885, filed on Sep. 9, 2019;
U.S. Provisional Patent Application No. 62/907,202, filed on Sep. 27, 2019;
U.S. Provisional Patent Application No. 62/909,500, filed on Oct. 2, 2019;
U.S. Provisional Patent Application No. 62/913,483, filed on Oct. 10, 2019;
U.S. Provisional Patent Application No. 62/923,168, filed on Oct. 18, 2019;
U.S. Provisional Patent Application No. 62/923,448, filed on Oct. 18, 2019; and
U.S. Provisional Patent Application No. 62/935,419, filed on Nov. 14, 2019.
The contents of the above-identified patent documents are incorporated herein by reference.

TECHNICAL FIELD

The present application relates generally to wireless communication systems, more specifically, the present disclosure relates to wideband PRACH configuration in NR unlicensed.

BACKGROUND

A communication system includes a downlink (DL) that conveys signals from transmission points such as base stations (BSs) or NodeBs to user equipments (UEs) and an uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB (eNB), referring to a NodeB in long-term evolution (LTE) communication system, and a gNodeB (gNB), referring to a NodeB in new radio (NR) communication system, may also be referred to as an access point or other equivalent terminology.

SUMMARY

The present disclosure relates to a pre-5G or 5G communication system to be provided for wideband PRACH configuration in NR unlicensed.

In one embodiment, a user equipment (UE) in a wireless communication system supporting a shared spectrum channel access is provided. The UE comprises a transceiver configured to receive, from a base station (BS), a set of higher layer parameters including a subcarrier spacing of a physical random access channel (PRACH) preamble, a logical root index ($i_{log}$) for the PRACH preamble, and an index (zeroCorrelationZoneConfg). The UE further comprises a processor operably connected to the transceiver, the processer configured to: determine a sequence length ($L_{RA}$) for the PRACH preamble based on the subcarrier spacing of the PRACH preamble; determine a physical root index ($i_{phy}$) for the PRACH preamble based on the logical root index ($i_{log}$); determine a cyclic shift ($N_{CS}$) for the PRACH preamble based on the index (zeroCorrelationZoneConfg); and generate the PRACH preamble based on the determined sequence length $L_{RA}$, the determined physical root index $i_{phy}$, and the determined cyclic shift $N_{CS}$. The transceiver of the UE is further configured to transmit, to the base station (BS) over the shared spectrum channel, the PRACH preamble.

In another embodiment, a base station (BS) in a wireless communication system supporting a shared spectrum channel access is provided. The BS comprises a processor identify a set of higher layer parameters including a subcarrier spacing of a physical random access channel (PRACH) preamble, a logical root index ($i_{log}$) for the PRACH preamble, and an index (zeroCorrelationZoneConfg). The BS further comprises a transceiver operably connected to the processor, the transceiver configured to transmit, to a user equipment (UE), the set of higher layer parameters and receive, from the UE over the shared spectrum channel, a PRACH preamble based on a sequence length $L_{RA}$, a physical root index $i_{phy}$, and a cyclic shift $N_{CS}$. The sequence length ($L_{RA}$) is determined for the PRACH preamble based on the subcarrier spacing of the PRACH preamble, the physical root index ($i_{phy}$) is determined for the PRACH preamble based on the logical root index ($i_{log}$), and the cyclic shift ($N_{CS}$) is determined for the PRACH preamble based on the index (zeroCorrelationZoneConfg).

In yet another embodiment, a method of a user equipment (UE) in a wireless communication system supporting a shared spectrum channel access is provided. The method comprises: receiving, from a base station (BS), a set of higher layer parameters including a subcarrier spacing of a physical random access channel (PRACH) preamble, a logical root index ($i_{log}$) for the PRACH preamble, and an index (zeroCorrelationZoneConfg); determining a sequence length ($L_{RA}$) for the PRACH preamble based on the subcarrier spacing of the PRACH preamble; determining a physical root index ($i_{phy}$) for the PRACH preamble based on the logical root index ($i_{log}$); determining a cyclic shift ($N_{CS}$) for the PRACH preamble based on the index (zeroCorrelationZoneConfg); generating the PRACH preamble based on the determined sequence length $L_{RA}$, the determined physical root index $i_{phy}$, and the determined cyclic shift $N_{CS}$; and transmitting, to the base station (BS) over the shared spectrum channel, the PRACH preamble.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 24 illustrates an example RACH preamble transmission interferes according to embodiments of the present disclosure;

FIG. 25 illustrates an example placing muting time (GAP) according to embodiments of the present disclosure;

DETAILED DESCRIPTION

FIG. 1 through FIG. 34, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v15.4.0, "NR; Physical channels and modulation;" 3GPP TS 38.212 v15.4.0, "NR; Multiplexing and Channel coding;" 3GPP TS 38.213 v15.4.0, "NR; Physical Layer Procedures for Control;" 3GPP TS 38.214 v15.4.0, "NR; Physical Layer Procedures for Data;" 3GPP TS 38.331 v15.4.0, "NR; Radio Resource Control (RRC) Protocol Specification;" ETSI EN 301 893 V2.1.1, "5 GHz RLAN; Harmonized Standard covering the essential requirements of article 3.2 of Directive 2014/53/EU", 2017; ETSI EN 302 567 V2.1.1, "Multiple-Gigabit/s radio equipment operating in the 60 GHz band; Harmonized Standard covering the essential requirements of article 3.2 of Directive 2014/53/EU," 2017; 3GPP TR 36.889 V13.0.0, "Study on Licensed-Assisted Access to Unlicensed Spectrum," 2015; and IEEE Std 802.11-2016, "Part 11: Wireless LAN Medium Access Control (MAC) and Physical Layer (PHY) Specifications," 2016.

Figure 1:
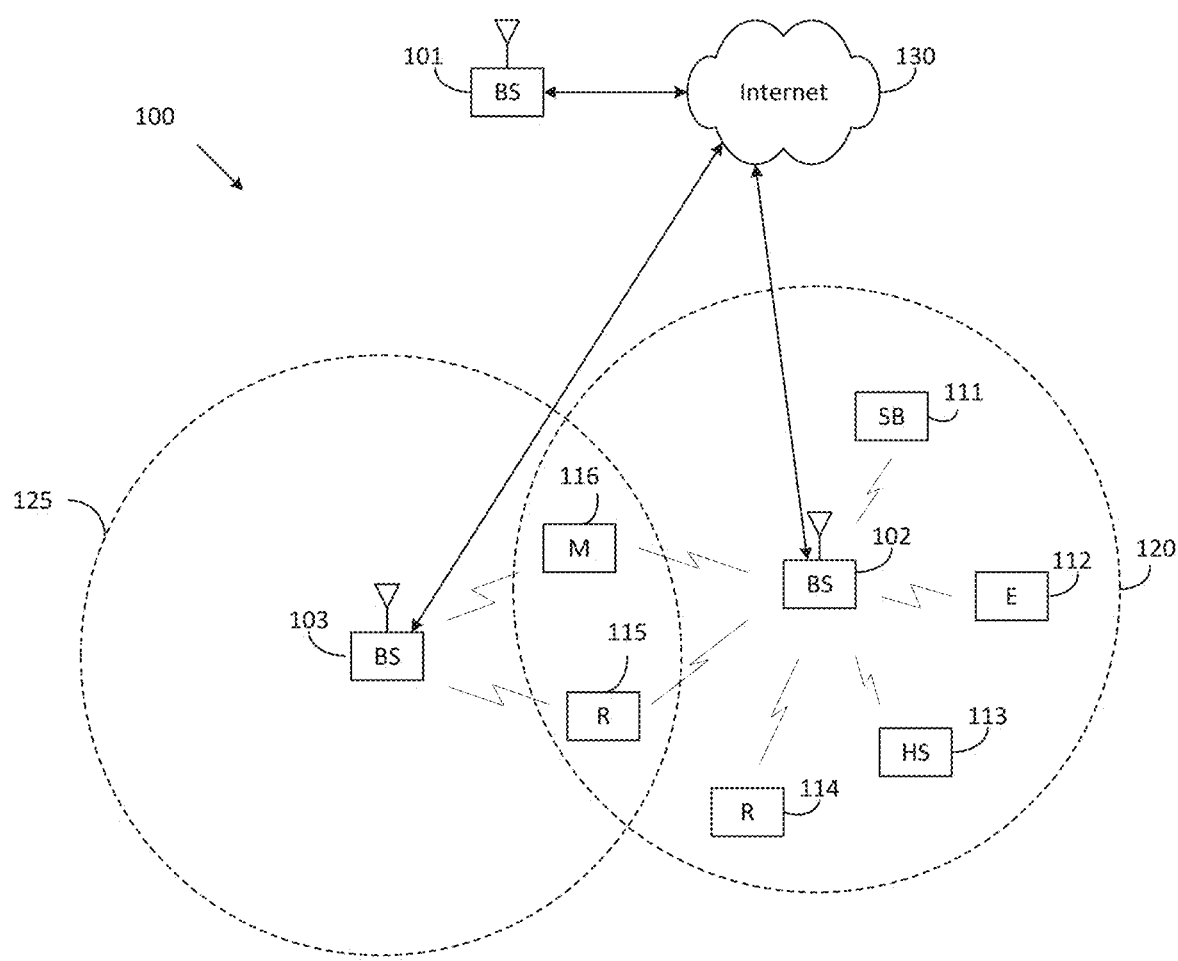
FIG. 1 illustrates an example wireless network according to embodiments of the present disclosure.
Figure 2:
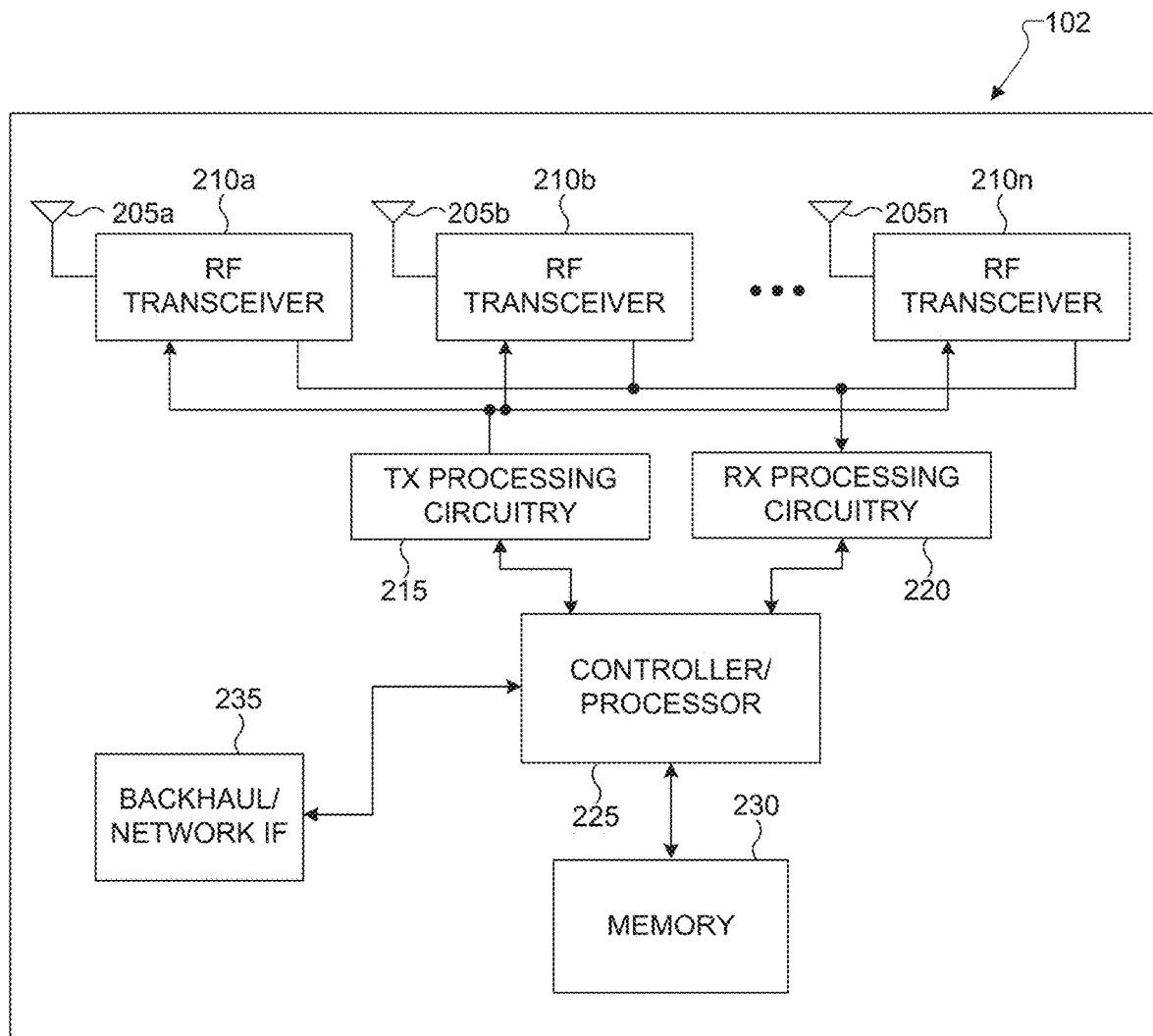
FIG. 2 illustrates an example gNB according to embodiments of the present disclosure.
Figure 3:
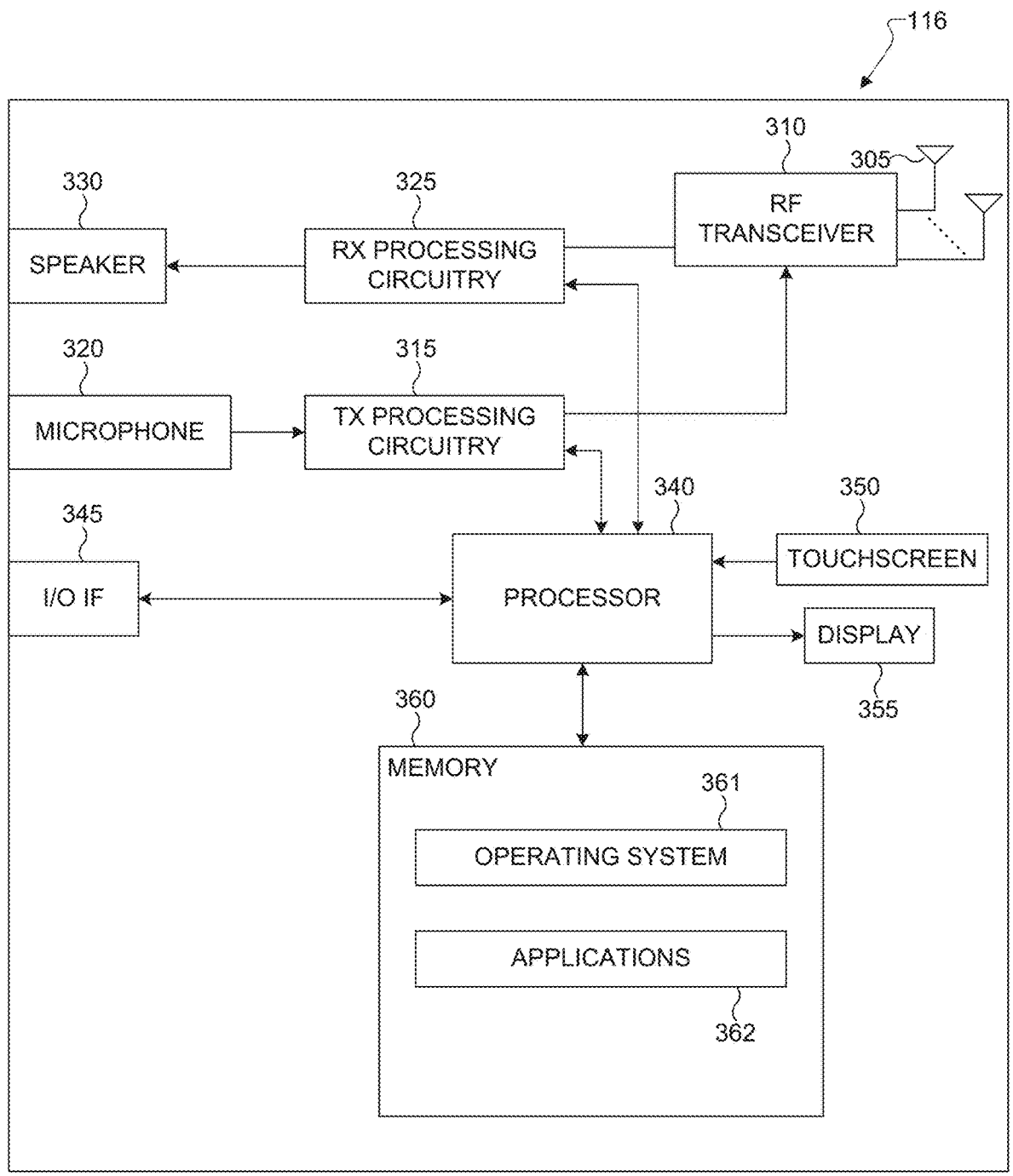
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for reception reliability for data and control information in an advanced wireless communication system. In certain embodiments, and one or more of the gNBs 101-103 includes circuitry, programing, or a combination thereof, for efficient channel occupancy time sharing in NR unlicensed.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of the gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of the UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

The present disclosure relates generally to wireless communication systems and, more specifically, to reducing power consumption for a user equipment (UE) communicating with a base station and to transmissions to and receptions from a UE of physical downlink control channels (PDCCHs) for operation with dual connectivity. A communication system includes a downlink (DL) that refers to transmissions from a base station or one or more transmission points to UEs and an uplink (UL) that refers to transmissions from UEs to a base station or to one or more reception points.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system." The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can include 14 symbols, have duration of 1 millisecond or 0.5 milliseconds, and an RB can have a BW of 180 kHz or 360 kHz and include 12 SCs with inter-SC spacing of 15 kHz or 30 kHz, respectively.

DL signals include data signals conveying information content, control signals conveying DL control information (DCI) formats, and reference signals (RS) that are also known as pilot signals. A gNB can transmit data information (e.g., transport blocks) or DCI formats through respective physical DL shared channels (PDSCHs) or physical DL control channels (PDCCHs). A gNB can transmit one or more of multiple types of RS including channel state information RS (CSI-RS) and demodulation RS (DMRS). A CSI-RS is intended for UEs to measure channel state information (CSI) or to perform other measurements such as ones related to mobility support. A DMRS can be transmitted only in the BW of a respective PDCCH or PDSCH and a UE can use the DMRS to demodulate data or control information.

UL signals also include data signals conveying information content, control signals conveying UL control information (UCI), and RS. A UE transmits data information (e.g., transport blocks) or UCI through a respective physical UL shared channel (PUSCH) or a physical UL control channel (PUCCH). When a UE simultaneously transmits data information and UCI, the UE can multiplex both in a PUSCH or transmit them separately in respective PUSCH and PUCCH. UCI includes hybrid automatic repeat request acknowledgement (HARQ-ACK) information, indicating correct or incorrect detection of data transport blocks (TBs) by a UE, scheduling request (SR) indicating whether a UE has data in the UE's buffer, and CSI reports enabling a gNB to select appropriate parameters to perform link adaptation for PDSCH or PDCCH transmissions to a UE.

A CSI report from a UE can include a channel quality indicator (CQI) informing a gNB of a modulation and coding scheme (MCS) for the UE to detect a data TB with a predetermined block error rate (BLER), such as a 10% BLER, of a precoding matrix indicator (PMI) informing a gNB how to precode signaling to a UE, and of a rank indicator (RI) indicating a transmission rank for a PDSCH. UL RS includes DMRS and sounding RS (SRS). DMRS is transmitted only in a BW of a respective PUSCH or PUCCH transmission. A gNB can use a DMRS to demodulate information in a respective PUSCH or PUCCH. SRS is transmitted by a UE to provide a gNB with UL CSI and, for a TDD or a flexible duplex system, to also provide a PMI for DL transmissions. An UL DMRS or SRS transmission can be based, for example, on a transmission of a Zadoff-Chu (ZC) sequence or, in general, of a CAZAC sequence.

DL transmissions and UL transmissions can be based on an orthogonal frequency division multiplexing (OFDM) waveform including a variant using DFT precoding that is known as DFT-spread-OFDM.

Figure 4:
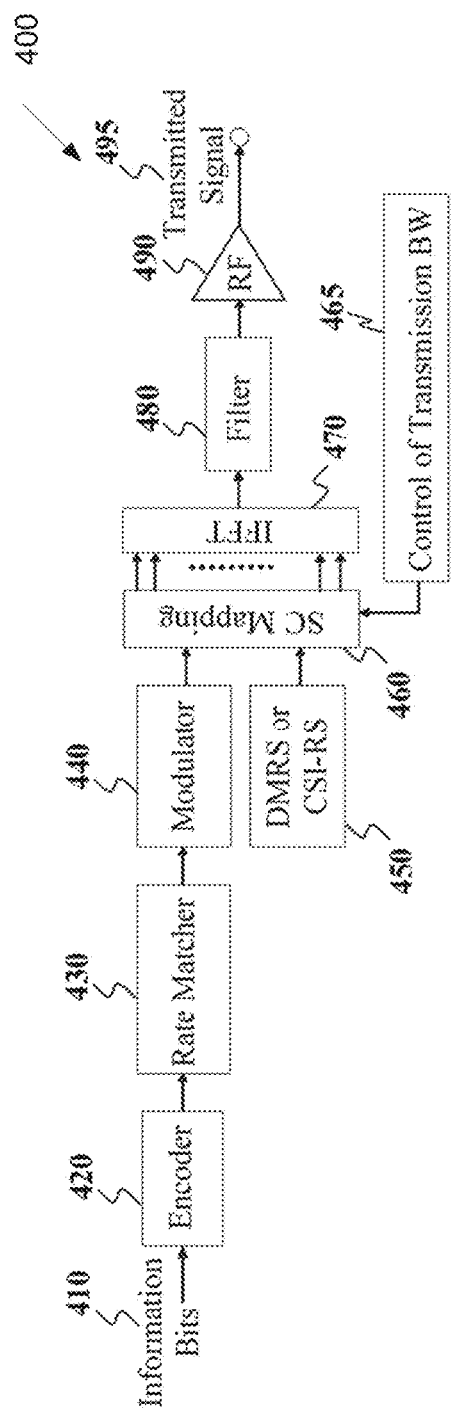
FIG. 4 illustrates an example transmitter structure using OFDM according to embodiments of the present disclosure.

FIG. 4 illustrates an example transmitter structure 400 using OFDM according to embodiments of the present disclosure. An embodiment of the transmitter structure 400 shown in FIG. 4 is for illustration only. One or more of the components illustrated in FIG. 4 can be implemented in specialized circuitry configured to perform the noted functions or one or more of the components can be implemented by one or more processors executing instructions to perform the noted functions. Other embodiments are used without departing from the scope of the present disclosure.

Information bits, such as DCI bits or data bits 410, are encoded by encoder 420, rate matched to assigned time/frequency resources by rate matcher 430 and modulated by modulator 440. Subsequently, modulated encoded symbols and DMRS or CSI-RS 450 are mapped to SCs 460 by SC mapping unit 465, an inverse fast Fourier transform (IFFT) is performed by filter 470, a cyclic prefix (CP) is added by CP insertion unit 480, and a resulting signal is filtered by filter 490 and transmitted by a radio frequency (RF) unit 495.

Figure 5:
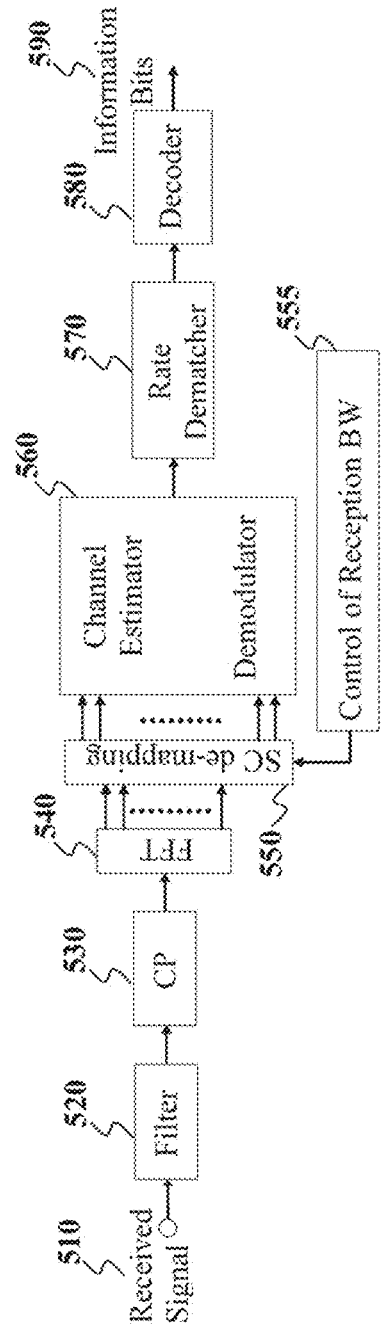
FIG. 5 illustrates an example receiver structure using OFDM according to embodiments of the present disclosure.

FIG. 5 illustrates an example receiver structure 500 using OFDM according to embodiments of the present disclosure. An embodiment of the receiver structure 500 shown in FIG. 5 is for illustration only. One or more of the components illustrated in FIG. 8 can be implemented in specialized circuitry configured to perform the noted functions or one or more of the components can be implemented by one or more processors executing instructions to perform the noted functions. Other embodiments are used without departing from the scope of the present disclosure.

A received signal 510 is filtered by filter 520, a CP removal unit removes a CP 530, a filter 540 applies a fast Fourier transform (FFT), SCs de-mapping unit 550 de-maps SCs selected by BW selector unit 555, received symbols are demodulated by a channel estimator and a demodulator unit 560, a rate de-matcher 570 restores a rate matching, and a decoder 580 decodes the resulting bits to provide information bits 590.

A UE typically monitors multiple candidate locations for respective potential PDCCH transmissions to decode multiple candidate DCI formats in a slot. Monitoring a PDCCH candidates means receiving and decoding the PDCCH candidate according to DCI formats the UE is configured to receive. A DCI format includes cyclic redundancy check (CRC) bits in order for the UE to confirm a correct detection of the DCI format. A DCI format type is identified by a radio network temporary identifier (RNTI) that scrambles the CRC bits. For a DCI format scheduling a PDSCH or a PUSCH to a single UE, the RNTI can be a cell RNTI (C-RNTI) and serves as a UE identifier.

For a DCI format scheduling a PDSCH conveying system information (SI), the RNTI can be an SI-RNTI. For a DCI format scheduling a PDSCH providing a random-access response (RAR), the RNTI can be an RA-RNTI. For a DCI format scheduling a PDSCH or a PUSCH to a single UE prior to a UE establishing a radio resource control (RRC) connection with a serving gNB, the RNTI can be a temporary C-RNTI (TC-RNTI). For a DCI format providing TPC commands to a group of UEs, the RNTI can be a TPC-PUSCH-RNTI or a TPC-PUCCH-RNTI. Each RNTI type can be configured to a UE through higher layer signaling such as RRC signaling. A DCI format scheduling PDSCH transmission to a UE is also referred to as DL DCI format or DL assignment while a DCI format scheduling PUSCH transmission from a UE is also referred to as UL DCI format or UL grant.

A PDCCH transmission can be within a set of physical RBs (PRBs). A gNB can configure a UE one or more sets of PRBs, also referred to as control resource sets, for PDCCH receptions. A PDCCH transmission can be in control channel elements (CCEs) that are included in a control resource set. A UE determines CCEs for a PDCCH reception based on a search space such as a UE-specific search space (USS) for PDCCH candidates with DCI format having CRC scrambled by a RNTI, such as a C-RNTI, that is configured to the UE by UE-specific RRC signaling for scheduling PDSCH reception or PUSCH transmission, and a common search space (CSS) for PDCCH candidates with DCI formats having CRC scrambled by other RNTIs. A set of CCEs that can be used for PDCCH transmission to a UE define a PDCCH candidate location. A property of a control resource set is transmission configuration indication (TCI) state that provides quasi co-location information of the DMRS antenna port for PDCCH reception.

Figure 6:
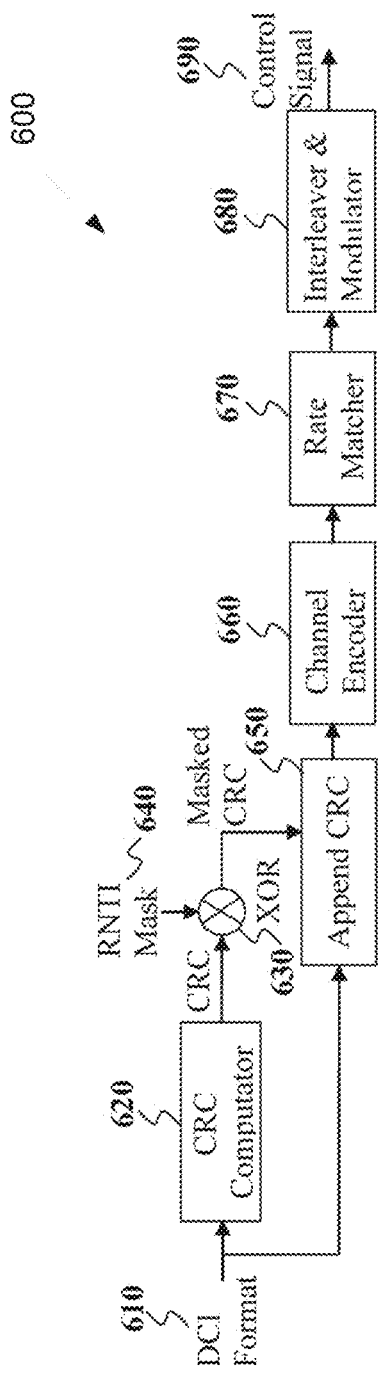
FIG. 6 illustrates an example encoding process for a DCI format according to embodiments of the present disclosure.

FIG. 6 illustrates an example encoding process 600 for a DCI format according to embodiments of the present disclosure. An embodiment of the encoding process 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions. Other embodiments are used without departing from the scope of the present disclosure.

A gNB separately encodes and transmits each DCI format in a respective PDCCH. A RNTI masks a CRC of the DCI format codeword in order to enable the UE to identify the DCI format. For example, the CRC and the RNTI can include, for example, 16 bits or 24 bits. The CRC of (non-coded) DCI format bits 610 is determined using a CRC computation unit 620, and the CRC is masked using an exclusive OR (XOR) operation unit 630 between CRC bits and RNTI bits 640. The XOR operation is defined as XOR (0, 0)=0, XOR (0, 1)=1, XOR (1, 0)=1, XOR (1, 1)=0. The masked CRC bits are appended to DCI format information bits using a CRC append unit 650. An encoder 660 performs channel coding (such as tail-biting convolutional coding or polar coding), followed by rate matching to allocated resources by rate matcher 670. Interleaving and modulation units 680 apply interleaving and modulation, such as QPSK, and the output control signal 690 is transmitted.

Figure 7:
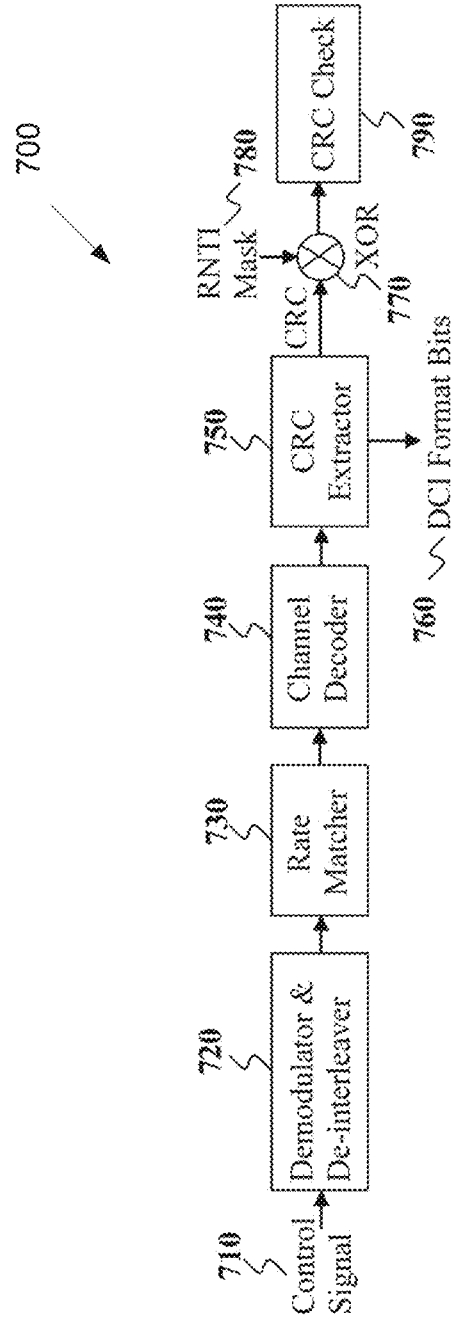
FIG. 7 illustrates an example decoding process for a DCI format for use with a UE according to embodiments of the present disclosure.

FIG. 7 illustrates an example decoding process 700 for a DCI format for use with a UE according to embodiments of the present disclosure. An embodiment of the decoding process 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions. Other embodiments are used without departing from the scope of the present disclosure.

A received control signal 710 is demodulated and de-interleaved by a demodulator and a de-interleaver 720. A rate matching applied at a gNB transmitter is restored by rate matcher 730, and resulting bits are decoded by decoder 740. After decoding, a CRC extractor 750 extracts CRC bits and provides DCI format information bits 760. The DCI format information bits are de-masked 770 by an XOR operation with an RNTI 780 (when applicable) and a CRC check is performed by unit 790. When the CRC check succeeds (checksum is zero), the DCI format information bits are considered to be valid. When the CRC check does not succeed, the DCI format information bits are considered to be invalid.

Figure 8:
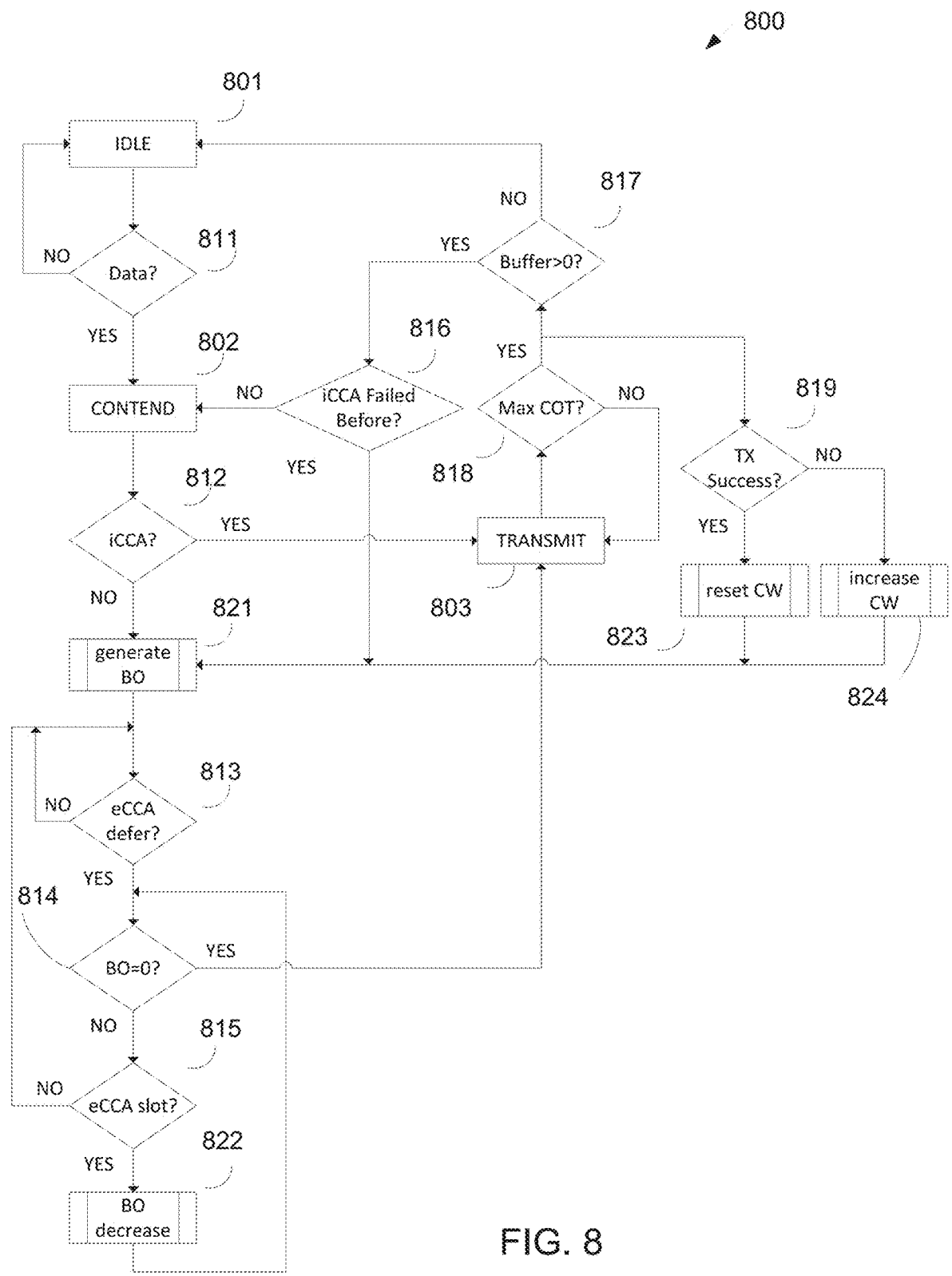
FIG. 8 illustrates an example channel access procedure according to embodiments of the present disclosure.

FIG. 8 illustrates an example channel access procedure 800 according to embodiments of the present disclosure. An embodiment of the channel access procedure 800 shown in FIG. 8 is for illustration only. FIG. 8 does not limit a scope of the present disclosure.

In 3GPP standard specification, the downlink transmission including physical downlink shared channel (PDSCH) on a LAA carrier follows the category 4 listen-before-talk (Cat4 LBT) procedures (a flow chart is illustrated in FIG. 8). An eNB first stays in IDLE state (801). Depending on whether there is data traffic (811) or not, the gNB transfers to CONTEND state (802) or stays in IDLE state (801), respectively. The eNB first performs initial CCA (iCCA), where the eNB senses the channel the slot durations of a defer duration (812). If the channel is sensed as clear in the iCCA, the gNB begins to transmit (803); otherwise, the gNB generates a backoff (BO) counter (821) and perform extended CCA (eCCA). The eNB can start transmission after BO counter achieves 0 (814) as in step 4, wherein the BO counter is adjusted by sensing the channel for additional slot duration(s) according to the steps below: 1) set the counter as a random number (821) uniformly distributed between 0 and contention window size (CWS), and go to step 4; 2) if the counter is greater than 0, and the eNB chooses to decrement the counter, decrease the counter by 1 (822); 3) sense the channel for an additional slot duration, and if the additional slot duration is idle, go to step 4); else, go to step 5); 4) if the counter is 0 (814), stop; else, go to step 2). 5) sense the channel until either a busy slot is detected within an additional defer duration or all the slots of the additional defer duration are detected to be idle (815); 6) if the channel is sensed to be idle during all the slot durations of the additional defer duration, go to step 4); else, go to step 5).

The eNB can keep transmitting until the maximum channel occupancy is achieved (818). After the transmission, if the transmission is successful, the contention window size is reset (823); otherwise, the contention window size is increased (824). If the eNB still have data traffic after transmission (317), the eNB keeps contending the channel (802); otherwise, the eNB transfers to IDLE (801). If the eNB has not failed any iCCA before (816), the eNB can perform iCCA (812); otherwise, the gNB may generate a BO counter (821) and perform eCCA (813).

In LTE-LAA standard specification, for transmission including physical downlink shared channel (PDSCH), or physical downlink control channel (PDCCH), or enhanced physical downlink control channel (EPDCCH), the channel access mechanism is based on LBE, which is also referred to as category-4 (CAT-4) LBT. Specifically, an LTE-LAA eNB can transmit after sensing the channel to be idle during the slot durations of a defer duration; and after the backoff counter (BO) is zero in step 4). An example of this channel access procedure is illustrated in FIG. 8 (e.g., it is also referred to as Cat4 LBT for this type of channel access procedure).

The backoff counter is adjusted by sensing the channel for additional slot duration(s) according to the steps below: (1) set the counter as a random number uniformly distributed between 0 and contention window (CW) value, and go to step 4; (2) if the counter is greater than 0, and the eNB chooses to decrement the counter, decrease the counter by 1; (3) sense the channel for an additional slot duration, and if the additional slot duration is idle, go to step 4; else, go to step 5; (4) if the counter is 0, stop; else, go to step 2; (5) sense the channel until either a busy slot is detected within an additional defer duration or all the slots of the additional defer duration are detected to be idle; and (6) if the channel is sensed to be idle during all the slot durations of the additional defer duration, go to step 4; else, go to step 5.

In addition, for LTE-LAA, a DL transmission burst containing the discovery reference signal (DRS) without PDSCH can be transmitted after sensing the channel idle for a fixed observation interval of at least 25 μs and if the duration of the transmission is less than 1 ms. Such an LBT operation of fixed sensing interval is also referred to as Cat2 LBT.

In NR standard specification, each synchronization and PBCH signal block (SS/PBCH block) compromises of one symbol for PSS, two symbols for PBCH, one symbol for SSS and PBCH, where the four symbols are mapped consecutively, and time division multiplexed.

For initial cell selection for NR cell, a UE assumes the default SS burst set periodicity as 20 ms, and for detecting non-standalone NR cell, a network provides one SS burst set periodicity information per frequency carrier to the UE and information to derive measurement timing/duration if possible. Other than the MIB, the remaining minimum system information (RMSI) is carried by physical downlink shared channel (PDSCH) with scheduling info carried by the corresponding physical downlink control channel (PDCCH). Similar structure applies to other system information (OSI) and paging message. The control resource set (CORESET) for receiving common control channels, such as RMSI, is configured in content of PBCH.

In NR-U, the transmission of SS/PBCH blocks may also be subject to the sensing result of LBT, such that the UE cannot always expect to receive the SS/PBCH blocks periodically. To address the LBT uncertainty of SS/PBCH block transmissions in NR-U, a discovery reference signal and channel, which can be referred to as DRS for the rest of the present disclosure, can be supported for NR-U. The DRS can contain SS/PBCH block(s), and configurable CORESET(s) and PDSCH(s) of RMSI, OSI, or paging, as well as configurable channel state indicator reference signal (CSI-RS).

In addition, for transmission of SS/PBCH blocks in NR-U DRS, a DRS transmission timing configuration (short for DTTC) method can be considered for NR-U, wherein the configuration contains a window periodicity, a window duration, and a window offset. The DRS can be subject to a single-shot LBT of fixed duration (e.g., 25 μs for FR1 NR-U).

In NR standard specification, after detecting the SS/PBCH block, a UE can obtain the configuration of time and frequency domain physical random access channel (PRACH) resources, the PRACH format and parameters for determining the PRACH preamble sequence, through the remaining system information (RMSI) or equivalently the system information block (SIB1). In addition, a UE can be provided through higher layer (e.g., via RRC) a number N of SS/PBCH blocks associated with one valid RACH occasion (RO), and the UE can derive associated RO(s) for PRACH transmission based on such association as well as the time/frequency resource configuration for PRACH.

Given the requirements of LBT, an NR-U UE is not guaranteed to have channel access to transmit PRACH at the higher-layer (e.g., RRC) configured RACH occasion, thereby potentially increasing the overall random-access delay and reducing the PRACH resource utilization. To decrease the overall random-access delay, NR-U PRACH can be assigned a higher priority LBT (e.g., single-shot LBT) subject to regulation allowance, or configure additional RACH occasions besides those configured through PRACH configuration table (as shown in NR standard specification).

In addition to the LBT requirement, ETSI BRAN regulation also requires the occupied channel bandwidth (OCB)

of the unlicensed signal to occupy at least 80% of the nominal channel bandwidth. During a COT, the unlicensed equipment may temporarily operate with an OCB of less than 80% of the nominal channel bandwidth with a minimum of 2 MHz.

NR standard specification PRACH short preamble formats have a PRACH sequence length of 139 and a subcarrier spacing of 15 kHz or 30 kHz for FR1 NR, which is less than 80% of the 20 MHz nominal channel bandwidth in 5 GHz unlicensed band. In order to meet the OCB regulation, the frequency resource mapping for FR1 NR-U PRACH can be extended from NR standard specification PRACH to support a wideband NR-U PRACH through one of the following examples.

In one example, a single long PRACH sequence can be introduced to FR1 NR-U such that the long PRACH sequence can be longer than the legacy Rel-15 PRACH sequence length of 139. For instance, the long PRACH sequence can span at least 80% of the nominal unlicensed channel bandwidth. The length of the single long PRACH sequence can depend on the subcarrier spacing (SCS) of the PRACH.

In one example, the NR standard specification short PRACH preamble sequence can be repeated in frequency domain, such that these repeated PRACH sequences can occupy at least 80% of the 20 MHz nominal unlicensed channel bandwidth. The repeated PRACH preamble sequences in frequency domain can have different frequency offsets and/or cyclic shift to reduce the peak to average power ratio (PAPR). An NR-U UE maybe assigned with the repeated PRACH sequences within a nominal channel bandwidth for PRACH transmissions.

The aforementioned embodiments and/or example of the wideband NR-U PRACH transmission would require enhancements from NR standard specification. This disclosure is focused on enhancements from NR standard specification to support wideband PRACH for FR1 NR-U, which includes configuration of single wideband PRACH sequence for NR-U and configuration of frequency repeated NR standard specification PRACH for NR-U.

This disclosure includes several embodiments, principles, approaches and examples that can be used in conjunction or in combination with one another, or can operate as stand-alone. The embodiments/principles/approaches/examples in this disclosure can be applied to FBE-based NR-U, LBE-based NR-U, or both FBE-based and LBE-based NR-U.

In the present disclosure, FR1 NR-U refers to NR-U that operates in the unlicensed/shared bands in FR1, such as the 5 GHz unlicensed bands or the 6 GHz unlicensed/shared bands; and FR2 GHz NR-U refers to NR-U that operators in the unlicensed/shared bands in FR2, such as the 60 GHz unlicensed bands.

In one embodiment, configuration for a single long wideband PRACH is provided.

In such embodiment, methods and approach are provided to configure for a single long wideband PRACH sequence that occupies at least 80% of the nominal channel bandwidth of unlicensed spectrum. In such embodiment, methods and approach are provided to configure for a single long wideband PRACH sequence.

In one example, the length of the single long PRACH sequence $L_{RA}$ can be chosen as the largest prime number such that $12*(M-1) < L_{RA} < 12*M$, wherein M is the number of RBs containing the single long PRACH sequence with $M = 2^\alpha \times 3^\beta \times 5^\gamma$.

In one example, the singe long wideband PRACH sequence can be Zadoff-Chu (ZC)-based sequence.

In one example, the length of the single long wideband PRACH sequence depends on the NR-U PRACH subcarrier spacing, and the sequence length decreases as the PRACH SCS increases.

In one example, the length of the single long wideband PRACH sequence can be fixed irrespective of the NR-U PRACH subcarrier spacing.

In one example, $L_{RA}$ can be 1151 with M=96. For instance, this can be applied for NR-U PRACH with 15 kHz SCS.

In one example, $L_{RA}$ can be 571, with M=48. For instance, this can be applied for NR-U PRACH with 30 kHz SCS. In another instance, this can be applied for NR-U PRACH with 15 kHz SCS.

In one example, $L_{RA}$ can be 283, with M=24. For instance, this can be applied for NR-U PRACH with 60 kHz SCS. In another instance, this can be applied for NR-U PRACH with 30 kHz SCS. In yet another instance, this can be applied for NR-U PRACH with 15 kHz SCS.

In one example, the PRACH subcarrier spacing for the single long wideband PRACH sequence can be derived from msg1-SubcarrierSpacing field from RRC information element (IE) RACH-ConfigCommon; or if this field is absent, a UE applies the SCS as derived from the PRACH configuration table, such as the PRACH SCS is 30 kHz when Number of PRACH slots within a subframe is configured as 2 in the PRACH configuration table.

In one example, a number of RBs containing the single long PRACH sequence M can be chosen such that the single long PRACH sequence spans at least 80% of the nominal channel bandwidth.

In one example, a number of RBs containing the single long PRACH sequence M can be chosen as a fixed number irrespective of the subcarrier spacing.

In one sub-example, there can exist only one long PRACH sequence within each nominal channel bandwidth for a given subcarrier spacing.

In another sub-example, for a given subcarrier spacing, there can exist an integer multiple (N) of the long PRACH sequences each with M RBs such that N*M RBs span at least 80% of the nominal channel bandwidth.

In another sub-example, N long PRACH sequences can be FDM'ed in the frequency domain wherein each long PRACH sequence occupies M RBs.

In another sub-example, N repetitions of the long PRACH sequences can be FDM'ed in the frequency domain wherein each long PRACH sequence occupies M RBs. For instance, the repetition of different long PRACH sequences can be configured by following embodiments and/or examples.

In another sub-example, the same value of M can be applied for different PRACH subcarrier spacing, and an integer multiple value N of long PRACH sequences can be multiplexed in frequency domain, wherein N is scalable with respect to the subcarrier spacing. For instance, with M=48 wherein $L_{RA}$ can be 571, N can be 1 for 30 kHz PRACH subcarrier spacing and N can be 2 for 15 kHz PRACH subcarrier spacing, wherein the nominal channel bandwidth is 20 MHz. In another instance, with M=24 wherein $L_{RA}$ can be 283, N can be 1 for 60 kHz PRACH subcarrier spacing, and N can be 2 for 30 kHz PRACH subcarrier spacing, and N can be 4 for 15 kHz PRACH subcarrier spacing, wherein the nominal channel bandwidth is 20 MHz.

In one example, the length of the single long wideband PRACH sequence can be indicated explicitly or implicitly through the high layer parameter.

In one example, the higher layer parameter can be the remaining system information (RMSI), which is transmitted through system information block 1 (SIB 1). In one sub-example, this can be used in configuring the length of the single long wideband PRACH sequence for initial access UEs in the initial active UL BWP.

In one example, the higher layer parameter can be the RRC information element (IE) RACH-ConfigCommon, which can be used for NR-U cell-specific random access. In one sub-example, this can be used for random access of connected UEs on an active UL BWP. In one sub-example, this can be used in configuring the length of the single long wideband PRACH sequence for initial access UEs in the initial active UL BWP.

In one example, the higher layer parameter can be the RRC information element (IE) RACH-ConfigDedicated, which can be used for dedicated UE-specific random access.

In one example, the higher layer parameter (e.g., RRC information element) can add an explicit field to configure the length of the PRACH sequence.

In one sub-example, the explicit field can be named prach-SequenceLength, which can be chosen from a subset of the values of at least {1151, 571, 283, 139}.

In one example, the length of the single long wideband PRACH sequence can be implicitly configured through the PRACH subcarrier spacing, and potentially an additional field to indicate that legacy NR standard specification PRACH is not used.

In one sub-example, the PRACH subcarrier spacing can be derived from msg1-SubcarrierSpacing field from RRC IE; or if this field is absent, a UE applies the SCS as derived from the PRACH configuration table.

In another sub-example, an additional field to indicate whether legacy NR standard specification PRACH is used or not can be configured and indicated through RRC IE such as RACH-ConfigCommon.

In another sub-example, the PRACH sequence length can be 1151 and 571 if the PRACH SCS is 15 kHz and 30 kHz respectively, and the additional field indicates legacy NR standard specification PRACH is not used.

In one example, the length of the single long wideband PRACH sequence can be configured through the prach-ConfigurationIndex in RACH-ConfigGeneric, wherein an additional column can be added to the PRACH configuration table to indicate the length of the PRACH sequence, and either adding additional entries or modifying existing entries to indicate the usage of single long wideband PRACH sequence.

An illustration of the aforementioned example is provided in TABLE 1A and 1B, which provides a subset of the PRACH configuration table, which modifies to indicate the PRACH sequence length.

TABLE 1A

PRACH configuration table

| Preamble format | Preamble Sequence Length | $n_{SFN}$ mod x = y | |
|---|---|---|---|
| | | x | y |
| A1 | 139 | 16 | 1 |
| A1 | 571 | 8 | 1 |
| A1 | 1151 | 4 | 1 |
| A1 | 1151 | 2 | 1 |
| A1 | 571 | 2 | 1 |
| A1 | 1151 | 2 | 1 |
| A1 | 1151 | 2 | 1 |

TABLE 1B

PRACH configuration table

| Subframe number | Starting symbol | Number of PRACH slots within a subframe | Number of time-domain PRACH occasions within a RACH slot | PRACH duration |
|---|---|---|---|---|
| 9 | 0 | 2 | 6 | 2 |
| 9 | 0 | 2 | 6 | 2 |
| 9 | 0 | 1 | 6 | 2 |
| 2, 3, 4, 7, 8, 9 | 0 | 1 | 6 | 2 |
| 8, 9 | 0 | 2 | 6 | 2 |
| 7, 9 | 0 | 1 | 6 | 2 |
| 7, 9 | 7 | 1 | 3 | 2 |

In one example, the length of the single long wideband PRACH sequence can be configured through the indication of whether or not the long PRACH sequence is used; and if the long PRACH sequence is used, the sequence length can be one of fixed in the spec or configurable through higher layer parameter; and if the long PRACH sequence is not used, the sequence length can be determined through NR standard specification procedure.

For instance, if the long PRACH sequence is used, the long PRACH sequence can be fixed to be 571, which can be used irrespective of the PRACH subcarrier spacing.

In one example, the supported $N_{cs}$ value and the corresponding mapping from the zeroCorrelationZoneConfg index to $N_{cs}$, which can be used in generating the cyclic shift value, may be enhanced from NR standard specification to support the single long wideband PRACH sequence.

In one example, if the number of desired cyclic shifts $C_v$ that can be generated from a $N_{cs}$ value is n (n≠0), then the value of $N_{cs}$ can be determined as $N_{cs}$=floor($L_{RA}$/n).

In one example, a separate table for mapping from zero-CorrelationZonConfig to $N_{cs}$ can be defined for different length of the single long wideband PRACH.

In one sub-example, TABLE 2 to TABLE 4 provide three examples when the single long wideband PRACH sequence length is $L_{RA}$=1151.

For instance, the examples in TABLE 2 to TABLE 4 can be applied to PRACH SCS of 15 kHz.

In another instance, the supported values of $N_{cs}$ can be chosen from different supported $N_{cs}$ values in TABLE 2 to TABLE 4, as long as $N_{cs}$ (strictly) increases as zeroCorrelationZoneConfig increases.

In another instance, the supported values of $N_{cs}$ can be chosen from different supported $N_{cs}$ values in TABLE 2 to TABLE 4, and also $N_{cs}$ values not listed in TABLE 2 to TABLE 4 (e.g., $N_{cs}$ value chosen according to the aforementioned examples and/or embodiments); as long as $N_{cs}$ (strictly) increases as zeroCorrelationZoneConfig increases.

TABLE 2

Configuration values

| zeroCorrelationZoneConfig | $N_{cs}$ value for unrestricted set |
|---|---|
| 0 | 0 |
| 1 | 16 |
| 2 | 33 |
| 3 | 50 |
| 4 | 67 |
| 5 | 88 |
| 6 | 104 |
| 7 | 115 |
| 8 | 127 |
| 9 | 143 |

TABLE 2-continued

Configuration values

| zeroCorrelationZoneConfig | $N_{cs}$ value for unrestricted set |
|---|---|
| 10 | 164 |
| 11 | 191 |
| 12 | 230 |
| 13 | 287 |
| 14 | 383 |
| 15 | 575 |

TABLE 3

Configuration values

| zeroCorrelationZoneConfig | $N_{cs}$ value for unrestricted set |
|---|---|
| 0 | 0 |
| 1 | 17 |
| 2 | 35 |
| 3 | 46 |
| 4 | 52 |
| 5 | 57 |
| 6 | 67 |
| 7 | 76 |
| 8 | 88 |
| 9 | 104 |
| 10 | 127 |
| 11 | 164 |
| 12 | 191 |
| 13 | 287 |
| 14 | 383 |
| 15 | 575 |

TABLE 4

Configuration values

| zeroCorrelationZoneConfig | $N_{cs}$ value for unrestricted set |
|---|---|
| 0 | 0 |
| 1 | 17 |
| 2 | 20 |
| 3 | 25 |
| 4 | 30 |
| 5 | 35 |
| 6 | 44 |
| 7 | 52 |
| 8 | 63 |
| 9 | 82 |
| 10 | 104 |
| 11 | 127 |
| 12 | 164 |
| 13 | 230 |
| 14 | 383 |
| 15 | 575 |

In one sub-example, TABLE 5 to TABLE 7 provide three examples when the single long wideband PRACH sequence length is $L_{RA}=571$.

For instance, the examples in TABLE 5 to TABLE 7 can be applied to PRACH SCS of 30 kHz.

In another instance, the examples in TABLE 5 to TABLE 7 can be applied to PRACH SCS of 15 kHz.

In another instance, the supported values of $N_{cs}$ can be chosen from different supported $N_{cs}$ values in TABLE 5 to TABLE 7, as long as $N_{cs}$ (strictly) increases as zeroCorrelationZoneConfig increases.

In another instance, the supported values of $N_{cs}$ can be chosen from different supported $N_{cs}$ values in TABLE 5 to TABLE 7, and also $N_{cs}$ values not listed in TABLE 5 to TABLE 7 (e.g., $N_{cs}$ value chosen according to the afore-mentioned examples and/or embodiments); as long as $N_{cs}$ (strictly) increases as zeroCorrelationZoneConfig increases.

TABLE 5

Configuration values

| zeroCorrelationZoneConfig | $N_{cs}$ value for unrestricted set |
|---|---|
| 0 | 0 |
| 1 | 8 |
| 2 | 16 |
| 3 | 24 |
| 4 | 33 |
| 5 | 43 |
| 6 | 51 |
| 7 | 57 |
| 8 | 63 |
| 9 | 71 |
| 10 | 81 |
| 11 | 95 |
| 12 | 114 |
| 13 | 142 |
| 14 | 190 |
| 15 | 285 |

TABLE 6

Configuration values

| zeroCorrelationZoneConfig | $N_{cs}$ value for unrestricted set |
|---|---|
| 0 | 0 |
| 1 | 8 |
| 2 | 17 |
| 3 | 22 |
| 4 | 25 |
| 5 | 28 |
| 6 | 33 |
| 7 | 38 |
| 8 | 43 |
| 9 | 51 |
| 10 | 63 |
| 11 | 81 |
| 12 | 95 |
| 13 | 142 |
| 14 | 190 |
| 15 | 285 |

TABLE 7

Configuration values

| zeroCorrelationZoneConfig | $N_{cs}$ value for unrestricted set |
|---|---|
| 0 | 0 |
| 1 | 8 |
| 2 | 10 |
| 3 | 12 |
| 4 | 15 |
| 5 | 17 |
| 6 | 21 |
| 7 | 25 |
| 8 | 31 |
| 9 | 40 |
| 10 | 51 |
| 11 | 63 |
| 12 | 81 |
| 13 | 114 |
| 14 | 190 |
| 15 | 285 |

In one sub-example, TABLE 8 to TABLE 10 provide three examples when the single long wideband PRACH sequence length is $L_{RA}=283$.

For instance, the examples in TABLE 8 to TABLE 10 can be applied to PRACH SCS of 60 kHz.

In another instance, the examples in TABLE 8 to TABLE 10 can be applied to PRACH SCS of 30 kHz.

In another instance, the examples in TABLE 8 to TABLE 10 can be applied to PRACH SCS of 15 kHz.

In another instance, the supported values of $N_{cs}$ can be chosen from different supported $N_{cs}$ values in TABLE 8 to TABLE 10, as long as $N_{cs}$ (strictly) increases as zeroCorrelationZoneConfig increases.

In another instance, the supported values of $N_{cs}$ can be chosen from different supported $N_{cs}$ values in TABLE 8 to TABLE 10, and also $N_{cs}$ values not listed in TABLE 8 to TABLE 10 (e.g., $N_{cs}$ value chosen according to the aforementioned examples and/or embodiments); as long as $N_{cs}$ (strictly) increases as zeroCorrelationZoneConfig increases.

TABLE 8

Configuration values

| zeroCorrelationZoneConfig | $N_{cs}$ value for unrestricted set |
|---|---|
| 0 | 0 |
| 1 | 4 |
| 2 | 8 |
| 3 | 12 |
| 4 | 16 |
| 5 | 21 |
| 6 | 25 |
| 7 | 28 |
| 8 | 31 |
| 9 | 35 |
| 10 | 40 |
| 11 | 47 |
| 12 | 56 |
| 13 | 70 |
| 14 | 94 |
| 15 | 141 |

TABLE 9

Configuration values

| zeroCorrelationZoneConfig | $N_{cs}$ value for unrestricted set |
|---|---|
| 0 | 0 |
| 1 | 4 |
| 2 | 8 |
| 3 | 11 |
| 4 | 12 |
| 5 | 14 |
| 6 | 16 |
| 7 | 18 |
| 8 | 21 |
| 9 | 25 |
| 10 | 31 |
| 11 | 40 |
| 12 | 47 |
| 13 | 70 |
| 14 | 94 |
| 15 | 141 |

TABLE 10

Configuration values

| zeroCorrelationZoneConfig | $N_{cs}$ value for unrestricted set |
|---|---|
| 0 | 0 |
| 1 | 4 |
| 2 | 5 |
| 3 | 6 |

TABLE 10-continued

Configuration values

| zeroCorrelationZoneConfig | $N_{cs}$ value for unrestricted set |
|---|---|
| 4 | 7 |
| 5 | 8 |
| 6 | 10 |
| 7 | 12 |
| 8 | 15 |
| 9 | 20 |
| 10 | 25 |
| 11 | 31 |
| 12 | 40 |
| 13 | 56 |
| 14 | 94 |
| 15 | 141 |

In one sub-example, the supported $N_{cs}$ value and the corresponding mapping table from the zeroCorrelationZoneConfg index to $N_{cs}$ for single long wideband PRACH sequence can be inferred from that of the NR zeroCorrelationZoneConfg index to $N_{cs}$ mapping.

In one instance, for a single long PRACH sequence of length $L_{RA}$ ($L_{RA}$=1151, 571, 283), the mapping from zeroCorrelationZoneConfg index (denoted by zeroCorrelationZoneConfg_index) to Ncs, can be determined as: floor($L_{RA}$/(139./[$N_{cs,139}$(zeroCorrelationZoneConfg_index)])), where $N_{cs,139}$(zeroCorrelationZoneConfg_index) is 0, 2, 4, 6, 8, 10, 12, 13, 15, 17, 19, 23, 27, 34, 46, 69 for zeroCorrelationZoneConfg_index of 0, 1, 2, 3, 4, 5, 6, 7, 8, 9, 10, 11, 12, 13, 14, 15 respectively; and floor( ) denotes the floor operation.

In one instance, for a single long PRACH sequence of length $L_{RA}$ ($L_{RA}$=1151, 571, 283), the mapping from zeroCorrelationZoneConfg index (denoted by zeroCorrelationZoneConfg_index) to Ncs, can be determined as: ceil($L_{RA}$/(139./[$N_{cs,139}$(zeroCorrelationZoneConfg_index)])), where $N_{cs,139}$(zeroCorrelationZoneConfg_index) is 0, 2, 4, 6, 8, 10, 12, 13, 15, 17, 19, 23, 27, 34, 46, 69 for zeroCorrelationZoneConfg_index of 0, 1, 2, 3, 4, 5, 6, 7, 8, 9, 10, 11, 12, 13, 14, 15 respectively, where ceil( ) denotes the ceil operation.

In one instance, for a single long PRACH sequence of length $L_{RA}$ ($L_{RA}$=1151, 571, 283), the mapping from zeroCorrelationZoneConfg index (denoted by zeroCorrelationZoneConfg_index) to Ncs, can be determined as: round($L_{RA}$/(139./[$N_{cs,139}$(zeroCorrelationZoneConfg_index)])), where $N_{cs,139}$(zeroCorrelationZoneConfg_index) is 0, 2, 4, 6, 8, 10, 12, 13, 15, 17, 19, 23, 27, 34, 46, 69 for zeroCorrelationZoneConfg_index of 0, 1, 2, 3, 4, 5, 6, 7, 8, 9, 10, 11, 12, 13, 14, 15 respectively, where round( ) denotes the rounding operation, which maps to the nearest integer of a number.

In one instance, for a single long PRACH sequence of length $L_{RA}$ ($L_{RA}$=1151, 571, 283), the mapping from zeroCorrelationZoneConfg index (denoted by zeroCorrelationZoneConfg_index) to Ncs, can be determined as: floor($L_{RA}$/(839./[$N_{cs,839}$(zeroCorrelationZoneConfg_index)])), where $N_{cs,839}$(zeroCorrelationZoneConfg_index) is 0, 13, 15, 18, 22, 26, 32, 38, 46, 59, 76, 93, 119, 167, 279, 419 for zeroCorrelationZoneConfg_index of 0, 1, 2, 3, 4, 5, 6, 7, 8, 9, 10, 11, 12, 13, 14, 15 respectively; and floor( ) denotes the floor operation.

In one instance, for a single long PRACH sequence of length $L_{RA}$ ($L_{RA}$=1151, 571, 283), the mapping from zeroCorrelationZoneConfg index (denoted by zeroCorrelationZoneConfg_index) to Ncs, can be determined as: ceil($L_{RA}$/

(839./[$N_{cs,839}$(zeroCorrelationZoneConfg_index)])), where $N_{cs,839}$(zeroCorrelationZoneConfg_index) is 0, 13, 15, 18, 22, 26, 32, 38, 46, 59, 76, 93, 119, 167, 279, 419 for zeroCorrelationZoneConfg_index of 0, 1, 2, 3, 4, 5, 6, 7, 8, 9, 10, 11, 12, 13, 14, 15 respectively; and ceil( ) denotes the ceil operation.

In one instance, for a single long PRACH sequence of length $L_{RA}$ ($L_{RA}$=1151, 571, 283), the mapping from zero-CorrelationZoneConfg index (denoted by zeroCorrelation-ZoneConfg_index) to Ncs, can be determined as: round ($L_{RA}$/(839./[$N_{cs,839}$(zeroCorrelationZoneConfg_index)])), where $N_{cs,839}$(zeroCorrelationZoneConfg_index) is 0, 13, 15, 18, 22, 26, 32, 38, 46, 59, 76, 93, 119, 167, 279, 419 for zeroCorrelationZoneConfg_index of 0, 1, 2, 3, 4, 5, 6, 7, 8, 9, 10, 11, 12, 13, 14, 15 respectively; and round( ) denotes the rounding operation, which maps to the nearest integer of a number.

In one instance, for a single long PRACH sequence of length $L_{RA}$ ($L_{RA}$=1151, 571, 283), the mapping from zero-CorrelationZoneConfg index (denoted by zeroCorrelation-ZoneConfg_index) to Ncs, can be determined as: floor($L_{RA}$/(839./[$N_{cs,839}$(zeroCorrelationZoneConfg_index)])), where $N_{cs,839}$(zeroCorrelationZoneConfg_index) is 0, 13, 26, 33, 38, 41, 49, 55, 64, 76, 93, 119, 139, 209, 279, 419 for zeroCorrelationZoneConfg_index of 0, 1, 2, 3, 4, 5, 6, 7, 8, 9, 10, 11, 12, 13, 14, 15 respectively; and floor( ) denotes the floor operation.

In one instance, for a single long PRACH sequence of length $L_{RA}$ ($L_{RA}$=1151, 571, 283), the mapping from zero-CorrelationZoneConfg index (denoted by zeroCorrelation-ZoneConfg_index) to Ncs, can be determined as: ceil($L_{RA}$/(839./[$N_{cs,839}$(zeroCorrelationZoneConfg_index)])), where $N_{cs,839}$(zeroCorrelationZoneConfg_index) is 0, 13, 26, 33, 38, 41, 49, 55, 64, 76, 93, 119, 139, 209, 279, 419 for zeroCorrelationZoneConfg_index of 0, 1, 2, 3, 4, 5, 6, 7, 8, 9, 10, 11, 12, 13, 14, 15 respectively; and ceil( ) denotes the ceil operation.

In one instance, for a single long PRACH sequence of length $L_{RA}$ ($L_{RA}$=1151, 571, 283), the mapping from zero-CorrelationZoneConfg index (denoted by zeroCorrelation-ZoneConfg_index) to Ncs, can be determined as: round ($L_{RA}$/(839./[$N_{cs,839}$(zeroCorrelationZoneConfg_index)])), where $N_{cs,839}$(zeroCorrelationZoneConfg_index) is 0, 13, 26, 33, 38, 41, 49, 55, 64, 76, 93, 119, 139, 209, 279, 419 for zeroCorrelationZoneConfg_index of 0, 1, 2, 3, 4, 5, 6, 7, 8, 9, 10, 11, 12, 13, 14, 15 respectively; and round( ) denotes the rounding operation, which maps to the nearest integer of a number.

In one instance, for a given single long PRACH sequence length $L_{RA}$ ($L_{RA}$=1151, 571, 283), the Ncs corresponding to a given zeroCorrelationZoneConfg index can be chosen according to one of the first instance to the ninth instance of this sub-example.

In one example, a table for mapping from zeroCorrelationZonConfig to $N_{cs}$ only needs to be defined for unrestricted set for single long wideband PRACH.

In one example, the supported formats of the single long wideband PRACH sequence, which refers to the duration of the PRACH sequence and corresponding CP duration (and gap duration if any), can reuse all or a subset of the formats of NR short PRACH preamble formats.

In one example, the supported formats for the single long wideband PRACH sequence with length $L_{RA}$=1151 can be chosen from TABLE 11.

In one sub-example, all the preamble formats from TABLE 11 can be supported for the long wideband PRACH sequence with length $L_{RA}$=1151.

In another sub-example, a subset of the preamble formats from TABLE 11 can be supported for the long wideband PRACH sequence with length $L_{RA}$=1151, wherein the subset can be supported if $L_{RA} \times (N_u + N_{CP}^{RA}) \leq T$, where T is a predetermined upper bound in choosing the supported PRACH format.

In another sub-example, a subset of the preamble formats from TABLE 11 can be supported for the long wideband PRACH sequence with length $L_{RA}$=1151, wherein the subset can be one of: (1) format A1-A3 and format B1-B4; (2) format A1-A3; and (3) format B1-B4.

TABLE 11

Preamble formats

| Format | $L_{RA}$ | $\Delta f^{RA}$ | $N_u$ | $N_{CP}^{RA}$ | Support for restricted sets |
|---|---|---|---|---|---|
| A1 | 1151 | 15 kHz | 2 × 2048 × k | 288 × k | — |
| A2 | 1151 | 15 kHz | 4 × 2048 × k | 2 × 288 × k | — |
| A3 | 1151 | 15 kHz | 6 × 2048 × k | 4 × 288 × k | — |
| B1 | 1151 | 15 kHz | 2 × 2048 × k | 216 × k | — |
| B2 | 1151 | 15 kHz | 4 × 2048 × k | 360 × k | — |
| B3 | 1151 | 15 kHz | 6 × 2048 × k | 504 × k | — |
| B4 | 1151 | 15 kHz | 12 × 2048 × k | 936 × k | — |
| C0 | 1151 | 15 kHz | 2048 × k | 1240 × k | — |
| C2 | 1151 | 15 kHz | 4 × 2048 × k | 2048 × k | — |

In one example, the supported formats for the single long wideband PRACH sequence with length $L_{RA}$=571 can be chosen from TABLE 12A.

In one sub-example, all the preamble formats from TABLE 12A can be supported for the long wideband PRACH sequence with length $L_{RA}$=571.

In another sub-example, a subset of the preamble formats from TABLE 12A can be supported for the long wideband PRACH sequence with length $L_{RA}$=571, wherein the subset can be supported if $L_{RA} \times (N_u + N_{CP}^{RA}) \leq T$, where T is a predetermined upper bound in choosing the supported PRACH format.

In another sub-example, a subset of the preamble formats from TABLE 12A can be supported for the long wideband PRACH sequence with length $L_{RA}$=571, wherein the subset can be one of: (1) format A1-A3 and format B1-B4; (2) format A1-A3; and (3) format B1-B4.

TABLE 12A

Preamble formats

| Format | $L_{RA}$ | $\Delta f^{RA}$ | $N_u$ | $N_{CP}^{RA}$ | Support for restricted sets |
|---|---|---|---|---|---|
| A1 | 571 | 30 kHz | 2048 × k | 144 × k | — |
| A2 | 571 | 30 kHz | 2 × 2048 × k | 288 × k | — |
| A3 | 571 | 30 kHz | 3 × 2048 × k | 2 × 288 × k | — |
| B1 | 571 | 30 kHz | 2048 × k | 108 × k | — |
| B2 | 571 | 30 kHz | 2 × 2048 × k | 180 × k | — |
| B3 | 571 | 30 kHz | 3 × 2048 × k | 252 × k | — |
| B4 | 571 | 30 kHz | 6 × 2048 × k | 468 × k | — |
| C0 | 571 | 30 kHz | 1024 × k | 620 × k | — |
| C2 | 571 | 30 kHz | 2 × 2048 × k | 1024 × k | — |

In one example, the number of supported root indexes and mapping from logical root sequence index to physical root sequence index for the single long wideband PRACH needs to be enhanced from NR standard specification.

In one example, when the single long wideband PRACH sequence of length $L_{RA}$ is configured, the prach-RootSequenceIndex in the RRC-ConfigCommon IE, which indicates the logical root sequence index of the PRACH sequence, also needs to be extended with the value for prach-RootSequenceIndex ranges from 0 to $L_{RA}-2$.

In one sub-example, for the wideband PRACH sequence with $L_{RA}=1151$, the corresponding prach-RootSequenceIndex can be from 0 to 1149.

In another sub-example, for the wideband PRACH sequence with $L_{RA}=571$, the corresponding prach-RootSequenceIndex can be from 0 to 569.

In one example, mapping from logical root index to the physical root index for the single long wideband PRACH sequence of length $L_{RA}$ needs to be defined, wherein given logical root index of 2*i which maps to the physical root sequence index of j, the physical root sequence index that corresponds to logical root index of 2*i+1 is $L_{RA}-j$.

In one sub-example, the physical root sequence index j that corresponds to the logical root index of 2*i can be j=i+1, wherein $0<=i<=(L_{RA}-1)/2-1$; in addition, the physical root sequence index j that corresponds to the logical root index of 2*i+1 can be $j=L_{RA}-i-1$, wherein $0<=i<=(L_{RA}-1)/2-1$.

In one instance, when $L_{RA}=1151$, then logical index 2*i ($0<=i<=574$) maps to physical root sequence index of i+1; while logical index 2*i+1 maps to physical root sequence index of $1151-i-1$ ($0<=i<=574$).

In another instance, when $L_{RA}=571$, then logical index 2*i ($0<=i<=284$) maps to physical root sequence index of i+1; while logical index 2*i+1 maps to physical root sequence index of $1151-i-1$ ($0<=i<=284$).

In one example, the supported combinations of PRACH sequence length, PRACH SCS, PUSCH SCS, allocation of PRACH expressed in number of RBs for PUSCH, and corresponding value of $\bar{k}$ (which is utilized for baseband signal generation for PRACH as detailed in NR standard specification), can be updated when single long wideband PRACH sequence are supported for NR-U according to TABLE 12B wherein a joint table can be used; or according to all or a subset of the entries in TABLE 12C for the long wideband PRACH sequence.

TABLE 12B

Joint table

| $L_{RA}$ | $\Delta f^{RA}$ for PRACH | $\Delta f$ for PUSCH | $N_{RB}^{RA}$ allocation expressed in number of RBs for PUSCH | $\bar{k}$ |
|---|---|---|---|---|
| 139 (1151) | 15 | 15 | 12 (96) | 2 (1) |
| 139 (1151) | 15 | 30 | 6 (48) | 2 (1) |
| 139 (1151) | 15 | 60 | 3 (24) | 2 (1) |
| 139 (571) | 30 | 15 | 24 (96) | 2 |
| 139 (571) | 30 | 30 | 12 (48) | 2 |
| 139 (571) | 30 | 60 | 6 (24) | 2 |

TABLE 12C

Joint table

| $L_{RA}$ | $\Delta f^{RA}$ for PRACH | $\Delta f$ for PUSCH | $N_{RB}^{RA}$ allocation expressed in number of RBs for PUSCH | $\bar{k}$ |
|---|---|---|---|---|
| 1151 | 15 | 15 | 96 | 1 |
| 1151 | 15 | 30 | 48 | 1 |
| 1151 | 15 | 60 | 24 | 1 |
| 571 | 30 | 15 | 96 | 2 |
| 571 | 30 | 30 | 48 | 2 |
| 571 | 30 | 60 | 24 | 2 |
| 571 | 15 | 15 | 48 | 2 |
| 571 | 15 | 30 | 24 | 2 |
| 571 | 15 | 60 | 12 | 2 |

TABLE 12C-continued

Joint table

| $L_{RA}$ | $\Delta f^{RA}$ for PRACH | $\Delta f$ for PUSCH | $N_{RB}^{RA}$ allocation expressed in number of RBs for PUSCH | $\bar{k}$ |
|---|---|---|---|---|
| 283 | 30 | 15 | 48 | 2 |
| 283 | 30 | 30 | 24 | 2 |
| 283 | 30 | 60 | 12 | 2 |
| 283 | 15 | 15 | 24 | 2 |
| 283 | 15 | 30 | 12 | 2 |
| 283 | 15 | 60 | 6 | 2 |
| 283 | 60 | 15 | 96 | 2 |
| 283 | 60 | 30 | 48 | 2 |
| 283 | 60 | 60 | 24 | 2 |

In one example, when single long wideband PRACH sequence are supported, the frequency domain resource configuration for the single long wideband PRACH preamble(s) can be determined from higher layer parameters through as shown in examples below.

In one example, the offset of lowest PRACH occasion in frequency domain with respect to PRB 0 of the UL BWP for PRACH (i.e., initial active UL BWP for initial access or active uplink BWP otherwise), which is denoted by msg1-FrequencyStart (e.g., RRC IE RACH-ConfigGeneric).

In one example, the number of PRACH transmission occasions FDM'ed in one time instance, which is denoted by msg1-FDM (e.g., RRC IE RACH-ConfigGeneric), wherein the PRACH frequency resources $n_{RA}=\{0, 1, \ldots, M-1\}$, where M=msg1-FDM and the PRACH occasions are ordered in increasing order within the uplink BWP starting from the lowest frequency.

In one example, a potentially other higher layer parameter related to the wideband PRACH configuration (e.g., from other RRC information elements) and/or new high layer parameter introduced for frequency configuration of long wideband PRACH sequence.

In one example, PRB0 of the uplink BWP containing the wideband PRACH sequence can be derived through the resource indicator value (RIV) or equivalently the locationAndBandwidth field of the BWP information element corresponding to the uplink BWP that contains the PRACH (e.g., through initialUplinkBWP or BWP-Uplink).

In one example, when there is only 1 FDM'ed PRACH occasion in the frequency domain, i.e., when msg1-FDM=1, the frequency domain position of this PRACH occasion can be determined from msg1-FrequencyStart given PRB0.

In one example, more than 1 FDM'ed PRACH occasions can be supported for wideband PRACH (i.e., msg1-FDM>1), and the frequency domain position for the FDM'ed PRACH occasions can be non-consecutive; and an explicit field from high layer parameter can be utilized to indicate the offset from the lowest frequency of the i-th FDM'ed PRACH occasion ($1<=i<=$msg1-FDM-1) to the highest frequency of the (i-1)-th FDM'ed PRACH occasion, denoted by msg1-FDM-offset.

In one sub-example, msg1-FDM-offset can be configured in RRC IE RACH-ConfigGeneric.

In another sub-example, msg1-FDM-offset can be configured such that when the UL BWP is consisted of multiple nominal channel bandwidths of the unlicensed band, different FDM'ed wideband PRACH occasion can be located at different nominal channel bandwidths of the UL BWP.

In another sub-example, the frequency domain position of the i-th PRACH occasion can be determined based on msg1-FDM-offset, msg1-FrequencyStart and number of PRBs for each single long wideband PRACH (which can be determined from the length of the PRACH).

Figure 9:
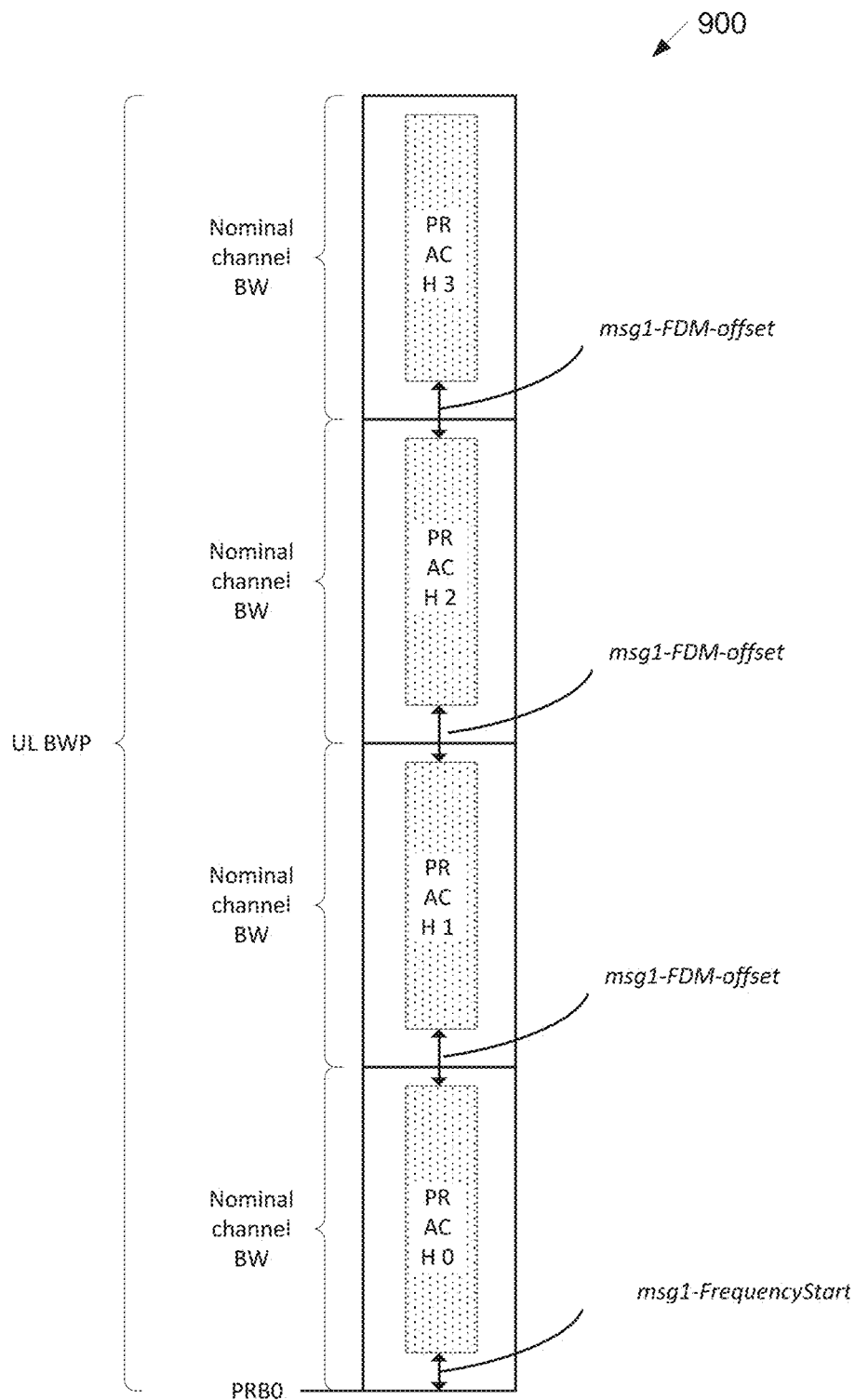
FIG. 9 illustrates an uplink bandwidth part (BWP) according to embodiments of the present disclosure.

An illustration of the aforementioned example is provided in FIG. 9, wherein the UL BWP contains 4 nominal channel bandwidths.

FIG. 9 illustrates an uplink bandwidth part (BWP) 900 according to embodiments of the present disclosure. An embodiment of the uplink BWP 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions. Other embodiments are used without departing from the scope of the present disclosure.

In one example, more than 1 FDM'ed PRACH occasions can be supported for wideband PRACH (i.e., msg1-FDM>1), and the frequency domain position for the FDM'ed PRACH occasions can be non-consecutive; and the frequency domain position for the i-th PRACH (i>=1) can be determined implicitly based on other high layer parameter related to the PRACH configuration and/or the UL BWP configuration.

In one sub-example, if the nominal channel bandwidth is BW MHz, then the starting frequency position of the i-th PRACH (i>=1) with respect to PRB0 can be determined as msg1-FrequencyStart+(i-1)*BW.

In another sub-example, if the nominal channel bandwidth is expressed as K PRBs in PRACH SCS, then the starting frequency position of the i-th PRACH (i>=1) can be determined as msg1-FrequencyStart+(i-1)*K*12*PRACH_SCS, wherein PRACH_SCS is the PRACH SCS.

Figure 10:
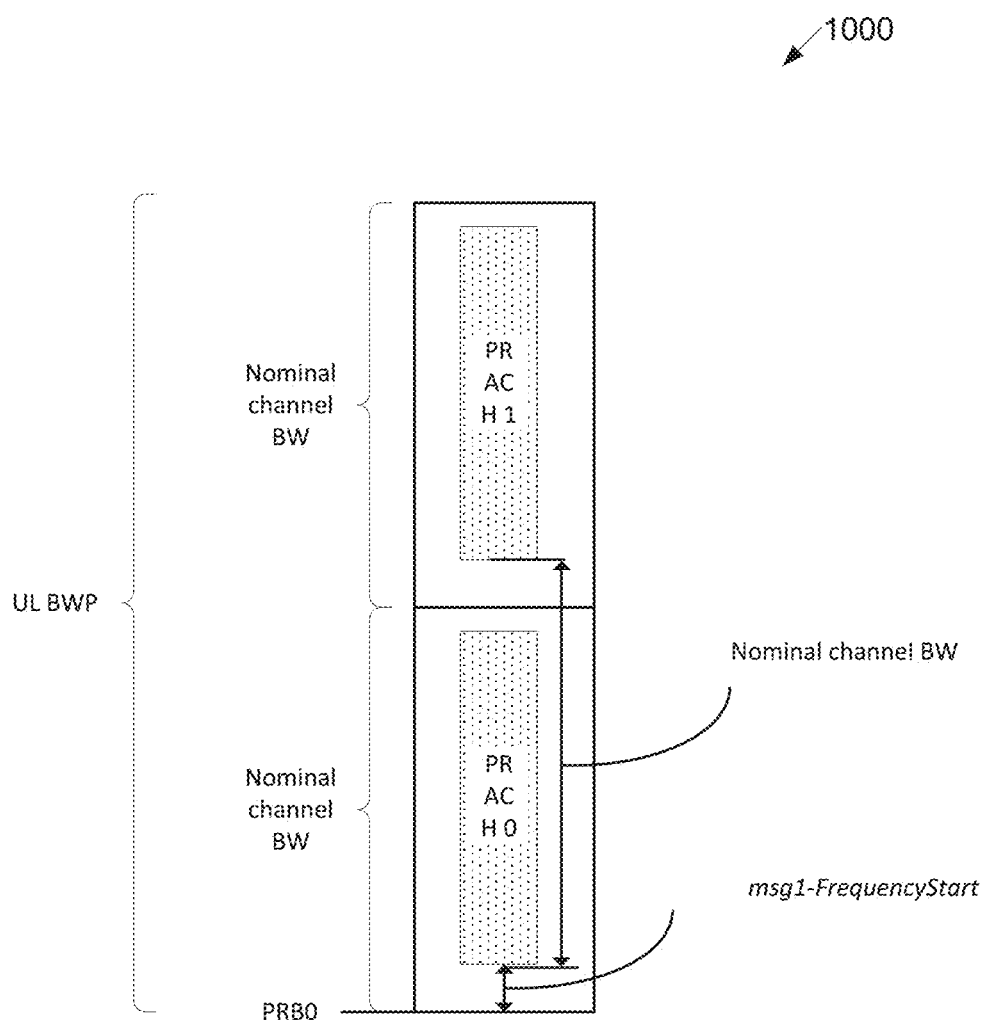
FIG. 10 illustrates another uplink bandwidth part (BWP) according to embodiments of the present disclosure.

FIG. 10 illustrates another uplink bandwidth part (BWP) 1000 according to embodiments of the present disclosure. An embodiment of the uplink bandwidth part (BWP) 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions. Other embodiments are used without departing from the scope of the present disclosure.

An illustrated in FIG. 10, wherein the UL BWP consists of two nominal channel BWs, wherein the nominal channel bandwidth can be expressed in MHz or number of PRBs; and the frequency starting position for PRACH 1 is implicitly derived from that of PRACH 0.

In one example, when single long wideband PRACH sequence is supported, the frequency domain resource configuration for the single long wideband PRACH preamble(s) can be determined from higher layer parameters through: (1) explicit configuration of a bitmap indicating the nominal channel(s) within the UL BWP that contains the wideband PRACH sequences, and (2) the frequency offset Fo from the lowest frequency of a wideband PRACH sequence with respect to lowest frequency of the nominal channel containing this wideband PRACH sequence.

In one example, when a single long wideband PRACH sequence is supported, the number of supported preambles in each time-frequency RACH occasion (RO) can be increased from 64 (as in NR standard specification) to a higher number of supported PRACH preambles.

In one instance, a number of supported PRACH preambles can be increased to 64*n, wherein n is an integer with n>1.

In one instance, a number of supported PRACH preambles can be increased to L wherein L is an integer with L>64.

In one instance, the number of supported preambles in each RO for a single long wideband PRACH sequence can be fixed, irrespective of the long wideband PRACH sequence length and/or the PRACH SCS.

For instance, the number of supported preambles in each RO for a single long wideband PRACH sequence can be fixed one of 128/256/512.

In one example, the number of supported preambles in each RO for a single long wideband PRACH sequence can be scalable with respect to the long wideband PRACH sequence length and/or the PRACH SCS.

In a sub-example, the number of preambles in each RO can increase as the long wideband PRACH sequence increases. For instance, the number of preambles can be (1) 128 for long wideband PRACH sequence of length 283; (2) 256 for long wideband PRACH sequence of length 571; (3) 512 for long wideband PRACH sequence of length 1151.

In another sub-example, the number of preambles in each RO can decrease as the long wideband PRACH sequence SCS increases.

In one example, for the long wideband PRACH sequence with increased number of preambles supported at each RO, the mapping order from SS/PBCH block index to valid RACH occasions can follow the same ordering as illustrated in NR standard specification, i.e., first, in increasing order of preamble indexes within a single PRACH occasion; second, in increasing order of frequency resource indexes for frequency multiplexed PRACH occasions; third, in increasing order of time resource indexes for time multiplexed PRACH occasions within a PRACH slot; fourth, in increasing order of indexes for PRACH slots.

In one example, for the long wideband PRACH sequence with increased number of preambles supported at each RO, the number of bits for the random-access preamble index in the PDCCH order that triggers a PRACH transmission can be increased beyond 6 bits.

In one sub-example, if the number of preambles supported at each RO is N, the number of bits in the random-access preamble field of the PDCCH order may be $\lceil \log_2 N \rceil$. For instance, the number of bits for random access preamble field of the PDCCH order can be 7, 8, 9 for N=128, 256, 512 respectively.

In one embodiment, configuration for wideband PRACH with repeated NR PRACH sequence in frequency domain is provided.

In such embodiment, methods and approach are provided to configure for a wideband PRACH through repeating base PRACH sequence in the frequency domain, such that the combined wideband PRACH sequence can occupy at least 80% of the nominal channel bandwidth of an unlicensed band. In the rest of this disclosure, a base PRACH sequence refers to the legacy NR PRACH sequence or PRACH sequence with same sequence length of legacy NR PRACH sequence, wherein the repetition of multiple (possibly different) base PRACH sequences can include a combined wideband NR-U PRACH sequence.

In one example, a number of repetitions of base PRACH sequences in a combined wideband PRACH can be indicated by one of explicit indication through higher layer parameter, or implicitly derived based on other system information, or fixed in the specification.

In one example, a number of repetitions of base PRACH sequences that consists of a combined wideband NR-U PRACH can be explicitly indicated through higher layer parameter in an RRC information element.

In one sub-example, the number of repetitions can be configured from one of all or a subset of {1, 2, 4, 8}.

For instance, this can be indicated through introducing an RRC field called msg1-Repetition or msg1-FDM-Bundled-r16NRU to RRC information element RRC-ConfigGeneric. This RRC field can be interpreted as the number of repetitions bundled for NR-U PRACH transmission within a single LBT sub-band and FDMed in one-time instance. A UE regards the occupied RACH occasions by the bundled repetitions as one RO. The updated RACH-ConfigGeneric information element can be as follows:

| RACH-ConfigGeneric information element |
| --- |
| -- ASN1START<br>-- TAG-RACH-CONFIGGENERIC-START<br>RACH-ConfigGeneric ::= SEQUENCE {<br>    prach-ConfigurationIndex INTEGER (0..255),<br>    msg1-FDM ENUMERATED {one, two, four, eight},<br>    msg1-FDM-Bundled-r16NRU    ENUMERATED {one, two, four, eight},<br>    msg1-FrequencyStart INTEGER<br>    (0..maxNrofPhysicalResourceBlocks−1),<br>    zeroCorrelationZoneConfig INTEGER(0..15),<br>    preambleReceivedTargetPower INTEGER (−202..−60),<br>    preambleTransMax ENUMERATED {n3, n4, n5, n6, n7, n8, n10, n20, n50, n100, n200},<br>    powerRampingStep ENUMERATED {dB0, dB2, dB4, dB6},<br>    ra-ResponseWindow ENUMERATED {sl1, sl2, sl4, sl8, sl10, sl20, sl40, sl80},<br>    ...<br>}<br>-- TAG-RACH-CONFIGGENERIC-STOP<br>-- ASN1STOP |

In one example, this can be indicated through reusing and reinterpreting existing RRC field msg1-FDM, which is used in NR standard specification to indicate the number of PRACH transmission occasions FDM'ed in one-time instance.

In one sub-example, a number of repetitions can be configured from one of all or a subset of {1, 2, 4, 8}.

In one example, a number of repetitions of base PRACH sequences that consists of a combined wideband NR-U PRACH sequence can be implicitly derived as ceil (80%*nominal channel bandwidth/NR PRACH sequence bandwidth), wherein the nominal channel bandwidth can be either fixed for a given unlicensed band (e.g., 20 MHz for 5 GHz band), or configured by higher layer parameter, or can be interpreted as the desired bandwidth of the combined PRACH sequence which can be fixed or configurable; and the NR PRACH sequence bandwidth depends on the base PRACH sequence length and the subcarrier spacing of base PRACH sequence, both of which can be indicated through higher layer parameters.

For instance, for nominal channel bandwidth=20 MHz, the number of base sequences is 4 for 15 kHz and 8 for 30 kHz.

In another instance, for nominal channel bandwidth=10 MHz, the number of base sequences is 2 for 15 kHz and 4 for 30 kHz.

In one example, the number of repetitions of base PRACH sequences that consists of a combined wideband NR-U PRACH sequence can be implicitly derived as the minimum number of base NR PRACH sequences such that: (f_highest−f_lowest)>=80%*nominal channel bandwidth, wherein the nominal channel bandwidth can be either fixed for a given unlicensed band (e.g., 20 MHz for 5 GHz band) or configured by higher layer parameter or can be interpreted as the desired bandwidth of the combined PRACH sequence which can be fixed or configurable; and f_highest and f_lowest are the highest and lowest frequency of the repeated base sequences, wherein the repeated base sequences can be allocated in the frequency domain according to the aforementioned examples and/or embodiments.

For instance, for nominal channel bandwidth=20 MHz, the number of base sequences is 4 for 15 kHz and 8 for 30 kHz.

In another instance, for nominal channel bandwidth=10 MHz, the number of base sequences is 2 for 15 kHz and 4 for 30 kHz.

In one example, the number of repetitions of base PRACH sequences that consists of a combined wideband NR-U PRACH sequence can be fixed by specifications.

For instance, if the NR-U PRACH subcarrier spacing is fixed to be 30 kHz, the number of repetitions of base PRACH sequences can be fixed to be 4, if the nominal channel bandwidth is 20 MHz (e.g., for 5 GHz unlicensed band).

In another instance, the set of potential number of repetitions of base PRACH sequences that consists of a combined wideband NR-U PRACH sequence can be fixed by specifications, and the actual number of repetitions can be indicated using the aforementioned examples and/or embodiments. For example, the set of number of repetitions for 15 kHz can be {2, 4} and that for the 30 kHz can be {4, 8}.

In one example, repetition of base PRACH sequences that consists of a combined wideband NR-U PRACH sequence can be contiguous in frequency domain on one of a resource element (RE) level, or resource block (RB) level (equivalently a RACH occasion level repetition).

In one example, the repetition of base PRACH sequences can be contiguous in frequency domain on a resource element (RE) level, which means if the number of repetitions is n, and each base PRACH sequence is L, then a combined wideband NR-U PRACH sequence consists of n*L number of consecutive REs or subcarriers.

In one sub-example, the number of repetitions n can be determined according to the aforementioned examples and/or embodiments.

In another sub-example, the RE offset from the starting RE for the combined wideband NR-U PRACH with respect to the lowest RE of the starting PRB that contains the combined wideband NR-U PRACH can be: $\bar{k}=\lfloor(12\times k-n\times L)/2\rfloor$ where $k=\lceil n\times L/12\rceil$ is the number of PRBs that may contain the wideband PRACH sequence. The RE offset from the starting RE for the combined wideband NR-U PRACH with respect to the lowest RE of the starting PRB that contains the combined wideband NR-U PRACH, i.e., $\bar{k}$, can also be interpreted as within the k PRBs that contains the wideband PRACH sequence, if the REs are indexed starting from 0 to 12*k−1 in an increasing order of the frequency, the starting RE index for the combined wideband NR-U PRACH.

In one instance, the base PRACH sequence length L=139, and the number of repetitions n can be 1, 2, 4, or 8, and therefore the number of RBs to contain the wideband PRACH sequence k may be 12, 24, 47, or 93 PRBs respectively, as a result the RE offset from the starting RE for the combined wideband NR-U PRACH with respect to the lowest RE of the starting PRB that contains the combined wideband NR-U PRACH may be: $\bar{k}$ may be 2, 5, 4, 2 respectively. This instance is summarized in TABLE 13, wherein one or multiple rows of TABLE 13 can be applied, and n and $\bar{k}$ are defined in this sub-example.

TABLE 13

| RB and PRACH sequence | |
|---|---|
| n | $\bar{k}$ |
| 1 | 2 |
| 2 | 5 |
| 4 | 4 |
| 8 | 2 |

In another sub-example, the RE offset from the starting RE for the combined wideband NR-U PRACH with respect to the lowest RE of the starting PRB that contains the combined wideband NR-U PRACH can be: $\bar{k}=\lceil(12\times k-n\times L)/2\rceil$ where $k=\lceil n\times L/12\rceil$ is the number of PRBs that may contain the wideband PRACH sequence. The RE offset from the starting RE for the combined wideband NR-U PRACH with respect to the lowest RE of the starting PRB that contains the combined wideband NR-U PRACH, i.e., $\bar{k}$, can also be interpreted as within the k PRBs that contains the wideband PRACH sequence, if the REs are indexed starting from 0 to 12*k-1 in an increasing order of the frequency, the starting RE index for the combined wideband NR-U PRACH.

In one instance, the base PRACH sequence length L=139, and the number of repetitions n can be 1, 2, 4, or 8, and therefore the number of RBs to contain the wideband PRACH sequence k may be 12, 24, 47, or 93 PRBs respectively, as a result the RE offset from the starting RE for the combined wideband NR-U PRACH with respect to the lowest RE of the starting PRB that contains the combined wideband NR-U PRACH may be: $\bar{k}$ may be 3, 5, 4, 2 respectively. This instance is summarized in TABLE 14, wherein one or multiple rows of TABLE 14 can be applied, and n and $\bar{k}$ are defined in this sub-example.

TABLE 14

| RB and PRACH sequence | |
|---|---|
| n | $\bar{k}$ |
| 1 | 3 |
| 2 | 5 |
| 4 | 4 |
| 8 | 2 |

In another sub-example, the RE offset from the starting RE for the combined wideband NR-U PRACH with respect to the lowest RE of the starting PRB that contains the combined wideband NR-U PRACH can be: $\bar{k}=\lfloor(12\times k-n\times L)/2\rfloor$ where $k=n\times\lceil L/12\rceil$ is the number of PRBs that may contain the wideband PRACH sequence. The RE offset from the starting RE for the combined wideband NR-U PRACH with respect to the lowest RE of the starting PRB that contains the combined wideband NR-U PRACH, i.e., $\bar{k}$, can also be interpreted as within the k PRBs that contains the wideband PRACH sequence, if the REs are indexed starting from 0 to 12*k-1 in an increasing order of the frequency, the starting RE index for the combined wideband NR-U PRACH.

In one instance, the base PRACH sequence length L=139, and the number of repetitions n can be 1, 2, 4, or 8, and therefore the number of RBs to contain the wideband PRACH sequence k may be 12, 24, 48, or 96 PRBs respectively, as a result the RE offset from the starting RE for the combined wideband NR-U PRACH with respect to the lowest RE of the starting PRB that contains the combined wideband NR-U PRACH may be: $\bar{k}$ may be 2, 5, 10, 20 respectively. This instance is summarized in TABLE 15, wherein one or multiple rows of TABLE 15 can be applied, and n and $\bar{k}$ are defined in this sub-example.

TABLE 15

| RB and PRACH sequence | |
|---|---|
| n | $\bar{k}$ |
| 1 | 2 |
| 2 | 5 |
| 4 | 10 |
| 8 | 20 |

In another sub-example, the RE offset from the starting RE for the combined wideband NR-U PRACH with respect to the lowest RE of the starting PRB that contains the combined wideband NR-U PRACH can be: $\bar{k}=\lceil(12\times k-n\times L)/2\rceil$ where $k=n\times\lceil L/12\rceil$ is the number of PRBs that may contain the wideband PRACH sequence. The RE offset from the starting RE for the combined wideband NR-U PRACH with respect to the lowest RE of the starting PRB that contains the combined wideband NR-U PRACH, i.e., $\bar{k}$, can also be interpreted as within the k PRBs that contains the wideband PRACH sequence, if the REs are indexed starting from 0 to 12*k-1 in an increasing order of the frequency, the starting RE index for the combined wideband NR-U PRACH.

In one instance, the base PRACH sequence length L=139, and the number of repetitions n can be 1, 2, 4, or 8, and therefore the number of RBs to contain the wideband PRACH sequence k may be 12, 24, 48, or 96 PRBs respectively, as a result the RE offset from the starting RE for the combined wideband NR-U PRACH with respect to the lowest RE of the starting PRB that contains the combined wideband NR-U PRACH may be: $\bar{k}$ may be 3, 5, 10, 20 respectively. This instance is summarized in TABLE 16, wherein one or multiple rows of TABLE 16 can be applied, and n and $\bar{k}$ are defined in this sub-example.

TABLE 16

| RB and PRACH sequence | |
|---|---|
| n | $\bar{k}$ |
| 1 | 3 |
| 2 | 5 |
| 4 | 10 |
| 8 | 20 |

In another sub-example, the RE offset from the starting RE for the combined wideband NR-U PRACH with respect to the lowest RE of the starting PRB that contains the combined wideband NR-U PRACH can be same as NR standard specification. For instance, 2 REs.

In another sub-example, the RE offset from the starting RE for the combined wideband NR-U PRACH with respect to the lowest RE of the starting PRB that contains the combined wideband NR-U PRACH can be configured by higher layer parameter.

In another sub-example, the RE offset from the starting RE for the combined wideband NR-U PRACH with respect to the lowest RE of the starting PRB that contains the combined wideband NR-U PRACH can be configured by DCI scheduling.

In another sub-example, this example can be referred to as "RE" level repetition.

Figures 11A, 11B:
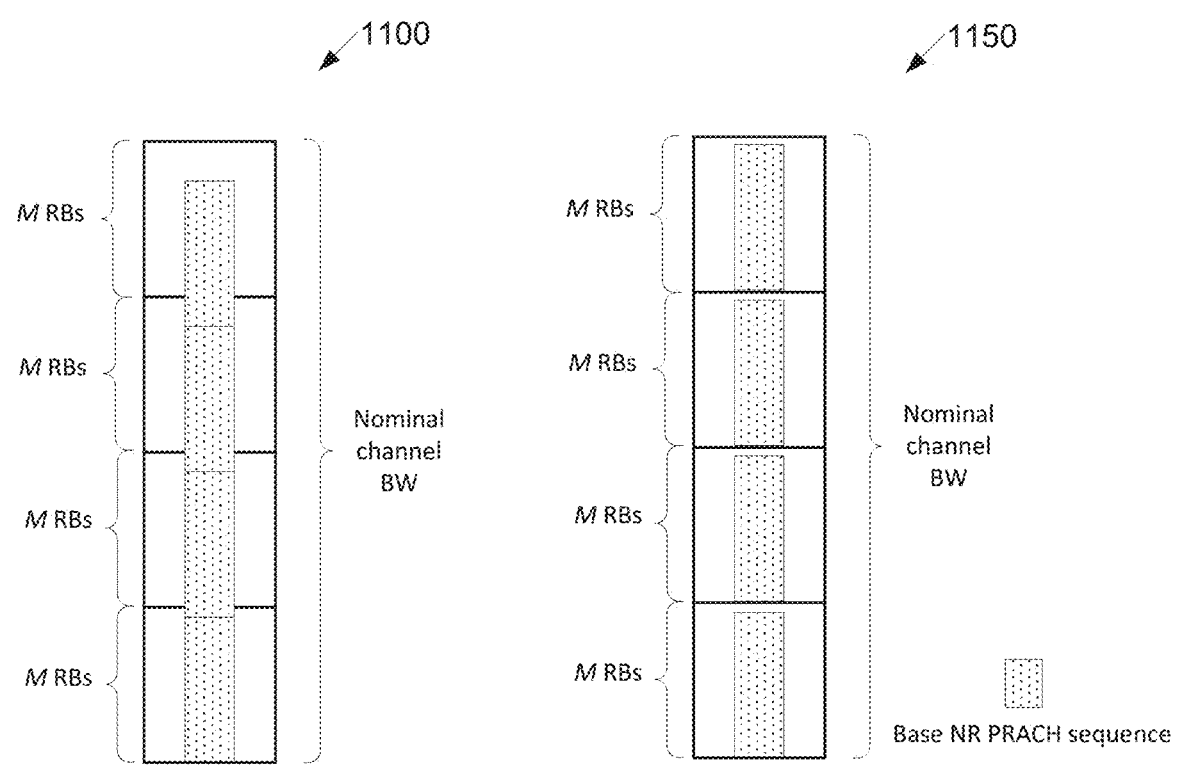
FIG. 11A illustrates an example nominal channel BW according to embodiments of the present disclosure.
FIG. 11B illustrates another example nominal channel BW according to embodiments of the present disclosure.

FIG. 11A illustrates an example nominal channel BW 1100 according to embodiments of the present disclosure. An embodiment of the nominal channel BW 1100 shown in FIG. 11A is for illustration only. One or more of the components illustrated in FIG. 11A can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 11A, wherein the nominal channel BW is 20 MHz with PRACH SCS of 30 kHz, and n is 4, L=139.

In one example, the repetition of base PRACH sequences can be contiguous in frequency domain on a resource block (RB) level or equivalently on a RACH occasion level, which means if the number of repetitions is n, and each base PRACH sequence is L which occupies M RBs, then a combined wideband NR-U PRACH sequence consists of n M number of consecutive RBs, wherein each of the M RBs includes a base PRACH sequence of L REs.

In one sub-example, the number of repetitions n can be determined according to the aforementioned embodiments and examples.

In another sub-example, the RE offset from the starting RE for each base PRACH sequence with respect to the lowest RE of the starting PRB that contains this base PRACH sequence can be the same as in NR standard specification. For instance, 2 REs.

In another sub-example, the RE offset from the starting RE for each base PRACH sequence with respect to the lowest RE of the starting PRB that contains this base PRACH sequence can be configured by higher layer parameter.

In another sub-example, the RE offset from the starting RE for each base PRACH sequence with respect to the lowest RE of the starting PRB that contains this base PRACH sequence can be configured by DCI scheduling.

In another sub-example, this example can be referred to as "RO" level repetition.

FIG. 11B illustrates another example nominal channel BW 1150 according to embodiments of the present disclosure. An embodiment of the nominal channel BW 1150 shown in FIG. 11B is for illustration only. One or more of the components illustrated in FIG. 11B can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 11B, wherein the nominal channel BW is 20 MHz with PRACH SCS of 30 kHz, and n is 4, L=139, and M=12.

In one example, a frequency offset (RB-level offset) value Fo can be configured to indicate the lowest frequency of a combined wideband NR-U PRACH sequence with respect to the lowest frequency of the nominal channel bandwidth containing the combined wideband NR-U PRACH.

In one sub-example, the frequency offset value of Fo RBs can be configured through introducing an RRC field in the RACH-ConfigGeneric IE.

In another sub-example, frequency offset value Fo can reuse the msg1-FrequencyStart field from NR standard specification.

In one example, a frequency offset (RB-level offset) value Fo can be configured to indicate the lowest frequency of a combined wideband NR-U PRACH sequence with respect to the lowest frequency of the UL BWP that contains the combined wideband NR-U PRACH.

In one sub-example, the frequency offset value of Fo RBs can be configured through introducing an RRC field in the RACH-ConfigGeneric IE.

In another sub-example, frequency offset value Fo can reuse the msg1-FrequencyStart field from NR standard specification.

In one example, a repetition of base PRACH sequences that include a combined wideband NR-U PRACH sequence can be non-contiguous in frequency domain on an RB level.

In one example, the i-th base sequence and the (i+1)-th base sequence consisting of a combined wideband NR-U PRACH sequence can have a gap of N number of RBs.

In one sub-example, the gap can be computed as the gap between the highest RB index that contains the i-th base sequence and the lowest RB index that contains the (i+1)-th base sequence, wherein the base sequence indexes are sorted in ascending order in the frequency domain.

In one example, a number of gaps RB s N can be configured by higher layer parameter, e.g., through RRC layer.

In one example, different combined wideband NR-U PRACH sequences within the same active UL BWP can be non-contiguous in frequency domain, and different combined wideband NR-U PRACH sequence within the same UL BWP can be contained in different nominal channel bandwidths.

In one example, the frequency resource allocation for each base NR PRACH sequence within the same nominal channel bandwidth can be chosen according to the aforementioned examples and/or embodiments.

In one example, a frequency gap of N RBs between neighboring combined wideband NR-U PRACH sequence can be configured through introducing a higher layer parameter, and a frequency offset (RB-level offset) value F can be configured to indicate the lowest frequency of the first wideband NR-U PRACH sequence (ordered in increasing order in frequency domain) with respect to the lowest frequency of the UL BWP.

Figures 12A, 12B:
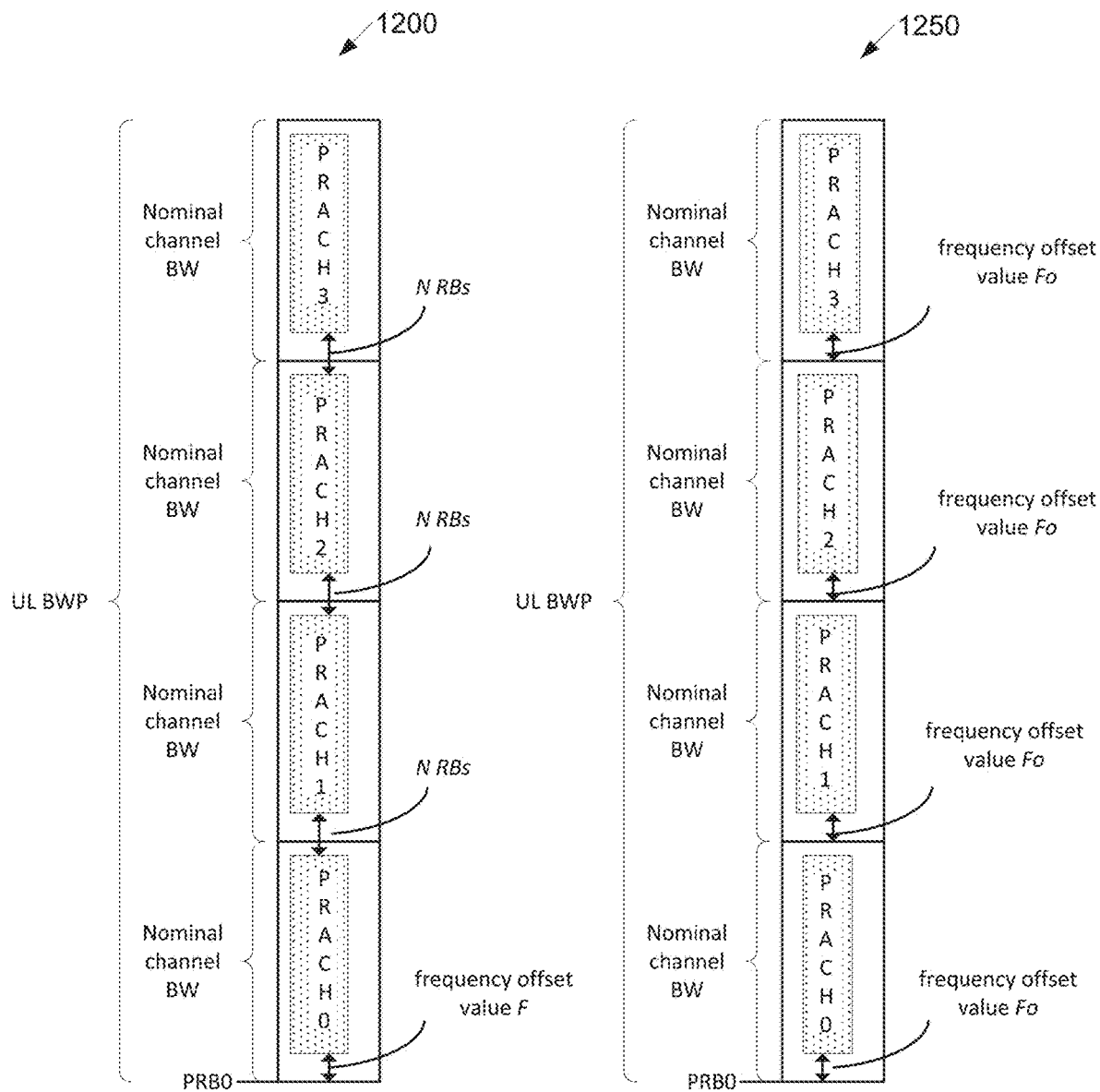
FIG. 12A illustrates an example UL BWP with frequency offset according to embodiments of the present disclosure.
FIG. 12B illustrates another example UL BWP with frequency offset according to embodiments of the present disclosure.

FIG. 12A illustrates an example UL BWP with frequency offset 1200 according to embodiments of the present disclosure. An embodiment of the UL BWP with frequency offset 1200 shown in FIG. 12A is for illustration only. One or more of the components illustrated in FIG. 12A can be implemented in specialized circuitry configured to perform the noted functions or one or more of the components can be implemented by one or more processors executing instructions to perform the noted functions. Other embodiments are used without departing from the scope of the present disclosure.

In one sub-example, the frequency gap of N RBs can be configured through introducing an RRC field in the RACH-ConfigGeneric IE.

In another sub-example, a frequency offset value F can reuse the msg1-FrequencyStart field from NR standard specification, which refers to the offset of lowest PRACH occasion in frequency domain with respective to PRB 0 of UL BWP.

In another sub-example, frequency offset value F can be introduced to indicate in RACH-ConfigGeneric IE.

In one example, a frequency offset value Fo can be configured to indicate the lowest frequency of a combined wideband NR-U PRACH sequence with respect to the lowest frequency of the nominal channel bandwidth containing the combined wideband NR-U PRACH.

FIG. 12B illustrates another example UL BWP with frequency offset 1250 according to embodiments of the present disclosure. An embodiment of the UL BWP with frequency offset 1250 shown in FIG. 12B is for illustration only. One or more of the components illustrated in FIG. 12B can be implemented in specialized circuitry configured to perform the noted functions or one or more of the components can be implemented by one or more processors executing instructions to perform the noted functions. Other embodiments are used without departing from the scope of the present disclosure.

In one sub-example, the frequency offset value of Fo RBs can be configured through introducing an RRC field in the RACH-ConfigGeneric IE.

In another sub-example, frequency offset value Fo can reuse the msg1-FrequencyStart field from NR standard specification.

In one example, a frequency offset value Fo can be configured to indicate the lowest frequency of a combined wideband NR-U PRACH sequence with respect to the lowest frequency of the UL BWP that contains the combined wideband NR-U PRACH.

In example, no base PRACH sequence may be mapped across different part of neighboring sub-bands.

In one example, the frequency domain allocation of the combined wideband PRACH sequence(s) within the UL BWP can be configured through explicit configuration of the number of FDM'ed wideband PRACH sequences M and the frequency offset from the lowest wideband PRACH sequence in frequency domain with respect to PRB0 of the UL BWP F.

In one example, the number of repetitions of base PRACH sequences in a combined wideband PRACH can be obtained through the aforementioned embodiments and/or examples.

In one example, a number of FDM'ed wideband PRACH sequences M can reuse the higher layer parameter msg1-FDM field from NR standard specification, wherein msg1-FDM can be re-interpreted as the number of FDM'ed wideband NR-U PRACH occasions in one-time instance.

In one example, the number of FDM'ed wideband PRACH sequences M can be derived implicitly through the higher layer parameter msg1-FDM field from NR standard specification, wherein msg1-FDM can represent the number of FDM'ed base NR-U PRACH occasions in one time instance, and the number of FDM'ed wideband PRACH sequences M=msg1-FDM/N, where N represents the number of repetitions of base PRACH sequences in a combined wideband PRACH derived from the aforementioned embodiments and/or examples.

In one example, the number of FDM'ed wideband PRACH sequences M can be configured through introducing new higher layer parameter repeat-msg1-FDM for NR-U.

For instance, the value of repeat-msg1-FDM can be one of {1, 2, 3, 4, 5} or {1, 2, 3, 4}.

In one example, the frequency domain position for each combined wideband PRACH sequence FDM'ed in one time instance can be determined through the frequency offset F, and a frequency gap of N RBs between neighboring combined wideband NR-U PRACH sequence according to the aforementioned examples and/or embodiments.

For instance, the i-th FDM'ed wideband PRACH sequence starts at F+(i−1)*(bandwidth of wideband PRACH+N*12*PRACH SCS) with respect to PRB0 of UL BWP, wherein 1<=i<=M. An illustration of this example is illustrated in FIG. 12A with M=4.

In one example, the frequency domain position for each combined wideband PRACH sequence FDM'ed in one time instance can be determined through the frequency offset F, and that each wideband PRACH sequence can have the same offset from a lowest frequency with respect to the lowest frequency of the nominal channel bandwidth containing the combined wideband NR-U PRACH.

For instance, the i-th FDM'ed wideband PRACH sequence starts at F+(i−1)*(bandwidth of nominal channel bandwidth) with respect to PRB0 of UL BWP, wherein 1<=i<=M. This example is illustrated in FIG. 13 wherein M=3.

Figures 13, 14:
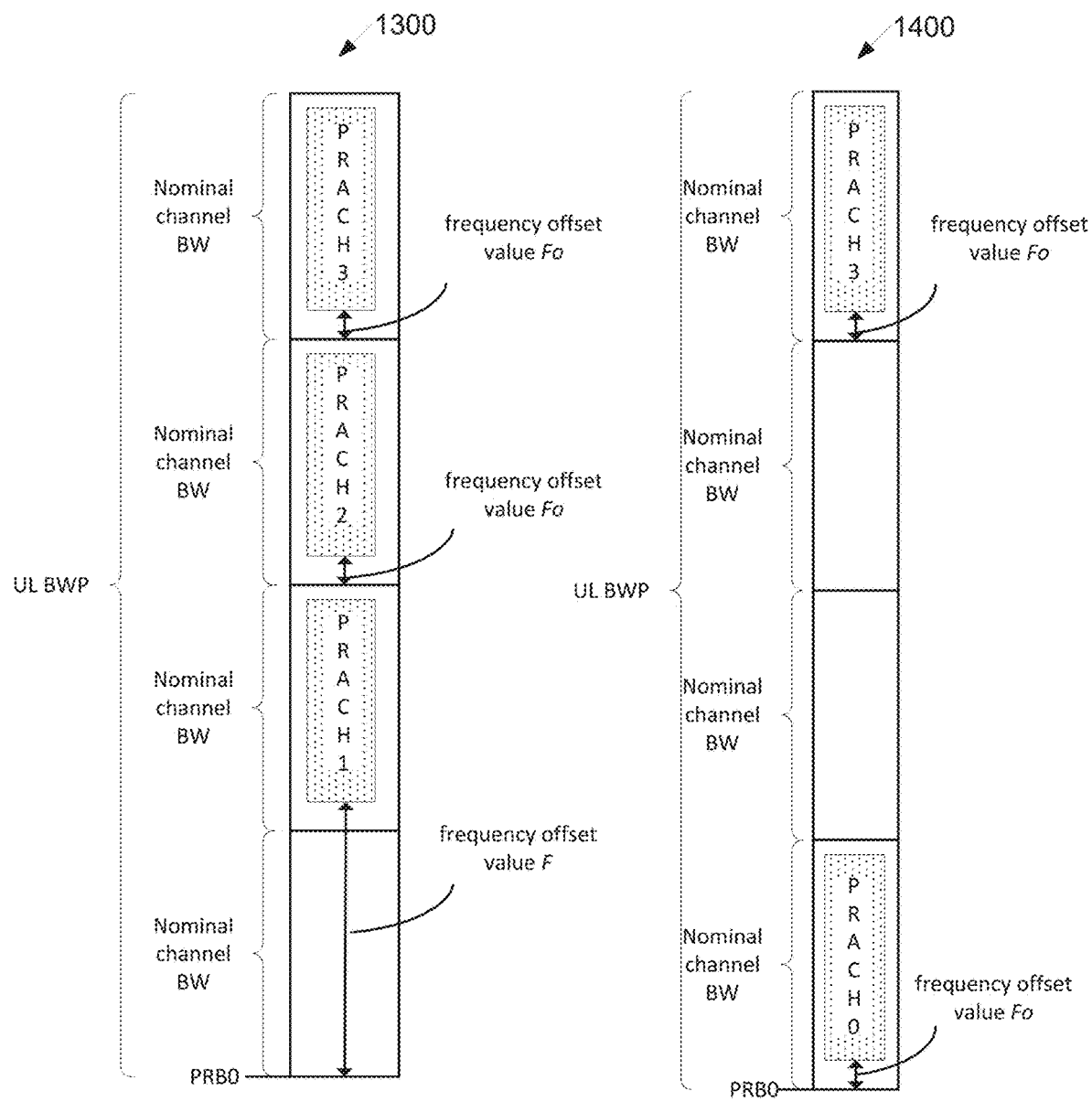
FIG. 13 illustrates yet another example UL BWP with frequency offset according to embodiments of the present disclosure.
FIG. 14 illustrates yet another example UL BWP with frequency offset according to embodiments of the present disclosure.

FIG. 13 illustrates yet another example UL BWP with frequency offset 1300 according to embodiments of the present disclosure. An embodiment of the UL BWP with frequency offset 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions. Other embodiments are used without departing from the scope of the present disclosure.

In one embodiment, the frequency domain allocation of the combined wideband PRACH sequence(s) within the UL BWP can be configured through explicit configuration of a bitmap indicating the nominal channel(s) within the UL BWP that contains the wideband PRACH sequences, and the frequency offset Fo from the lowest frequency of a wideband PRACH sequence with respect to lowest frequency of the nominal channel containing the wideband PRACH sequence.

In one example, a number of nominal channel(s) contained within the UL BWP can be obtained through the location and bandwidth or equivalently the resource indicator value (RIV) of the UL BWP.

In one example, the frequency offset Fo from the lowest frequency of a wideband PRACH sequence with respect to lowest frequency of the nominal channel containing the wideband PRACH sequence can be obtained according to the aforementioned examples and/or embodiments.

In one example, the bitmap indicating the nominal channel(s) within the UL BWP that contains the wideband PRACH sequences can be indicated through introducing a new higher layer parameter, wherein the size of the bitmap can be the number of nominal channels within the UL BWP.

In one instance, the bitmap can be introduced as a higher layer field named repeated-PRACH-bitmap in RRC IE RACH-ConfigCommon.

In one example, the bitmap indicating the nominal channel(s) within the UL BWP that contains the wideband PRACH sequences can be fixed by specification.

FIG. 14 illustrates yet another example UL BWP with frequency offset 1400 according to embodiments of the present disclosure. An embodiment of the UL BWP with frequency offset 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 14, wherein the bitmap is (1, 0, 0, 1), the i-th bit (ordered from right to left) corresponds to whether the i-th combined wideband PRACH (order in increasing order of frequency) is present in the UL BWP.

In one embodiment, the base NR PRACH sequences that consist a combined wideband PRACH sequence can be pure repetition with the same root sequence, cyclic shift, and phase.

In one example, the root sequence and cyclic shift are determined according to same procedure as in NR standard specification.

In one embodiment, the base NR PRACH sequences that consist a combined wideband PRACH sequence can have different phase rotations, and/or cyclic shifts, and/or root sequences.

In one example, one of the NR PRACH sequences that consists a combined wideband PRACH sequence can be selected according to the same procedure as in NR standard specification, and this NR PRACH sequence can be a basic base NR PRACH sequence, wherein other base NR PRACH sequence of the same combined wideband PRACH sequence can have different phase rotations, and/or cyclic shifts, and/or root sequences with respect to the basic base NR PRACH sequence.

In one sub-example, the basic base NR PRACH sequence can be the sequence with lowest or highest frequency among the base NR PRACH sequences that consist a combined wideband PRACH sequence.

In another sub-example, the basic base NR PRACH sequence can be the any one of the base NR PRACH sequences that consist a combined wideband PRACH sequence, which can be either fixed, determined by the UE, or configured by the higher layer parameter.

In one example, the NR PRACH sequences that consists a combined wideband PRACH sequence can be first selected according to the same procedure as in NR standard specification, and this NR PRACH sequence can be a basic base NR PRACH sequence; wherein on top of the basic base NR PRACH sequence, each base NR PRACH sequence of the same combined wideband PRACH sequence can have different phase rotations, and/or cyclic shifts, and/or root sequences with respect to the basic base NR PRACH sequence.

In one example, the base NR PRACH sequences within the same combined wideband PRACH sequence can have a phase rotation with respect to the basic base NR PRACH sequence.

In one sub-example, if the combined wideband PRACH sequence consists of N base NR PRACH sequences and the first base NR PRACH sequence denotes the basis base NR PRACH sequence; then the phase rotation for i-th base NR PRACH sequence ($1<=i<=N$) with respect to the basic base NR PRACH sequence is $(i-1) \times \varphi$ where $0<\varphi<2\pi$.

In another sub-example, the phase rotation $\varphi$ for neighboring base NR PRACH sequences of the combined wideband PRACH sequence can be configured by higher layer parameter.

In another sub-example, the phase rotation $\varphi$ for neighboring base NR PRACH sequences of the combined wideband PRACH sequence can be determined by the UE. For instance, the UE can choose phase rotations that can minimize metrics such as peak-to-average power ratio (PAPR) or cubic metric.

In another sub-example, the phase rotation $\varphi$ for neighboring base NR PRACH sequences of the combined wideband PRACH sequence can be fixed by specification. For instance, $\varphi$ can be $2\pi/N$ where N is the number of base sequences of a combined wideband PRACH. In another instance, the phase rotation for the i-th ($0<=i<N$) base PRACH sequence of the combined wideband PRACH sequence can be fixed as $\varphi_i$, wherein N is the number of base sequences within a wideband PRACH. In addition, the set of fixed phase rotations can be different for different N.

In another sub-example, the phase shift values for different base PRACH sequences with 15 kHz PRACH SCS within a nominal channel bandwidth can be chosen from one or multiple rows from TABLE 17, wherein each column represents the phase shift at one base PRACH sequence of the repeated PRACH sequences, and the row(s) can be selected according to one of determined by the UE (up to UE implementation), fixed in the spec, or configured through higher layer parameter or dynamic L1 indication.

TABLE 17

| Phase shift value | | | | | | | |
|---|---|---|---|---|---|---|---|
| 1 | 1.0000 + 0.0000i | 0.0000 + 1.0000i | 0.0000 + 1.0000i | 1.0000 + 0.0000i | 0.0000 − 1.0000i | 1 | −1.0000 + 0.0000i |
| 1 | −1.0000 + 0.0000i | 0.0000 − 1.0000i | −1.0000 + 0.0000i | 0.0000 + 1.0000i | 0.0000 + 1.0000i | −1 | −1.0000 + 0.0000i |
| 1 | 0.0000 − 1.0000i | 0.0000 − 1.0000i | 0.0000 + 1.0000i | 0.0000 − 1.0000i | 1.0000 + 0.0000i | 1 | 0.0000 + 1.0000i |
| 1 | 0.0000 + 1.0000i | 0.0000 + 1.0000i | −1.0000 + 0.0000i | 1.0000 + 0.0000i | −1.0000 + 0.0000i | −1 | 0.0000 + 1.0000i |
| 1 | 0.0000 − 1.0000i | 0.0000 + 1.0000i | 0.0000 + 1.0000i | 0.0000 + 1.0000i | −1.0000 + 0.0000i | 1 | 0.0000 + 1.0000i |
| 1 | 0.0000 + 1.0000i | 0.0000 − 1.0000i | 1.0000 + 0.0000i | 1.0000 + 0.0000i | 1.0000 + 0.0000i | −1 | 0.0000 + 1.0000i |
| 1 | 1.0000 + 0.0000i | 0.0000 + 1.0000i | 1.0000 + 0.0000i | 0.0000 − 1.0000i | 0.0000 + 1.0000i | −1 | 1.0000 + 0.0000i |
| 1 | −1.0000 + 0.0000i | 0.0000 − 1.0000i | 0.0000 + 1.0000i | 1.0000 + 0.0000i | 0.0000 − 1.0000i | 1 | 1.0000 + 0.0000i |
| 1 | −1.0000 + 0.0000i | 0.0000 + 1.0000i | −1.0000 + 0.0000i | 0.0000 − 1.0000i | 0.0000 − 1.0000i | −1 | −1.0000 + 0.0000i |
| 1 | 1.0000 + 0.0000i | 0.0000 − 1.0000i | 0.0000 − 1.0000i | 1.0000 + 0.0000i | 0.0000 + 1.0000i | 1 | −1.0000 + 0.0000i |
| 1 | 0.0000 + 1.0000i | 0.0000 − 1.0000i | 0.0000 − 1.0000i | 0.0000 − 1.0000i | −1.0000 + 0.0000i | 1 | 0.0000 − 1.0000i |
| 1 | 0.0000 − 1.0000i | 0.0000 + 1.0000i | 1.0000 + 0.0000i | 1.0000 + 0.0000i | 1.0000 + 0.0000i | −1 | 0.0000 − 1.0000i |
| 1 | 1.0000 + 0.0000i | 0.0000 − 1.0000i | 1.0000 + 0.0000i | 0.0000 + 1.0000i | 0.0000 − 1.0000i | −1 | 1.0000 + 0.0000i |
| 1 | −1.0000 + 0.0000i | 0.0000 + 1.0000i | 0.0000 + 1.0000i | 1.0000 + 0.0000i | 0.0000 + 1.0000i | 1 | 1.0000 + 0.0000i |
| 1 | 0.0000 − 1.0000i | 0.0000 + 1.0000i | −1.0000 + 0.0000i | 1.0000 + 0.0000i | −1.0000 + 0.0000i | −1 | 0.0000 − 1.0000i |
| 1 | 0.0000 + 1.0000i | 0.0000 + 1.0000i | 0.0000 − 1.0000i | 0.0000 + 1.0000i | 1.0000 + 0.0000i | 1 | 0.0000 − 1.0000i |
| 1 | 0.0000 − 1.0000i | −1.0000 + 0.0000i | 0.0000 − 1.0000i | 1.0000 + 0.0000i | 0.0000 + 1.0000i | 1 | 0.0000 + 1.0000i |
| 1 | 0.0000 + 1.0000i | 1.0000 + 0.0000i | 0.0000 + 1.0000i | −1.0000 + 0.0000i | 0.0000 − 1.0000i | −1 | 0.0000 + 1.0000i |
| 1 | 1.0000 + 0.0000i | −1.0000 + 0.0000i | −1.0000 + 0.0000i | −1.0000 + 0.0000i | −1.0000 + 0.0000i | 1 | −1.0000 + 0.0000i |
| 1 | −1.0000 + 0.0000i | 1.0000 + 0.0000i | 1.0000 + 0.0000i | 1.0000 + 0.0000i | 1.0000 + 0.0000i | −1 | −1.0000 + 0.0000i |

In another sub-example, the phase shift values for different base PRACH sequences with 30 kHz PRACH SCS within a nominal channel bandwidth can be chosen from one or multiple rows from TABLE 18, wherein each column represents the phase shift at one base PRACH sequence of the repeated PRACH sequences, and the row(s) can be selected according to one of determined by the UE (up to UE implementation), fixed in the spec, or configured through higher layer parameter or dynamic L1 indication. In TABLE 18, ±0.7071 is equivalent to ±√2/2, ±0.8660 is equivalent to ±√3/2.

TABLE 18

| | Phase shift value | | |
|---|---|---|---|
| 1 | −0.5000 + 0.8660i | −0.7071 + 0.7071i | 0.7071 + 0.7071i |
| 1 | −0.8660 − 0.5000i | 0.7071 − 0.7071i | 0.7071 − 0.7071i |
| 1 | 0.8660 − 0.5000i | 0.7071 + 0.7071i | −0.7071 − 0.7071i |
| 1 | 0.5000 + 0.8660i | −0.7071 − 0.7071i | −0.7071 + 0.7071i |
| 1 | −0.5000 − 0.8660i | −0.7071 − 0.7071i | 0.7071 − 0.7071i |
| 1 | 0.5000 − 0.8660i | −0.7071 + 0.7071i | −0.7071 − 0.7071i |
| 1 | −0.5000 + 0.8660i | −0.8660 + 0.5000i | 0.5000 + 0.8660i |
| 1 | −0.0000 − 1.0000i | 0.5000 − 0.8660i | 0.5000 + 0.8660i |
| 1 | −0.5000 − 0.8660i | 1.0000 + 0.0000i | 0.8660 + 0.5000i |
| 1 | 0.8660 + 0.5000i | −0.8660 + 0.5000i | 0.8660 + 0.5000i |
| 1 | 0.5000 + 0.8660i | −0.8660 − 0.5000i | −0.5000 + 0.8660i |
| 1 | −0.0000 − 1.0000i | 0.5000 + 0.8660i | −0.5000 + 0.8660i |
| 1 | 0.5000 − 0.8660i | 1.0000 + 0.0000i | −0.8660 + 0.5000i |
| 1 | −0.8660 + 0.5000i | −0.8660 − 0.5000i | −0.8660 + 0.5000i |
| 1 | 1.0000 + 0.0000i | 0.0000 + 1.0000i | 0.5000 − 0.8660i |
| 1 | −0.8660 − 0.5000i | 0.5000 − 0.8660i | 0.5000 − 0.8660i |
| 1 | −0.8660 + 0.5000i | 0.7071 + 0.7071i | 0.7071 + 0.7071i |
| 1 | 0.8660 + 0.5000i | 0.7071 − 0.7071i | −0.7071 + 0.7071i |
| 1 | 0.0000 + 1.0000i | 0.0000 + 1.0000i | 0.8660 − 0.5000i |
| 1 | −0.5000 − 0.8660i | −0.5000 − 0.8660i | 0.8660 − 0.5000i |

In another sub-example, the phase shift values for different base PRACH sequences with 30 kHz PRACH SCS within a nominal channel bandwidth can be chosen from one or multiple rows from TABLE 19, wherein each column represents the phase shift at one base PRACH sequence of the repeated PRACH sequences, and the row(s) can be selected according to one of determined by the UE (up to UE implementation), fixed in the spec, or configured through higher layer parameter or dynamic L1 indication.

TABLE 19

| | Phase shift values | | |
|---|---|---|---|
| 1 | −1.0000 + 0.0000i | −0.0000 − 1.0000i | −0.0000 − 1.0000i |
| 1 | 1.0000 + 0.0000i | 0.0000 + 1.0000i | −0.0000 − 1.0000i |
| 1 | −0.0000 − 1.0000i | 1.0000 + 0.0000i | 0.0000 + 1.0000i |
| 1 | 0.0000 + 1.0000i | −1.0000 + 0.0000i | 0.0000 + 1.0000i |
| 1 | −0.0000 − 1.0000i | −0.0000 − 1.0000i | 1.0000 + 0.0000i |
| 1 | 0.0000 + 1.0000i | 0.0000 + 1.0000i | 1.0000 + 0.0000i |
| 1 | 1.0000 + 0.0000i | 1.0000 + 0.0000i | −1.0000 + 0.0000i |
| 1 | −1.0000 + 0.0000i | −1.0000 + 0.0000i | −1.0000 + 0.0000i |
| 1 | 0.0000 + 1.0000i | −0.0000 − 1.0000i | −1.0000 + 0.0000i |
| 1 | −0.0000 − 1.0000i | 0.0000 + 1.0000i | −1.0000 + 0.0000i |
| 1 | −1.0000 + 0.0000i | 1.0000 + 0.0000i | 1.0000 + 0.0000i |
| 1 | 1.0000 + 0.0000i | −1.0000 + 0.0000i | 1.0000 + 0.0000i |
| 1 | 1.0000 + 0.0000i | −0.0000 − 1.0000i | 0.0000 + 1.0000i |
| 1 | −1.0000 + 0.0000i | 0.0000 + 1.0000i | 0.0000 + 1.0000i |
| 1 | 0.0000 + 1.0000i | 1.0000 + 0.0000i | −0.0000 − 1.0000i |
| 1 | −0.0000 − 1.0000i | −1.0000 + 0.0000i | −0.0000 − 1.0000i |
| 1 | 0.0000 + 1.0000i | 0.0000 + 1.0000i | −0.0000 − 1.0000i |
| 1 | −1.0000 + 0.0000i | −1.0000 + 0.0000i | −0.0000 − 1.0000i |
| 1 | 1.0000 + 0.0000i | −1.0000 + 0.0000i | −0.0000 − 1.0000i |
| 1 | 0.0000 + 1.0000i | −0.0000 − 1.0000i | −0.0000 − 1.0000i |

In another sub-example, different repeated base PRACH sequence can only be having different phase shifts, while cyclic shifts and root sequences need to be the same.

In another sub-example, different repeated base PRACH sequence can have different phase shifts, as well as different cyclic shifts and/or root sequences.

In one example, the base NR PRACH sequences within the same combined wideband PRACH sequence can have different cyclic shift with respect to the basic base NR PRACH sequence.

In one sub-example, if the combined wideband PRACH sequence consists of N base NR PRACH sequences and the first base NR PRACH sequence denotes the basic base NR PRACH sequence; then if the cyclic shift of the basic base NR PRACH sequence is $C_v = vN_{cs}$, then the cyclic shift for the i-th base NR PRACH sequence can be generated first in an increasing order of cyclic shift of the logical root index of the basis base sequence; then in increasing order of the logical root sequence index.

In one instance, if $(v+i) \leq \lfloor L/N_{cs} \rfloor$, the i-th base NR PRACH sequence may have cyclic shift $(v+i-1)N_{cs}$ for $1 \leq i \leq N$, wherein L is the length of the base NR PRACH sequence.

In another sub-example, if the combined wideband PRACH sequence consists of N base NR PRACH sequences and the first base NR PRACH sequence denotes the basic base NR PRACH sequence; then if the cyclic shift of the basic base NR PRACH sequence is $C_v = vN_{cs}$, then the cyclic shift for the i-th base NR PRACH sequence can be generated as $(v+i \% K)N_{cs}$ for some K that can be fixed by specification or configured by higher layer parameter. For instance, K can be 2.

In another sub-example, the cyclic shift for each base NR PRACH sequences of the combined wideband PRACH sequence relative to the basic base NR PRACH sequence can be configured by higher layer parameter.

In another sub-example, the cyclic shift of each base NR PRACH sequences of the combined wideband PRACH sequence can be determined by the UE (up to UE implementation). For instance, the UE can choose cyclic shift that can minimize metrics such as peak-to-average power ratio (PAPR) or cubic metric.

In another sub-example, the cyclic shift for each base NR PRACH sequences of the combined wideband PRACH sequence can be fixed by specification.

In one instance, the cyclic shift for the i-th (0<=i<N) base PRACH sequence of the combined wideband PRACH sequence can be fixed as $C_i$, wherein N is the number of base sequences within a wideband PRACH. In addition, the set of fixed cyclic shifts can be different for different N.

In another sub-example, different repeated base PRACH sequence can only be having different cyclic shifts, while phase shifts and root sequences need to be the same.

In another sub-example, different repeated base PRACH sequence can have different cyclic shifts, as well as different phase shifts and/or root sequences.

In one example, the base NR PRACH sequences within the same combined wideband PRACH sequence can have a different logical root sequence index with respect to the basic base NR PRACH sequence.

In one sub-example, if the combined wideband PRACH sequence consists of N base NR PRACH sequences and the first base NR PRACH sequence denotes the basic base NR PRACH sequence; then if the root index of the basic base NR PRACH sequence is u, then the logical root index of the i-th base NR PRACH sequence can be u+i for (1<=i<=N).

In another sub-example, the root index for each base NR PRACH sequences of the combined wideband PRACH sequence relative to the basic base NR PRACH sequence can be configured by higher layer parameter.

In another sub-example, the root index of each base NR PRACH sequences of the combined wideband PRACH sequence can be determined by the UE. For instance, the UE can choose root index that can minimize metrics such as peak-to-average power ratio (PAPR) or cubic metric.

In another sub-example, the root index for each base NR PRACH sequences of the combined wideband PRACH sequence can be fixed by specification.

In one example, within each base PRACH sequence of the combined wideband PRACH sequence, a subcarrier of this base PRACH sequence can have a fixed phase rotation with respect to the previous subcarrier of this base PRACH sequence.

In one sub-example, for a base PRACH sequence of length L wherein the subcarriers are indexed from 0 to L−1, the i-th subcarrier of the base sequence may have a phase rotation of α with respect the (i−1)-th subcarrier for (1<=i<=L−1).

In another sub-example, the phase rotation between neighboring subcarriers can be one of fixed in specification; and/or determined from the PRACH sequence length; and/or determined from the index of the repetition of the base PRACH sequence (i.e., if the wideband PRACH consists of N repetitions, the index of the repetition for current base sequence); and/or the number of subcarriers in the RO that contains the base PRACH sequence; and or indicated by higher layer parameter or DCI or MAC CE.

In another sub-example, the phase rotation for the 0-th subcarrier of the PRACH sequence can be one of fixed in specification; and/or determined from the PRACH sequence length; and/or determined from the index of the repetition of the base PRACH sequence (i.e., if the wideband PRACH consists of N repetitions, the index of the repetition for current base sequence); and/or the number of subcarriers in the RO that contains the base PRACH sequence; and or indicated by higher layer parameter or DCI or MAC CE.

In another sub-example, the aforementioned examples and/or embodiments can be applied to the RE-level repetition, the RO-level repetition, or both the RE-level and RO-level repetition.

In another sub-example, the aforementioned examples and/or embodiments can be applied in combination with one or multiple of the aforementioned examples and/or embodiments.

In another sub-example, the fixed phase rotation for different base PRACH sequences within the wideband PRACH can be different.

For instance, with N base sequences in the wideband PRACH sequence, the fixed phase rotation between neighboring PRACH subcarriers for the i-th base sequence (1<=i<=N) can be β+i*α.

In one example, for N=4 repetitions with 30 kHz PRACH SCS, β=1 degrees and α=1 degrees. In addition, a phase shift across the N=4 repetitions according to the aforementioned examples and/or embodiments with phase shifts of (1,0.7071+0.7071i,1,−1) or (1.0000+0.0000i, −0.5000+0.8660i, −0.7071+0.7071i, 0.7071+0.7071i) across repetitions can be applied.

In one example, for N=8 repetitions with 15 kHz PRACH SCS, β=0 degrees and α=0.5 degrees. In addition, a phase shift across the N=8 repetitions according to the aforementioned examples and/or embodiments with phase shifts of (1, 1, 1i, 1i, 1, −1i, 1, −1) across repetitions can be applied.

In another instance, with N base sequences in the wideband PRACH sequence, the fixed phase rotation between neighboring PRACH subcarriers for the i-th base sequence (1<=i<=N) can be β+(i−1)*α.

In one example, for N=4 repetitions with 30 kHz PRACH SCS, β=1 degrees and α=1 degrees. In addition, a phase shift across the N=4 repetitions according to the aforementioned examples and/or embodiments with phase shifts of (1,0.7071+0.7071i,1,−1) or (1.0000+0.0000i, −0.5000+0.8660i, −0.7071+0.7071i, 0.7071+0.7071i) across repetitions can be applied.

In one example, for N=8 repetitions with 15 kHz PRACH SCS, β=0 degrees and α=0.5 degrees. In addition, a phase shift across the N=8 repetitions according to the aforementioned examples and/or embodiments with phase shifts of (1, 1, 1i, 1i, 1, −1i, 1, −1) across repetitions can be applied.

In one example, to set of random-access preambles $x_{u,v}(n)$ may be generated according $x_{u,v}(n)=x_u((n+C_v+C_k) \mod L_{RA})$ to $$x_u(i) = e^{-j\frac{\pi u i(i+1)}{L_{RA}}}, i = 0, 1, \ldots, L_{RA} - 1$$

from which the frequency-domain representation may be generated according to $$y_{u,v}(n) = a_k \sum_{m=0}^{L_{RA}-1} x_{u,v}(m) \cdot e^{-j\frac{2\pi mn}{L_{RA}}} \cdot e^{j\beta_{n,k}}$$

where $L_{RA}$=839 or $L_{RA}$=139 depending on the PRACH preamble format.

In the above equation, k is the index of the repeated base PRACH sequence within the wideband PRACH sequence; and for N repetitions of base PRACH sequence within the wideband PRACH sequence, 0<=k<=N−1.

In the above equation, $C_k$ is the cyclic shift change which can be determined according to the fourth example of the aforementioned examples and/or embodiments if the aforementioned examples and/or embodiments is configured; otherwise $C_k$=0.

In the above equation, $α_k$ is the phase shift change across repetitions which can be determined according to the aforementioned examples and/or embodiments if the aforementioned examples and/or embodiments is configured; otherwise $α_k$=1.

In the above equation, $β_{n,k}$ is the phase shift of the n-th subcarrier of the k-th base PRACH sequence, wherein $β_{n,k}−β_{n−1,k}=θ_k$ and $θ_k$ can be determined according to the sixth example of the aforementioned examples and/or embodiments if the aforementioned examples and/or embodiments is configured; otherwise $β_{n,k}$=0 or $θ_k$=0.

In one sub-example, among $C_k$, $α_k$, and $θ_k$ which are dependent on the repetition index k, their value can be further dependent on the PRACH subcarrier spacing, and/or the number of total repetitions for the base PRACH sequences within the wideband PRACH.

In one sub-example, among $C_k$, $α_k$, and $θ_k$ which are dependent on the repetition index k, a joint table can be used to determine their value for different repetition index k (0<=k<=N−1).

For instance, TABLE 20 to TABLE 23 provide examples when $C_k$ and $α_k$ are configured to be dependent on k while $θ_k$=0 (i.e., using default value and no need to be configured), the relation between ($C_k$, $α_k$), and the PRACH SCS and the number of repetitions N of base PRACH sequences within a wideband PRACH sequence.

TABLE 20

$C_k$ and $a_k$ for $\Delta f^{RA}$ = 15 kHz, and N = 4.

| k | $C_k$ | $a_k$ |
|---|---|---|
| 0 | 0 | 1 |
| 1 | 1 | i |
| 2 | 0 | i |
| 3 | 1 | 1 |

TABLE 21

$C_k$ and $a_k$ for $\Delta f^{RA}$ = 15 kHz, and N = 8.

| k | $C_k$ | $a_k$ |
|---|---|---|
| 0 | 0 | 1 |
| 1 | 1 | i |
| 2 | 0 | i |
| 3 | 1 | −1 |
| 4 | 0 | −1 |
| 5 | 1 | i |
| 6 | 0 | i |
| 7 | 1 | 1 |

TABLE 22

$C_k$ and $a_k$ for $\Delta f^{RA}$ = 30 kHz, and N = 2.

| k | $C_k$ | $a_k$ |
|---|---|---|
| 0 | 0 | 1 |
| 1 | 1 | 1 |

TABLE 23

$C_k$ and $a_k$ for $\Delta f^{RA}$ = 30 kHz, and N = 4.

| k | $C_k$ | $a_k$ |
|---|---|---|
| 0 | 0 | 1 |
| 1 | 1 | i |
| 2 | 0 | i |
| 3 | 1 | 1 |

In NR standard specification, the PRACH preamble can only be transmitted in the time resources given by the higher-layer parameter PRACHConfigurationIndex, based on which the RACH occasions can be derived from the PRACH configuration table. In particular, the RACH occasions (ROs) within a RACH slot are allocated consecutively in NR standard specification.

Given the LBT is required before PRACH transmission, extra time-domain resource overhead may potentially be incurred. As a result, an important design consideration is how to incorporate the effect of time-domain overhead for performing LBT on the available time-domain RACH occasions within RACH slot(s).

Specifically, CAT-4 LBT as shown in FIG. 8 is the baseline LBT procedure to grant a standalone transmission of PRACH in a RACH occasion, wherein the channel access priority class (CAPC) value for PRACH CAT-4 LBT can be 1, i.e., the highest priority CAT-4 LBT with a minimum contention window size (CWS) of 3 and a maximum CWS of 7. In addition, if the RO is within a gNB-initiated COT, the PRACH can also be transmitted subject to a CAT-2 LBT of 25 μs if the gap is greater than or equal to 25 μs; otherwise a CAT-1 LBT or CAT-2 LBT of 16 μs can be used.

Given that LBT is required before each PRACH transmission, the consecutive allocation of ROs within a PRACH slot could lead to the scenario where LBT for a RO is failed due to a PRACH transmission utilizing the previous RO. This LBT blocking issue between neighboring ROs becomes even more significant when NR-U uses a wideband PRACH waveform, since the corresponding PRACH transmit power may be close to the maximum allowed transmit power per nominal bandwidth.

In one embodiment, an NR-U can allow the neighboring ROs within the same RACH slot to be non-consecutive, with a gap duration introduced between two neighboring ROs, wherein the gap can be utilized for incorporating the LBT resource overhead in transmitting PRACH in the RO that comes after this gap.

The present disclosure focuses on the enhancements of NR standard specification to support the configuration and indication of the LBT gap duration between neighboring RACH occasion(s) of NR-U without changing the existing PRACH configuration table from NR standard specification.

In the present disclosure, an FR1 NR-U refers to NR-U that operates in the unlicensed/shared bands in FR1, such as the 5 GHz unlicensed bands or the 6 GHz unlicensed/shared bands; and FR2 GHz NR-U refers to NR-U that operators in the unlicensed/shared bands in FR2, such as the 60 GHz unlicensed bands.

In one embodiment, enhancements to configure and indicate LBT gap for NR-U PRACH are provided. In such embodiment, approaches and examples on the configuration and indication methods are provided for LBT gaps in between neighboring ROs in NR-U without changing existing PRACH configuration table from NR standard specification.

In one embodiment, neighboring RACH occasions within the same PRACH slot(s) can be non-consecutive, with a gap duration introduced between two neighboring ROs, wherein the gap can be an integer multiple of OFDM symbols and the RACH occasion (RO) that comes after the gap duration can be utilized for PRACH transmission if the LBT process corresponding to that RO has successfully completed within the gap duration.

In one embodiment, for an NR-U slot wherein one or more than one valid ROs are configured within the slot with time-domain configuration according to NR standard specification PRACH configuration table, one or multiple LBT gaps can be configured within the slot, wherein each LBT gap consists of one or multiple consecutive configured valid RACH occasions within the slot, and the valid RACH occasion not configured as LBT gap can be utilized for PRACH transmission if a corresponding LBT operation performed in the LBT gap that comes before the RO is successful.

In one example, a number of ROs within an LBT gap can be fixed.

In one example, each LBT gap can be fixed to be 1 irrespective of the PRACH preamble format and/or PRACH subcarrier spacing.

Figure 15:
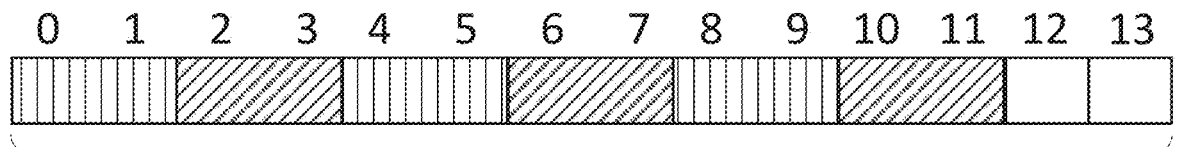
FIG. 15 illustrates an example LBT gap indication according to embodiments of the present disclosure.
Figure 15:
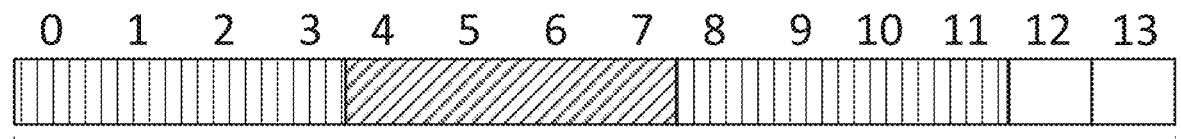
Figure 15:
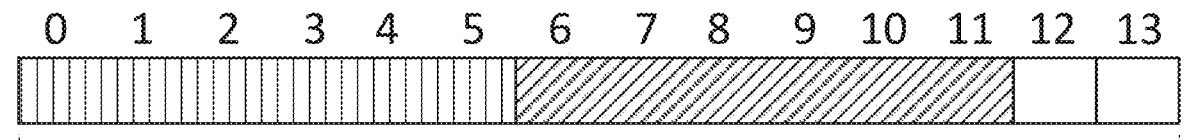
Figure 15:
Figure 15:

FIG. 15 illustrates an example LBT gap indication 1500 according to embodiments of the present disclosure. An embodiment of the LBT gap indication 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 15, irrespective of the configured PRACH preamble format and correspondingly different RO duration for different format (e.g., format A1/A2/A3), the LBT gap is a RACH occasion, and the LBT is performed within the LBT gap such that the RACH occasion following the LBT gap can be utilized if the LBT can be finished within the LBT gap.

In one example, a number of ROs for an LBT gap can be changed with respect to different PRACH subcarrier spacing and/or configured PRACH preamble format.

In one example, a number of ROs for an LBT gap can depend on both PRACH subcarrier spacing and the configured PRACH preamble format, wherein the number of ROs is $N=\lceil T_{LBT}/T_{RO} \rceil$, wherein T_LBT is a minimum desired duration for the LBT gap, and T_RO is the duration for each RO which depends on both PRACH SCS and configured PRACH format.

In one instance, when CAT-4 LBT with lowest CAPC value (i.e., 1) is used for PRACH transmission, since CAT-4 LBT with CAPC value 1 has minimum CWS of 3 and maximum CWS of 7, the LBT takes at least 25+7*9=88 μs when CWS is 7. Therefore, when $T_{LBT}$=88 μs, the corresponding number of ROs in an LBT gap for different PRACH SCS and PRACH format is provided in TABLE 24.

TABLE 24

| PRACH preamble format | | |
|---|---|---|
| PRACH preamble format | PRACH SCS = 15 kHz | PRACH SCS = 30 kHz |
| A1/B1/C0 | 1 | 2 |
| A2/B2 | 1 | 1 |
| A3/B3/C2 | 1 | 1 |
| B4 | 1 | 1 |

Figure 16:
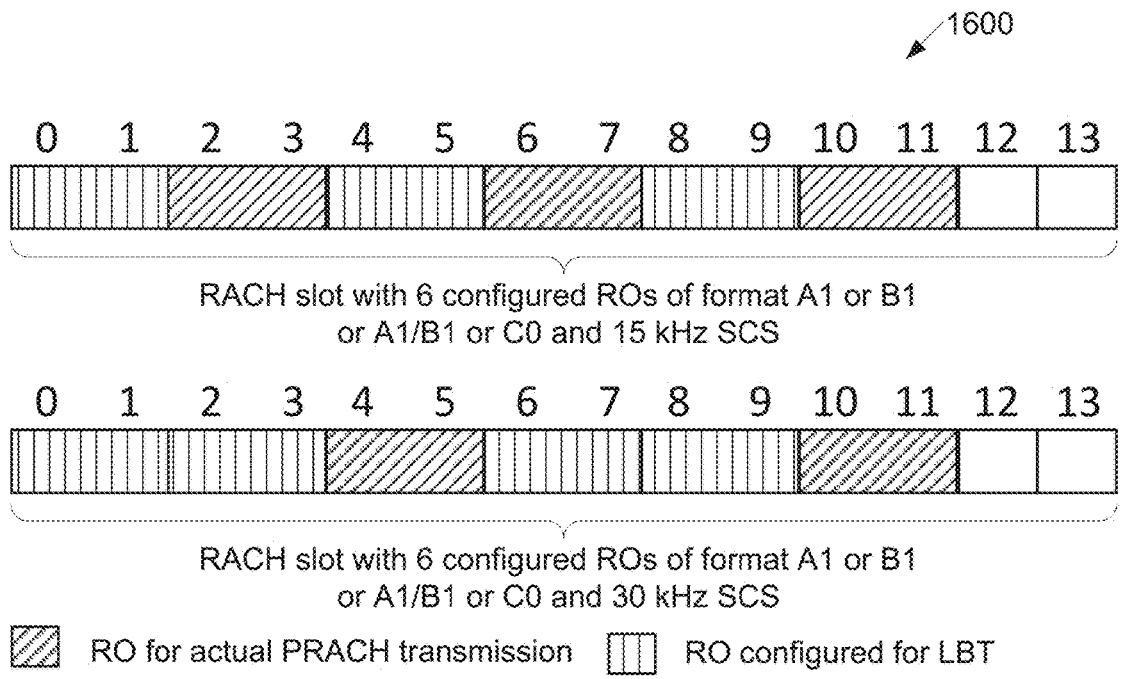
FIG. 16 illustrates another example LBT gap indication according to embodiments of the present disclosure.

FIG. 16 illustrates another example LBT gap indication 1600 according to embodiments of the present disclosure. An embodiment of the LBT gap indication 1600 shown in FIG. 16 is for illustration only. One or more of the components illustrated in FIG. 16 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 16, with 15 kHz SCS, each LBT gap is one RO; while for 30 kHz SCS with format A1/B1/C0, since one RO duration is smaller than that of the $T_{LBT}$=88 μs, 2 ROs may be configured for an LBT gap to meet the minimum desired duration for the LBT gap (i.e., $T_{LBT}$).

In one example, a number of ROs for an LBT gap can be determined by the UE from the configuration of PRACH subcarrier spacing and configured PRACH preamble format according to TABLE 24.

In one example, a number of ROs for an LBT gap can be determined by the UE from the configuration of PRACH subcarrier spacing, configured PRACH preamble format, and a minimum desired duration for the LBT gap, wherein the minimum desired duration for the LBT gap can be either fixed or configurable through higher layer parameter (e.g., RRC parameter) or DCI.

In one example, a number of ROs for an LBT gap can be directly configured.

In one example, a number of ROs to create an LBT gap can be configured by the higher layer parameter (e.g., RRC parameter).

In one sub-example, the number of ROs to create an LBT can be configured dynamically by PDCCH. For instance, the PDCCH order can introduce a field to indicate the number of ROs for LBT gap.

Given that an LBT gap can be one or multiple ROs, another design consideration is that when there are multiple ROs within a RACH slot, which ROs within the RACH slot may be assigned as LBT gap.

In one embodiment, when there are more than one RACH occasions (ROs) within a RACH slot, and that each LBT gap consists of k (k>=1) ROs, then the (n+1)×(k+1)-th RO (n≥0 and RO indexing starts at 1) may be utilized for PRACH transmission if LBT successfully completes within the LBT gap from n×(k+1)+1-th RO to the n×(k+1)+k-th RO; and such RO allocation for RO gap and actual PRACH transmission continues until no more RO is available within the RACH slot.

In one example, if k=1, i.e., each LBT gap is 1 RO, in this case the odd-indexed ROs within the RACH slot is utilized for LBT gap, while the even-indexed ROs within the RACH slot is utilized for actual PRACH transmission.

In one example, this approach can be utilized irrespective of the configuration of ROs within the RACH slot (e.g., PRACH preamble format, number of ROs within the RACH slot, starting symbol for first RO within the RACH slot, etc.).

In one embodiment, when there are more than one RACH occasions (ROs) within a RACH slot, and that each LBT gap consists of k (k>=1) ROs, then the 1+(n+1)×(k+1)-th RO (n≥0 and RO indexing starts at 1) may be utilized for PRACH transmission if LBT successfully completes within the LBT gap from n×(k+1)+2-th RO to the n×(k+1)+k+1-th RO; and such RO allocation for RO gap and actual PRACH transmission continues until no more RO is available within the RACH slot. In addition, the first RO in this RACH slot is allocated for actual PRACH transmission, and this RO can be utilized if an LBT process that comes before this RO has been successful.

In one example, if k=1, i.e., each LBT gap is 1 RO, in this case the even-indexed ROs within the RACH slot is utilized for LBT gap, while the odd-indexed ROs within the RACH slot is utilized for actual PRACH transmission.

In one example, this approach can be utilized irrespective of the configuration of ROs within the RACH slot (e.g., PRACH preamble format, number of ROs within the RACH slot, starting symbol for first RO within the RACH slot, etc.).

In one embodiment, when there are more than one RACH occasions (ROs) within a RACH slot, one of the mentioned examples and/or embodiments in the present disclosure may be applied depending on the configuration of ROs within the RACH slot (e.g., PRACH preamble format, number of ROs within the RACH slot, starting symbol for first RO within the RACH slot, etc.).

In one example, if each LBT gap consists of k=1 ROs, then the mentioned examples and/or embodiments in the present disclosure can be applied when there are an even number of valid ROs within the RACH slot; and the mentioned examples and/or embodiments in the present disclosure can be applied when there are an odd number of valid ROs within the RACH slot.

In one sub-example, such allocation can maximize the possible number of ROs for actual PRACH transmission within the RACH slot.

Figure 17:
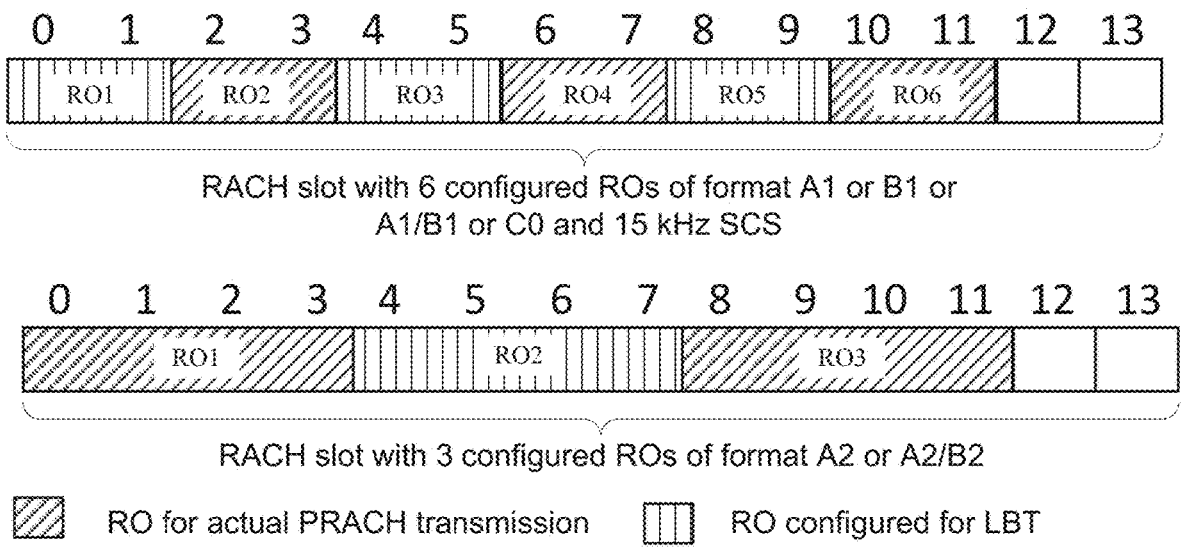
FIG. 17 illustrates yet another example LBT gap indication according to embodiments of the present disclosure.

FIG. 17 illustrates yet another example LBT gap indication 1700 according to embodiments of the present disclosure. An embodiment of the LBT gap indication 1700 shown in FIG. 17 is for illustration only. One or more of the components illustrated in FIG. 17 can be implemented in specialized circuitry configured to perform the noted functions or one or more of the components can be implemented by one or more processors executing instructions to perform the noted functions. Other embodiments are used without departing from the scope of the present disclosure.

In one embodiment, when there is only one RACH occasion within a RACH slot, the only RO can be utilized for actual PRACH transmission.

In one example, the LBT corresponding to the RO can be performed before the RO without configuring an explicit LBT gap duration.

In one example, mentioned examples and/or embodiments in the present disclosure can be applied for PRACH preamble format B4.

In one example, the LBT duration corresponding to the LBT can be performed in N symbols that precedes the start of the RO that corresponds to the LBT gap, wherein N=ceil (expected LBT duration with CWS W/PRACH symbol duration), and the expected LBT duration with CWS W can be the duration assuming each step of back-off is successful, or the duration assuming each step of back-off is successful plus certain guard duration D to incorporate potential LBT failure during the procedure.

Figure 18:
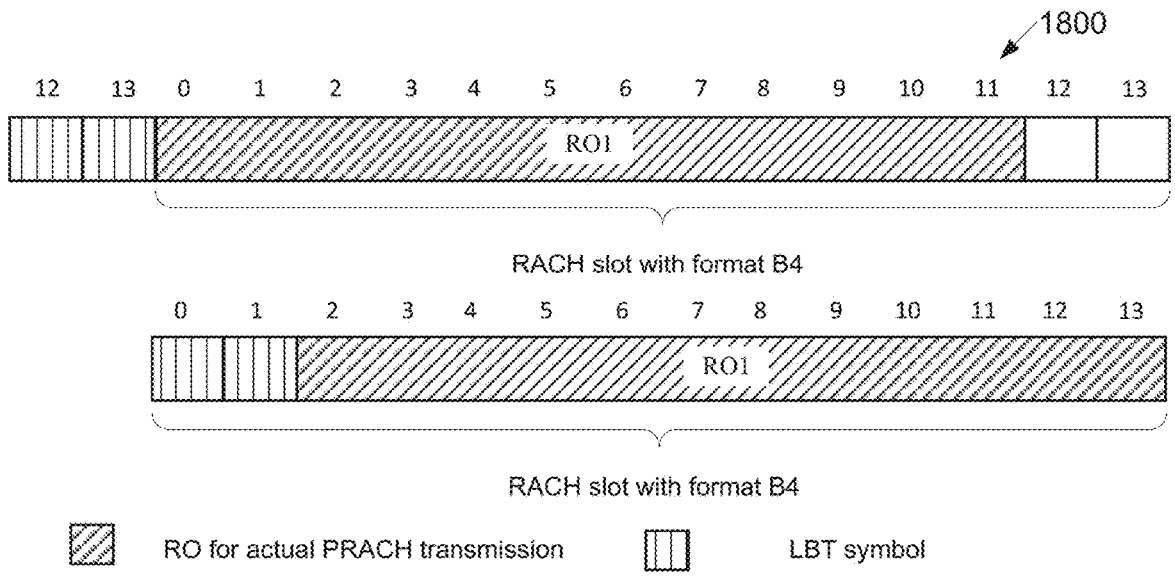
FIG. 18 illustrates an example RACH occasion in RACH slot according to embodiments of the present disclosure.

FIG. 18 illustrates an example RACH occasion in RACH slot 1800 according to embodiments of the present disclosure. An embodiment of the RACH occasion in RACH slot 1800 shown in FIG. 18 is for illustration only. One or more of the components illustrated in FIG. 18 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 18, 2 symbols are needed for the LBT, and the RO with preamble format B4 starts at symbol 0 and symbol 2 respectively within the RACH slot.

Given the determination of LBT gap RO and PRACH transmission RO within a RACH slot, another design consideration is when LBT may be performed within the LBT gap.

In one embodiment, the PRACH LBT process within an LBT gap starts at the beginning of the LBT gap.

In one example, when the PRACH LBT process completes within the LBT gap, the corresponding PRACH transmission can start at the RO that follows the end of the LBT gap.

In one sub-example, this example can be applied subject to regulation allowance.

In one example, when the PRACH LBT process completes within the LBT gap, the corresponding PRACH transmission (i.e., the PRACH transmission that may utilize the RO after the LBT gap) can extend a CP length, such that the gap between the start of the PRACH and the end of the completion of PRACH LBT is at most T μs.

In one sub-example, T is 16.

In another sub-example, T is 25.

In one example, when the PRACH LBT process completes within the LBT gap, wherein the LBT gap is k>1 ROs and the LBT completion time is within the i-th RO of the LBT gap wherein ($1 \leq i \leq k-1$); then the PRACH transmission can start at the (i+1)-th RO of the LBT gap with possible CP extension can be applied (e.g., according to the mentioned examples and/or embodiments in the present disclosure).

Figure 19:
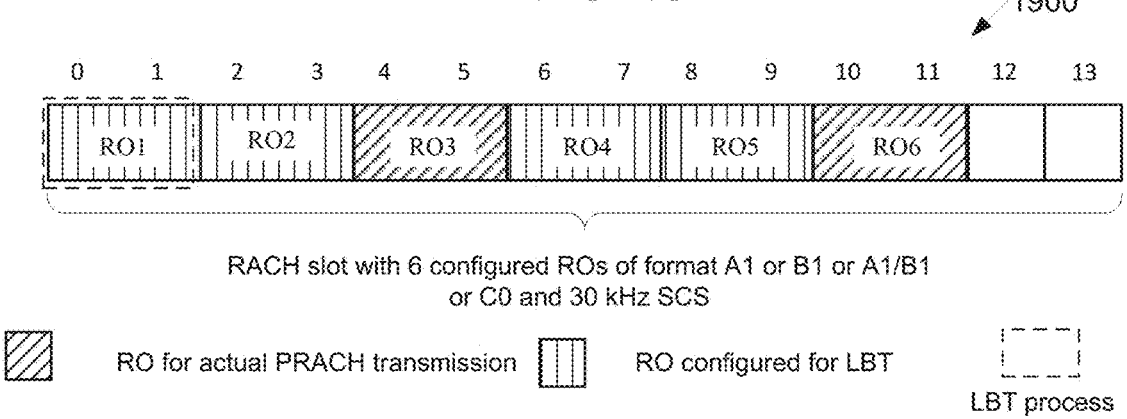
FIG. 19 illustrates another example RACH occasion in RACH slot according to embodiments of the present disclosure.

FIG. 19 illustrates another example RACH occasion in RACH slot 1900 according to embodiments of the present disclosure. An embodiment of the RACH occasion in RACH slot 1900 shown in FIG. 19 is for illustration only. One or more of the components illustrated in FIG. 19 can be implemented in specialized circuitry configured to perform the noted functions or one or more of the components can be implemented by one or more processors executing instructions to perform the noted functions. Other embodiments are used without departing from the scope of the present disclosure.

An instance with k=2 is provided in FIG. 19, wherein the LBT process completes within RO1; therefore, instead of transmitting PRACH at RO3 (with possible CP extension), the UE can transmit PRACH at RO2.

In one embodiment, LBT can be performed in N symbols within the LBT gap that precedes the start of the RO for actual PRACH transmission that corresponds to the LBT gap, wherein N=ceil(expected LBT duration with CWS W/PRACH symbol duration), and the expected LBT duration with CWS W can be the duration assuming each step of back-off is successful, or the duration assuming each step of back-off is successful plus certain guard duration D to incorporate potential LBT failure during the procedure.

In one embodiment, the PRACH LBT process performed within the LBT gap can be continued until the LBT process is successful and therefore the corresponding RO can be used for PRACH transmission; or the end of the LBT gap is reached and the corresponding RO may not be utilized for PRACH transmission.

In one embodiment, when all or part of the RACH slot is within a gNB-initiated COT, a CAT-1/CAT-2 LBT can be performed before each valid RO within the RACH slot that is within the gNB-initiated COT, and that the RO can be utilized for PRACH transmission if the LBT is successful.

In one example, CAT-1 LBT can be used only if the start of the RO and the end of the last DL transmission before the RO is at most 16 μs.

In one example, CAT-1/CAT-2 LBT can also be performed before the RO configured as LBT gap, and such RO can be utilized for PRACH transmission if the LBT is successful.

In one example, the PRACH preamble transmitted in RO configured as an LBT gap can be the same as the PRACH preamble that UE intends to transmit in the RO configured for actual PRACH transmission which the LBT gap corresponds to.

In one example, among the RO(s) configured as LBT gap and the corresponding RO for actual PRACH transmission, the UE can utilize the first RO that passes CAT-1/CAT-2 LBT for the PRACH transmission, wherein a same selected PRACH preamble is applied to the RO(s) in LBT gap and the RO for actual PRACH transmission corresponding to the LBT gap.

In one sub-example, the PRACH transmission opportunity can be increase when the RACH slot is within a gNB-initiated COT, compared to when the RACH slot is outside a gNB-initiated COT.

In one example, among the RO(s) configured as LBT gap and the corresponding RO for actual PRACH transmission, the UE can utilize the any RO that passes CAT-1/CAT-2 LBT for the PRACH transmission.

In one sub-example, a same or different selected PRACH preamble can be applied across the RO(s) in LBT gap and corresponding RO for actual PRACH transmission.

In another sub-example, a same or different selected spatial TX parameter can be applied across the RO(s) in LBT gap and corresponding RO for actual PRACH transmission.

Figure 20:
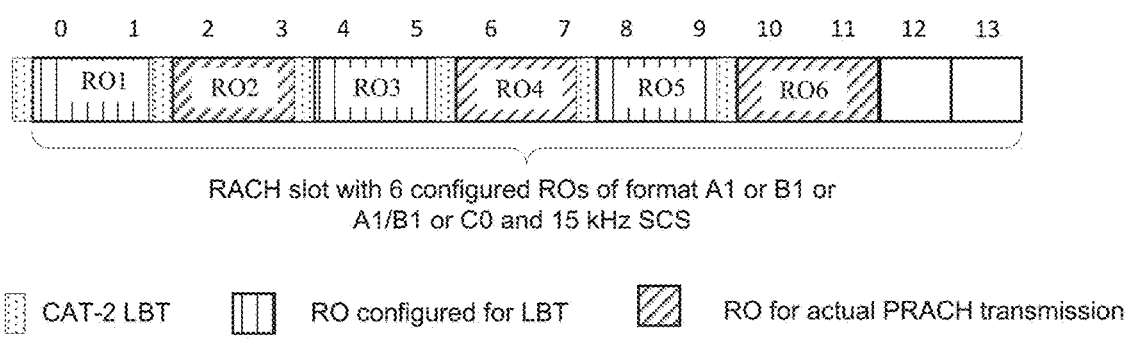
FIG. 20 illustrates yet another example RACH occasion in RACH slot according to embodiments of the present disclosure.

FIG. 20 illustrates yet another example RACH occasion in RACH slot 2000 according to embodiments of the present disclosure. An embodiment of the RACH occasion in RACH slot 2000 shown in FIG. 20 is for illustration only. One or more of the components illustrated in FIG. 20 can be implemented in specialized circuitry configured to perform the noted functions or one or more of the components can be implemented by one or more processors executing instructions to perform the noted functions. Other embodiments are used without departing from the scope of the present disclosure.

An illustrated in FIG. 20, wherein the entire RACH slot is within a gNB-initiated COT, and that a CAT-2 LBT can be performed before each valid RO within this RACH slot, and the corresponding RO can be utilized for PRACH transmission is CAT-2 LBT is successful.

In one embodiment, when all or part of the RACH slot is within a gNB-initiated COT, a CAT-1/CAT-2 LBT can be performed immediately before the RO configured for actual PRACH transmission within the RACH slot; and that this RO can be utilized for PRACH transmission if the LBT is successful.

In one embodiment, the SS/PBCH block (SSB) to valid RO mapping can be enhanced from NR standard specification to support LBT gap.

In one example, the SSB indexes are mapped to valid ROs not configured as LBT gap in the following order: first, in increasing order of preamble indexes within a single valid RO not configured as LBT gap; second, in increasing order of frequency resource indexes for frequency multiplexed valid ROs not configured as LBT gap; third, in increasing order of time resource indexes for time multiplexed valid ROs not configured as LBT gap within a PRACH slot; fourth, in increasing order of indexes for PRACH slots.

In one sub-example, the ROs within an LBT gap can be associated with the same SSB index as the RO for actual PRACH transmission that corresponds to the LBT gap. For instance, this can be used when the RACH slot is within a gNB-initiated COT and thus CAT-2 LBT can be used.

In one example, the SSB indexes are mapped to valid ROs on a RO-group basis, wherein a RO group consists of the RO(s) configured for an LBT gap and the RO for actual PRACH transmission that corresponds to the LBT gap; and the mapping order can be: first, in increasing order of preamble indexes within a RO group; second, in increasing order of frequency resource indexes for frequency multiplexed RO groups; third, in increasing order of time resource indexes for time multiplexed RO groups within a PRACH slot; fourth, in increasing order of indexes for PRACH slots.

In the present disclosure, numerology refers to a set of signal parameters which can include subframe duration, sub-carrier spacing (SCS), cyclic prefix (CP) length, transmission bandwidth (BW), or any combination of these signal parameters.

After the UE detects a synchronization signal and decodes the broadcasted system information, the UE may initiate the random access process by transmitting a physical random access channel (PRACH) preamble in uplink, based on the PRACH configuration that would indicate at which resources that the UE is allowed to transmit a PRACH preamble as well as the PRACH preamble type.

In NR, an association exists between one or multiple SS/PBCH blocks and a subset of RACH occasions (ROs). A UE can select the subset of RACH resources through downlink measurement and this association. Contention-based random access (CBRA) in NR is based on a 4-step procedure, where the UE first transmits a physical random access channel (PRACH) preamble (Msg1) to a gNB through its selected RACH resources; the gNB replies with the random access response (RAR) in Msg2; then UE transmits a Msg3 in the uplink and the gNB transmits the Msg4 in the downlink. Such random-access procedure is supported for both IDLE mode and CONNECTED mode UEs.

Figure 21A:
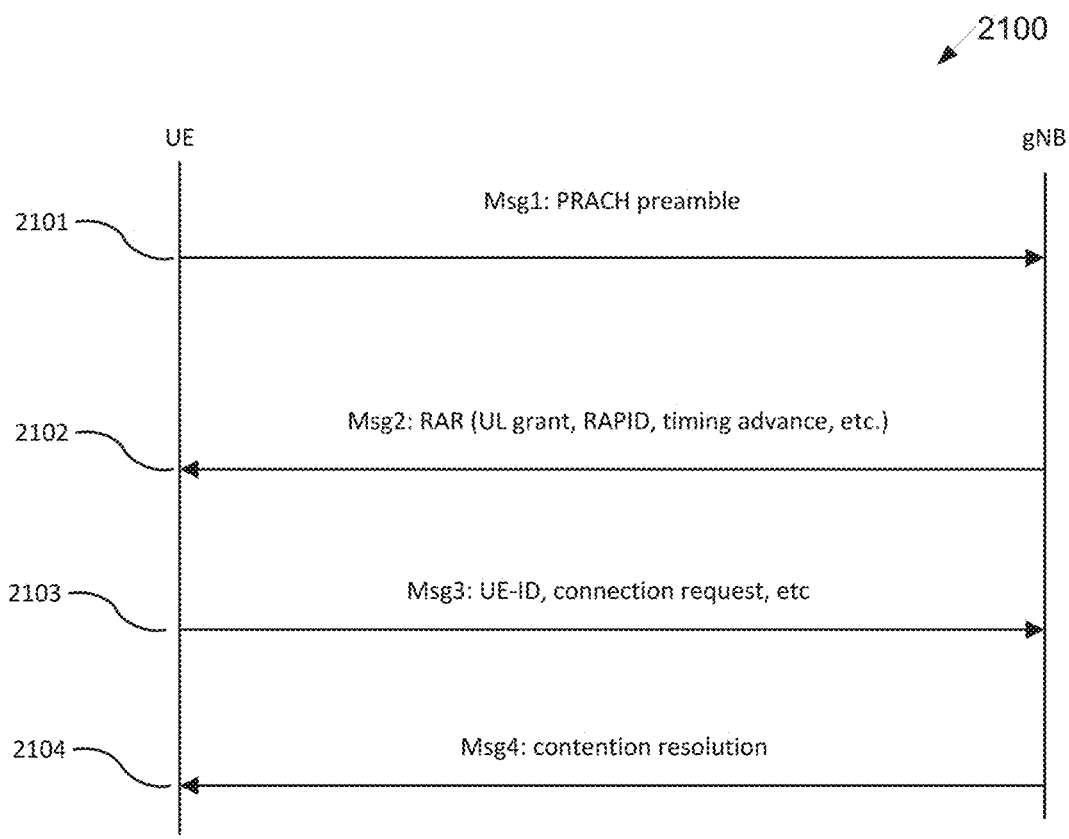
FIG. 21A illustrates an example RACH procedure according to embodiments of the present disclosure.

FIG. 21A illustrates an example RACH procedure 2100 according to embodiments of the present disclosure. An embodiment of the RACH procedure 2100 shown in FIG. 21 is for illustration only. One or more of the components illustrated in FIG. 21 can be implemented in specialized circuitry configured to perform the noted functions or one or more of the components can be implemented by one or more processors executing instructions to perform the noted functions. Other embodiments are used without departing from the scope of the present disclosure.

A general procedure for the 4-step RA is shown in FIG. 21A. A contention-free random access (CFRA) is also supported for NR, such as for the purpose of handover and DL data arrival, wherein dedicated preamble is assigned to the UE and no contention resolution (i.e., Msg4) is needed.

As a reduced step RACH from the 4-step RACH, 2-step random access channel (RACH) procedure intends to reduce the minimum required number of message transactions to complete a random-access procedure for devices to get connected to the network. 4-step RACH is conventional but it may not be always optimal for the services requiring short latency or for an operation in NR-U. It is because of the inherent delays, which becomes larger in the NR-U because of the LBT requirement before transmitting signals at every step in the unlicensed bands.

Figure 21B:
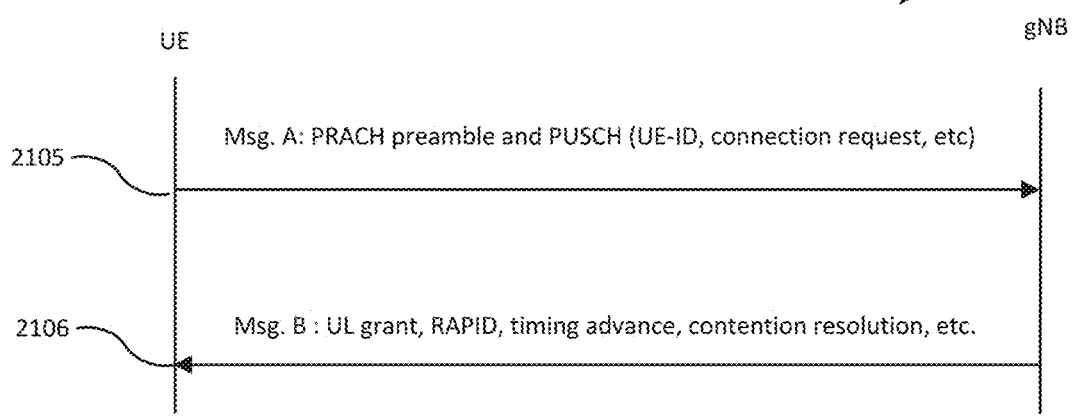
FIG. 21B illustrates an example RACH procedure according to embodiments of the present disclosure.

2-step RACH comprises msg. A transmission from a UE and msg. B transmission from a network entity, a gNB as shown in FIG. 21B. A msg. A comprises PRACH preamble and uplink data (PUSCH) for a UE to transmit in a very initial stage including UE-ID, connection request and etc. Upon successfully receiving the msg. A, the gNB transmits msg. B to grant further transmissions of the UE providing necessary information such as UL grant, RAPID, timing advance, contention resolution and etc.

FIG. 21B illustrates an example RACH procedure 2150 according to embodiments of the present disclosure. An embodiment of the RACH procedure 2150 shown in FIG. 21B is for illustration only. One or more of the components illustrated in FIG. 21B can be implemented in specialized circuitry configured to perform the noted functions or one or more of the components can be implemented by one or more processors executing instructions to perform the noted functions. Other embodiments are used without departing from the scope of the present disclosure. The 2 step RACH procedure is illustrated in FIG. 21B.

The fundamentals of preambles themselves for two step RACH don't need to be differentiated by the existing ones, i.e. NR preamble formats/sequences for four step RACH. Uplink data as a part of msg. A is sent on the pre-allocated resources at the first step of RACH procedure, which is done at the $3^{rd}$ step in four step RACH procedure. The pre-allocated resources msg. A PUSCH are shared by multiple UEs who attempt random accesses.

Details on the resources for the msg. A transmission including resource size, modulation order and coding rate, DM-RS information and etc. may be known (signaled) to all UEs before all UEs attempt the random access. If the gNB successfully receives and decodes the msg. A, the gNB responds with msg. B, which can be understood as a combination of msg 2 and 4 in the four step RACH procedure. By reducing the steps in half, initial access delay can be shortened to meet service requirements for specific service types.

NR supports PRACH preambles with either long sequence length of L=839 symbols and subcarrier spacing (SCS) of 1.25 KHz or 5 KHz, or short sequence length of L=139 symbols with SCS of 15, 30, 60, or 120 kHz. In particular, for the short preamble sequence, NR supports transmission of multiple/repeated preamble sequences to enhance the coverage or supports gNB receiver beam-sweeping, and also CP/GP are required.

Figure 22:
FIG. 22 illustrates an example general structure of short preamble according to embodiments of the present disclosure.

FIG. 22 illustrates an example general structure of short preamble 2200 according to embodiments of the present disclosure. An embodiment of the general structure of short preamble 2200 shown in FIG. 22 is for illustration only. One or more of the components illustrated in FIG. 22 can be implemented in specialized circuitry configured to perform the noted functions or one or more of the components can be implemented by one or more processors executing instructions to perform the noted functions. Other embodiments are used without departing from the scope of the present disclosure.

FIG. 22 illustrates the general structure of the short preamble format, and the detailed supported preamble formats with short sequence length for 15 KHz subcarrier spacing in NR are shown in TABLE 25. In TABLE 25, a unit is Ts where Ts=1/30.72 MHz, and PRACH preambles are aligned with OFDM symbol boundary for data with same numerology. For format A, GP can be defined within the last RACH preamble among consecutively transmitted RACH preambles. For other SCS values (e.g., 30, 60, and 120 kHz), preamble formats can be defined similar to TABLE 25 by scaling Ts according to SCS.

TABLE 25

Preamble format

| Preamble format | #of sequence | TCP | TSEQ | TGP |
|---|---|---|---|---|
| A1 | 2 | 288 | 4096 | 0 |
| A2 | 4 | 576 | 8192 | 0 |
| A3 | 6 | 864 | 12288 | 0 |
| B1 | 2 | 192 | 4096 | 96 |
| B2 | 4 | 360 | 8192 | 216 |
| B3 | 6 | 504 | 12288 | 360 |
| B4 | 12 | 936 | 24576 | 792 |
| C0 | 1 | 1240 | 2048 | 1096 |
| C2 | 4 | 2048 | 8192 | 2912 |

In order to operate NR in unlicensed spectrum, unlicensed spectrum regulations across different unlicensed bands and different regions need to be satisfied, such as the listen-before-talk (LBT), occupied channel bandwidth (OCB) regulation, and power spectral density (PSD) regulation. For example, the ETSI regulation in the 5 GHz unlicensed band and 60 GHz requires that LBT is required before the channel access is granted. Given the requirement of LBT, each message of the NR-U random-access procedure is not guaranteed to have channel access at the pre-defined and/or scheduled time and frequency resource, thereby potentially increasing the overall random-access delay. In addition, extra resource overhead may also be incurred for NR-U random-access procedure due to the LBT requirement.

As a result, the present disclosure focuses on the enhancements of random-access procedure for unlicensed bands (NR-Unlicensed, NR-U in short) also considering reduction of steps to perform random accesses in these bands, which is so-called two step random access procedures. Note the enhancements in the present disclosure can be applied to both the CBRA and CFRA (if applicable) procedures of NR-U.

The LBT regulation in unlicensed band requires a UE and a gNB to perform LBT before each transmission. Specifically, LBT may be performed before the transmission of PRACH is granted. One design consideration is the LBT procedure for PRACH transmission in relation to which types of LBT may be performed. Potential LBT procedures are listed below as examples and/or embodiments.

In one embodiment, LBT for PRACH can be a single-shot LBT of fixed time duration. In one example, the LBT duration can be of PIFS duration of the coexisting Wi-Fi system, which can be 25 μs for sub-7 GHz NR-U system, and/or 8 μs for above-7 GHz NR-U system. In one sub-embodiment, the single-shot LBT can be utilized for transmitting PRACH, if the corresponding RACH occasion is within the channel occupancy time (COT) obtained by a gNB, such as through CAT-4 LBT. In another sub-embodiment, the single-shot LBT can be supported for transmitting PRACH outside the COT of the gNB, e.g., associated with a CAT-4 LBT.

In one embodiment, LBT for PRACH can follow the Category 4 (CAT-4) LBT of LTE-LAA, which is LBT with random back-off with a contention window size (CWS) of variable size.

In one sub-embodiment, it is specified that the CAT-4 LBT for NR-U PRACH can have higher priority class, such as LBT priority class 1 with a minimum CWS of 3 and maximum CWS of 7.

In one sub-embodiment, the CWS adaptation rule for PRACH transmission depends on the design of remaining random-access procedures. In one example, if RAR transmission is also subject to LBT, a UE can fail to receive RAR due to a gNB LBT failure, in which case the CWS for PRACH does not increase. In another example, if the UE detects RAR but the contention resolution message (i.e., Msg4) indicates that a gNB did not correctly detect PRACH (e.g., due to collision), then the UE increases CWS for PRACH re-transmission. In another example, if the UE successfully completes the 4-step RA procedure, the CWS for PRACH is re-set to minimum for future PRACH transmissions.

In one embodiment, LBT for PRACH can follow the category 3 (CAT-3) LBT of LTE-LAA, which is LBT with random back-off with a fixed CWS.

The LBT procedures defined above can be utilized to grant transmissions other than PRACH as well, such as Msg2/Msg3/Msg4 during the RA procedure.

The configuration for the PRACH LBT procedure, including at least one of the type of LBT and/or the corresponding parameters of each type of LBT (e.g., at least including one of the energy detection threshold, and/or LBT priority class for CAT-4 LBT (if specified/configured), and/or CWS and/or MCOT for CAT-3 LBT), can be indicated as follows (note that it is possible that part of the configurations are using different embodiments).

In one embodiment, the PRACH LBT configuration or part of the configuration can be indicated by higher layer parameters, such as through the SystemInformationBlock-Type1 (SIB1) or SIBs other than SIB1 from the RRC layer.

In one embodiment, the PRACH LBT configuration or part of the configuration can be indicated by layer 1 signaling. In one example, PRACH LBT configuration can be indicated through PBCH.

In one embodiment, PRACH LBT configuration or part of the configuration can be indicated in the PRACH configuration table. In one example, this can be applied to the scenario with single-shot LBT.

In one embodiment, PRACH LBT configuration or part of the configuration can be fixed by the specification.

In one embodiment, PRACH LBT configuration or part of the configuration can be up to UE's implementation.

In one embodiment, the spatial RX parameter for LBT operation of PRACH can be omni-directional, or quasi-omni-directional, or directional (e.g., the intended spatial TX filter for PRACH transmission). In one sub-embodiment, the directionality of the spatial RX parameter for PRACH LBT can be different at different unlicensed band, such as omni-directional for sub-7 GHz NR-U, and quasi-omni-directional or directional for above-7 GHz NR-U. In another sub-embodiment, the directionality of the spatial RX parameter for PRACH LBT can be determined by UE implementation.

Another design consideration regarding frequency domain bandwidth over which NR-U PRACH LBT is performed. In one embodiment, the NR-U PRACH LBT can be performed over the initial UL bandwidth part (BWP) for each UE. In another embodiment, the NR-U PRACH LBT can be performed over the entire UL system bandwidth. In another embodiment, NR-U PRACH LBT can be performed over the nominal channel bandwidth of the unlicensed band, which may be defined in below. In yet another embodiment, NR-U PRACH LBT can be performed over the frequency resource over which the PRACH may be transmitted within the UL BWP; this option can increase the multiplexing capacity of PRACH.

In the present disclosure, methods to successfully apply random access process (RACH procedure) in unlicensed bands in consideration of timing advance value are disclosed. In addition, given the requirement of LBT behavior, reduced step RACH, i.e. two-step RACH is considered. Again, two-step RACH comprises msg. A transmission from UEs and msg. B transmission from gNB, where msg. A is the focus of the present disclosure. Msg. A comprises preamble transmission and uplink data transmission(PUSCH), and the resource where a preamble can be transmitted is called RO (RACH occasion) and the resource where the uplink data (PUSCH) can be transmitted is called PO (PUSCH Occasion) in the present disclosure, for ease of description.

However, the uplink data to be transmitted in a msg. A is not limited to PUSCH but is extendable to cover any type of uplink channel a UE wishes to send in a random-access phase to a network including physical uplink control channel and physical uplink side link channels. There can be multiple of ROs and POs in a cell.

In one embodiment, PRACH preamble format and $T_{gap}$ for msg. A in unlicensed bands is provided.

Figure 23A:
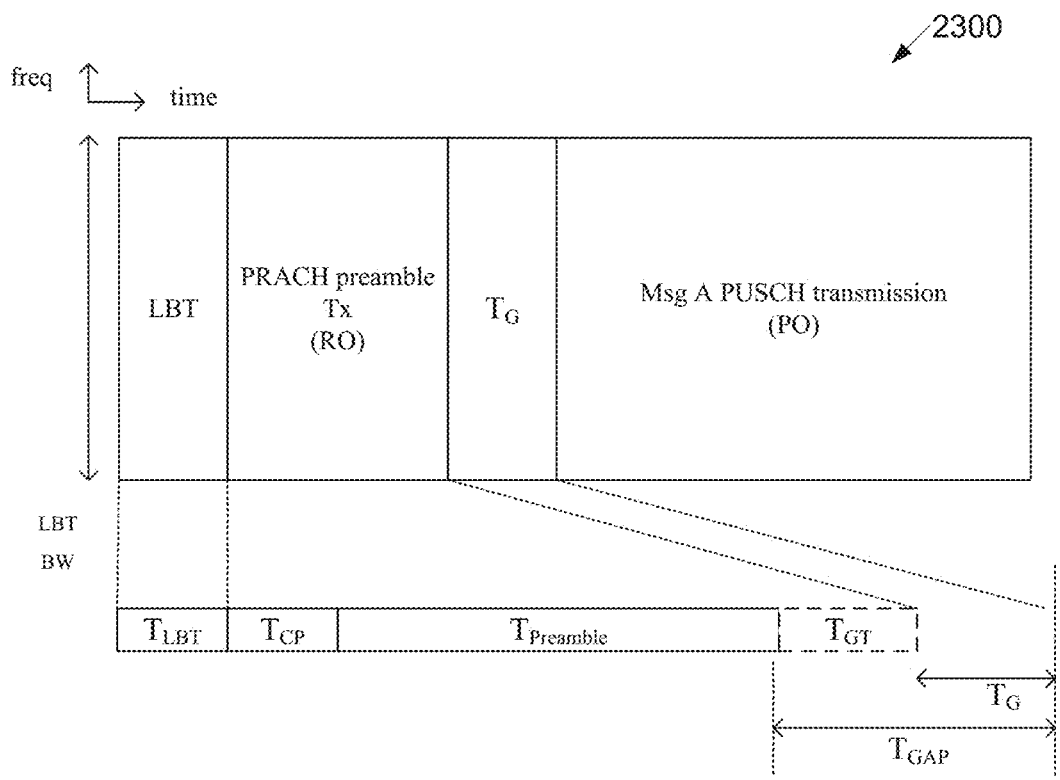
FIG. 23A illustrates an example timing gap between RO and PO for two-step RACH according to embodiments of the present disclosure.

FIG. 23A illustrates an example timing gap 2300 between RO and PO for two-step RACH according to embodiments of the present disclosure. An embodiment of the timing gap 2300 shown in FIG. 23A is for illustration only. One or more of the components illustrated in FIG. 23A can be implemented in specialized circuitry configured to perform the noted functions or one or more of the components can be implemented by one or more processors executing instructions to perform the noted functions. Other embodiments are used without departing from the scope of the present disclosure.

Figure 23B:
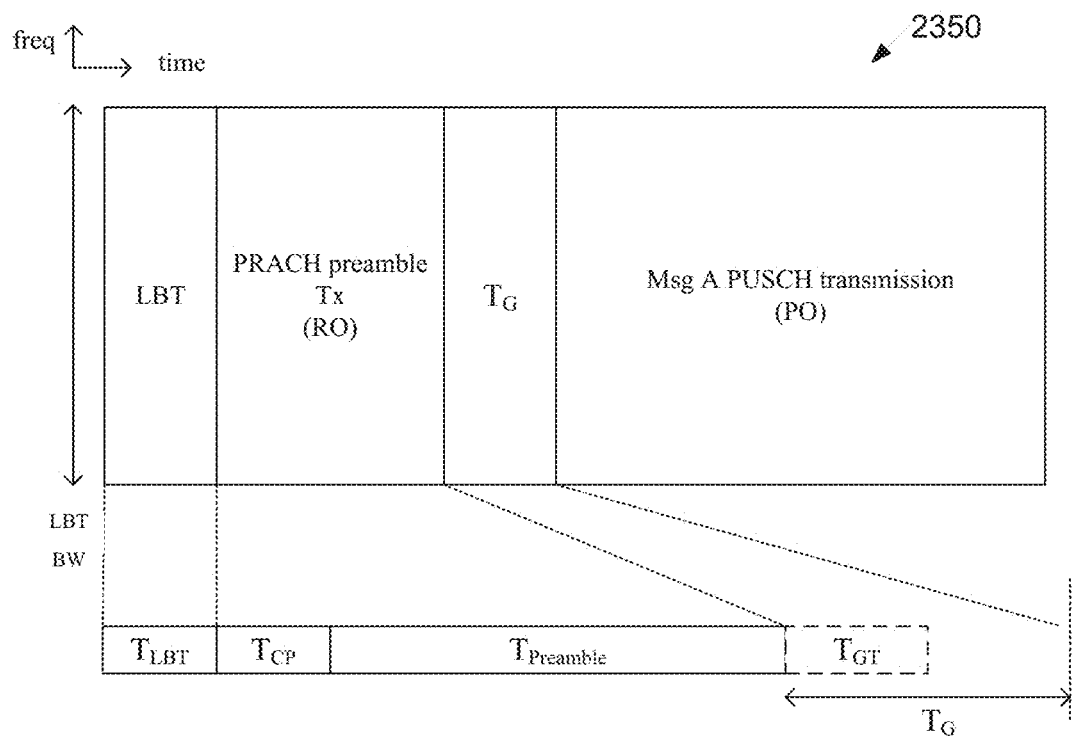
FIG. 23B illustrates an example timing gap between RO and PO for two-step RACH according to embodiments of the present disclosure.

FIG. 23B illustrates an example timing gap 2350 between RO and PO for two-step RACH according to embodiments of the present disclosure. An embodiment of the timing gap 2350 shown in FIG. 23B is for illustration only. One or more of the components illustrated in FIG. 23B can be implemented in specialized circuitry configured to perform the noted functions or one or more of the components can be implemented by one or more processors executing instructions to perform the noted functions. Other embodiments are used without departing from the scope of the present disclosure.

Enabling a msg. A PUSCH transmission without LBT can be supported for two-step RACH in NR-U, otherwise the benefit of the two-step RACH may degrade since it may spend similar amount of time as much as required by the four-step RACH. Hence, the msg. A PUSCH can be transmitted right after PRACH preamble transmission on the RO with minimum required timing gap. FIGS. 23A and 23B illustrate a placement of PRACH preamble and msg. A PUSCH transmission in time domain.

For the PRACH preamble format, the PRACH preamble can have a time gap for LBT($T_{LBT}$) before UE to transmit PRACH preamble and cyclic prefix (CP), preamble and guard time (GT). CP is determined by the supporting cell coverage and preamble length is selected by the gNB, both of them can be specified in the specification. The GT is placed to protect following uplink data so that the PRACH preamble does not interfere PUSCH starting at the end of RACH preamble transmission. The UE attempting random access mutes during the time of GT and GT may not explicitly exist depending on the preamble format and/or location of RO in a slot by the NR specification. When the adjacent symbol is allocated for PRACH preamble transmission, the GT is not needed since CP of the preamble next symbol acts as a GT. This is the design principle of PRACH preamble format A/B in 3GPP NR.

Therefore, a network can configure timing gap ($T_G$) at the end of RO for two-step RACH to protect following PUSCH transmissions from the interference of PRACH preambles. If a GT ($T_{GT}$) of a selected preamble format is sufficient to protect the following PUSCH transmission, $T_G$ can be set to zero. On the other hand, additional timing gap other than the GT($T_{GT}$) of a preamble is needed when: a UE changes subcarrier spacing for msg. A transmission different than that of preamble transmission; and/or a UE changes a waveform for msg A PUSCH transmission different than that of preamble transmission.

While, the timing gap $T_G$ and GT($T_{GT}$) are the time duration where no uplink signal is transmitted, which possibly allows other devices occupy the channel if the devices determines the channel is empty resulting in blockage or failure of msg. A PUSCH transmission. Therefore, the total sum time ($T_{GAP}$ in FIGS. 23A and 23B) of GT($T_{GT}$) and $T_G$ can be small enough so that other devices cannot determine the channel is empty while supporting the intended functionalities, interference avoidance to msg. A PUSCH and allowing msg. A PUSCH preparation time. The value of $T_G$ or $T_{GAP}$ is configurable by the network signaling.

In the following, how to set and signaling the value of $T_G$ or $T_{GAP}$ are described.

In one embodiment as illustrated in FIG. 23A, assuming that signaled preamble formats for the RO may or may not have time for GT($T_{GT}$), which is not explicitly indicated, network signals the value of $T_G$ which can be set to zero. $T_G$ is calculated from the end of preamble format considering the GT as well. The signaled preamble format can be any of format A, B or C in the 3GPP NR specification, and for format A, GT($T_{GT}$) can be zero. $T_G$ indicates when a starting time for msg. A PUSCH transmission at the end of PRACH preamble transmission. Having the signaled value of $T_G$, a UE counts when to start msg. A PUSCH transmission based on the value. At the same time, it can be guaranteed that the total timing gap $T_{GAP}$ does not allow other devices decide the channel is empty.

In one embodiment as illustrated in FIG. 23B, in order not to cause any mismatches among UEs and a gNB, the gNB provides $T_G$ value which includes GT($T_{GT}$) of preamble format so that UE can start msg. A PUSCH transmission with the timing gap $T_G$ from the end of PRACH preamble transmission. The UEs doesn't need to care about GT($T_{GT}$) of the preamble and also it can be guaranteed that the timing gap $T_G$ does not allow other devices decide the channel is empty.

In one embodiment, timing advanced value impact to the LBT results from PRACH preamble is provide.

UEs who have completed a random-access procedure is indicated by the network about timing advance, the amount of time the UE has to adjust when the UE transmits uplink data. The timing advanced value is in general provided during the random-access procedure, i.e. the timing advanced value is included in the msg.2 (e.g., random access response) in the four-step RACH. In other words, uplink transmission timing adjustment is not applied for random access preamble and msg. A PUSCH transmission during RACH procedure.

FIG. 24 illustrates an example RACH preamble transmission interferes 2400 according to embodiments of the present disclosure. An embodiment of the RACH preamble transmission interferes 2400 shown in FIG. 24 is for illustration only. One or more of the components illustrated in FIG. 24 can be implemented in specialized circuitry configured to perform the noted functions or one or more of the components can be implemented by one or more processors executing instructions to perform the noted functions. Other embodiments are used without departing from the scope of the present disclosure.

FIG. 24 depicts potential interference of RACH preamble to the following UE's LBT performance. In a licensed band, a guard time (GT) can be inserted to protect the following adjacent PUSCH transmission and the GT works well with the GT at the end of PRACH preamble and CP of the PUSCH symbol. However, for the operation of an unlicensed band where LBT is required, only having GT at the end of PRACH preamble and CP in front of the PUSCH symbol in the following slot may not be the remedy for UEs transmitting PUSCH/PUCCH in a right next slot after RACH to cope with the interference since the minimum time duration of LBT is much larger, which means that additional time for UEs who attempted RACH to mute at the end of the slots where ROs are located.

In other words, the network can make sure to assign muting period at the end of the last RO in a slot, which is adjacent to the next slot or next scheduled PUSCH/PUCCH transmission. If the slot where ROs are located is adjacent to another slot starting with RO, no additional muting period or timing gap assignment is needed.

FIG. 25 illustrates an example placing muting time (GAP) 2500 according to embodiments of the present disclosure. An embodiment of the placing muting time (GAP) 2500 shown in FIG. 25 is for illustration only. One or more of the components illustrated in FIG. 25 can be implemented in specialized circuitry configured to perform the noted functions or one or more of the components can be implemented by one or more processors executing instructions to perform the noted functions. Other embodiments are used without departing from the scope of the present disclosure.

FIG. 25 illustrates configuration of a timing gap at the end of a slot, (for example, overlapping with the last RO in a slot), wherein the timing gap also refers to the muting time in the figure (e.g., $T_M$). During the period of muting time, UEs attempting random access are not allowed to transmit any signal. In one consideration, the provided embodiment and/or example in this disclosure may not be limited to apply only in two step RACH but can be applicable for general random-access procedure in an unlicensed band.

In one embodiment, timing advanced value impact to the LBT results from msg. A transmission is provided.

Figure 26:
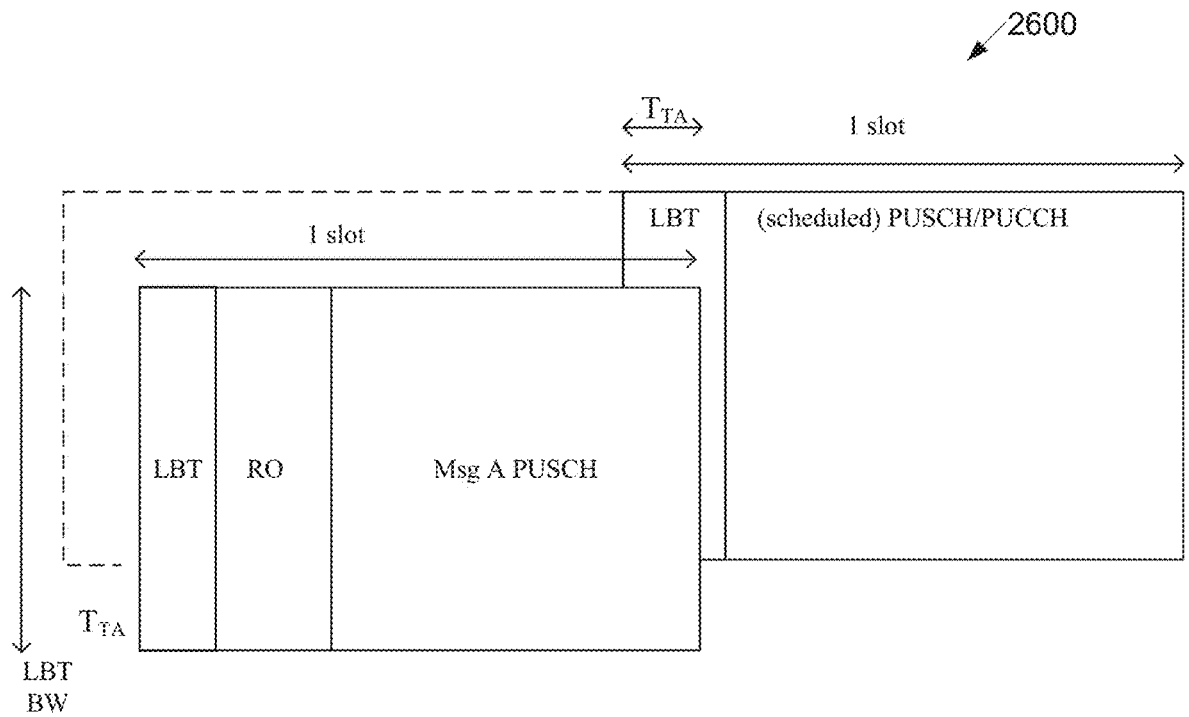
FIG. 26 illustrates an example PUSCH transmission interferes according to embodiments of the present disclosure.

FIG. 26 illustrates an example PUSCH transmission interferes 2600 according to embodiments of the present disclosure. An embodiment of the PUSCH transmission interferes 2600 shown in FIG. 26 is for illustration only. One or more of the components illustrated in FIG. 26 can be implemented in specialized circuitry configured to perform the noted functions or one or more of the components can be implemented by one or more processors executing instructions to perform the noted functions. Other embodiments are used without departing from the scope of the present disclosure.

FIG. 26 illustrates Msg. A PUSCH transmission interferes the LBT performance of the scheduled PUSCH/PUCCH right next to the PO.

Due to the same reason that msg. A PUSCH is transmitted without applying timing advanced value, the msg. A PUSCH may interfere the LBT performance of the following PUSCH/PUCCH transmission scheduled on right next to the msg. A PUSCH transmission as illustrated in FIG. 26.

Setting of muting time at the end of msg. A PUSCH can be supported for UEs who attempts msg. A PUSCH transmission. In other words, the network can make sure to assign muting period at the end of the msg. A PUSCH, which is adjacent to the next slot or next scheduled PUSCH/PUCCH transmission. If the slot where RO and POs are located is adjacent to another slot starting with RO and/or PO, no additional muting period or timing gap assignment is needed.

Figure 27:
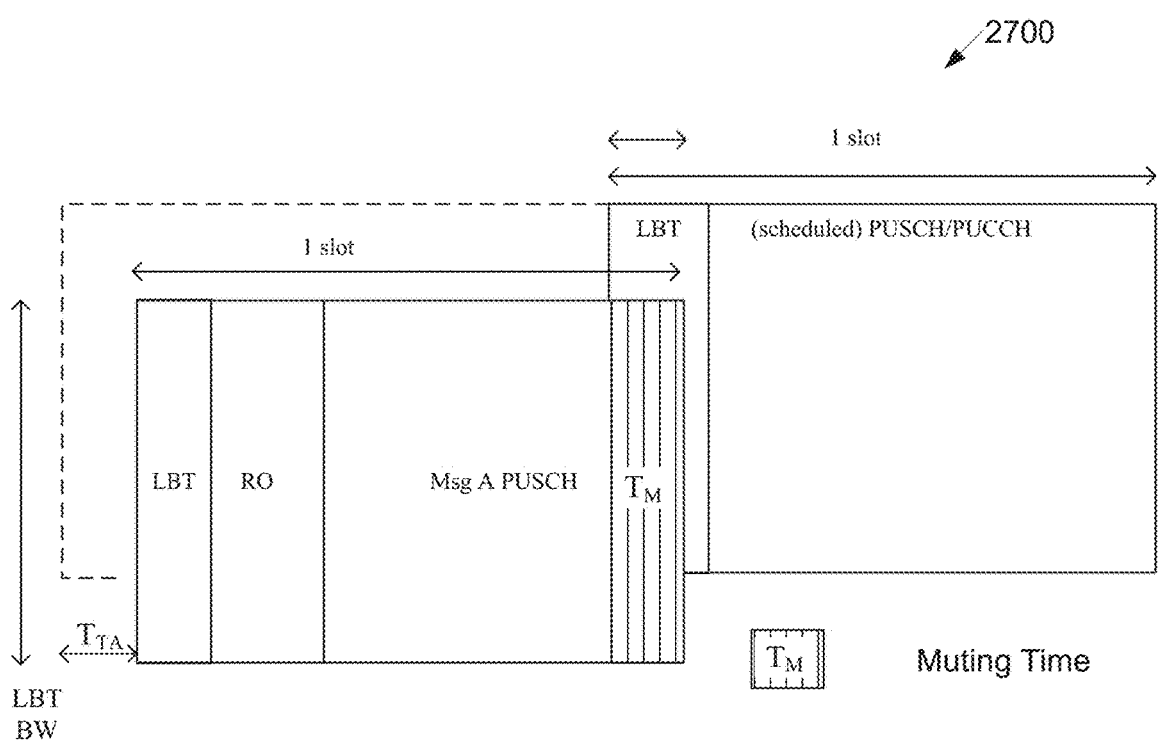
FIG. 27 illustrates an example placing muting period (GAP) according to embodiments of the present disclosure.

FIG. 27 illustrates an example placing muting period (GAP) 2700 according to embodiments of the present disclosure. An embodiment of the placing muting period (GAP) 2700 shown in FIG. 27 is for illustration only. One or more of the components illustrated in FIG. 27 can be implemented in specialized circuitry configured to perform the noted functions or one or more of the components can be implemented by one or more processors executing instructions to perform the noted functions. Other embodiments are used without departing from the scope of the present disclosure.

FIG. 27 shows a configuration of muting time at the end of the last RO in a slot. During the period of muting, UEs attempting random access are not allowed to transmit any signal.

In one embodiment, setting the value of $T_M$, duration for muting in relation to LBT operation is provided.

Value of $T_{TA}$ is decided depending on the cell coverage and the value is different per UE based on the location and/or distance from the serving gNB. Also, the value of $T_M$ needs to be decided considering the maximum value of $T_{TA}$ among UEs in the cell. In order not to block other UE's channel access, one approach of setting $T_M$ can be as follows: $T_M = \max\{T_{TA}, T_{LBT}\}$ where $T_{TA} = \max_{i=0}^{N} T_{TA,i}$, $T_{LBT} = \max_{i=0}^{N} T_{LBT,i}$, and where N is number of UEs in a cell, and $T_{TA,i}$ and $T_{LBT,i}$ are timing advance value and LBT time of UE i.

The above way of setting $T_M$ is very conservative to protect scheduled PUSCH/PUCCH transmission and can cause an inefficient resource utilization. On the other hands, for the efficient utilization of wireless resources, LBT requirements can be utilized by the regulation/specification.

Figure 28:
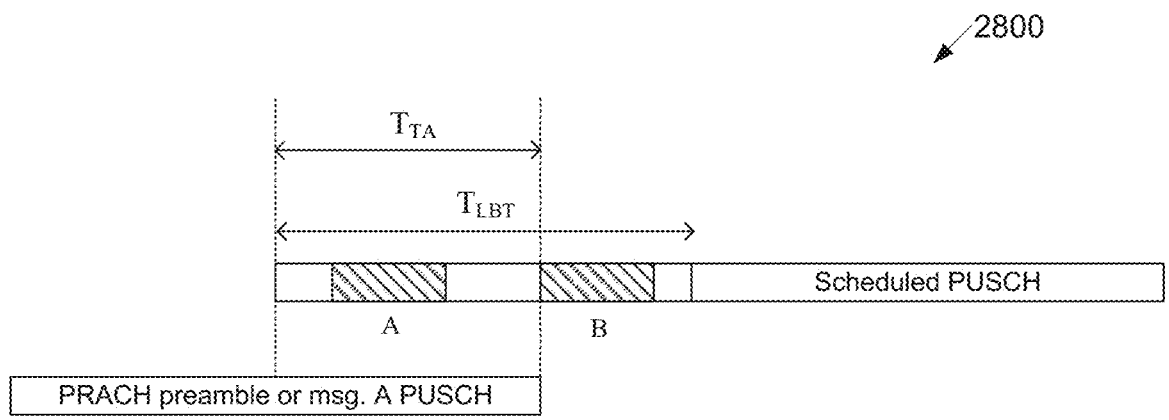
FIG. 28 illustrates an example scheduled PUSCH transmission according to embodiments of the present disclosure.

In the current specification/regulation, a UE performs LBT during the time of LBT ($T_{LBT}$) and measure/accumulate detected energy level for a certain duration of time at the front and rear part of LBT duration, which are depicted A and B in FIG. 28.

FIG. 28 illustrates an example scheduled PUSCH transmission 2800 according to embodiments of the present disclosure. An embodiment of the scheduled PUSCH transmission 2800 shown in FIG. 28 is for illustration only. One or more of the components illustrated in FIG. 28 can be implemented in specialized circuitry configured to perform the noted functions or one or more of the components can be implemented by one or more processors executing instructions to perform the noted functions. Other embodiments are used without departing from the scope of the present disclosure.

For example, this can be utilized when the scheduled PUSCH transmission can share a gNB-initiated channel occupancy time, such that the UE can transmit the scheduled PUSCH subject to a CAT-2 LBT with deterministic duration (e.g., $T_{LBT}$ in FIG. 28). Which result of energy level detected to use for LBT result (detected energy in A or B) level is up to the UE implementation.

In the present disclosure, however, instead of leaving the selection up to UE implementation, a UE is required to use a specific part of LBT duration to gather detected energy level: by signaling from a gNB which part to use, for example front or rear part (preferably rear part); or by the specification that a UE can use rear part when a UE needs to perform LBT for uplink transmission (PUSCH and/or PUCCH) right after RO or PO.

In the following, how to set the value of $T_M$ minimizing resource inefficiency is disclosed. $T_M$ can be set to zero or very small if: the starting position of second part of energy detection period, e.g., B in FIG. 28 is later than $T_{TA}$, in other words, $T_{TA}$ is equal or smaller that the starting position of B within the LBT duration; and/or the UE is enforced to gather/detect energy of other signals on the second part, e.g., B in FIG. 28.

Figure 29:
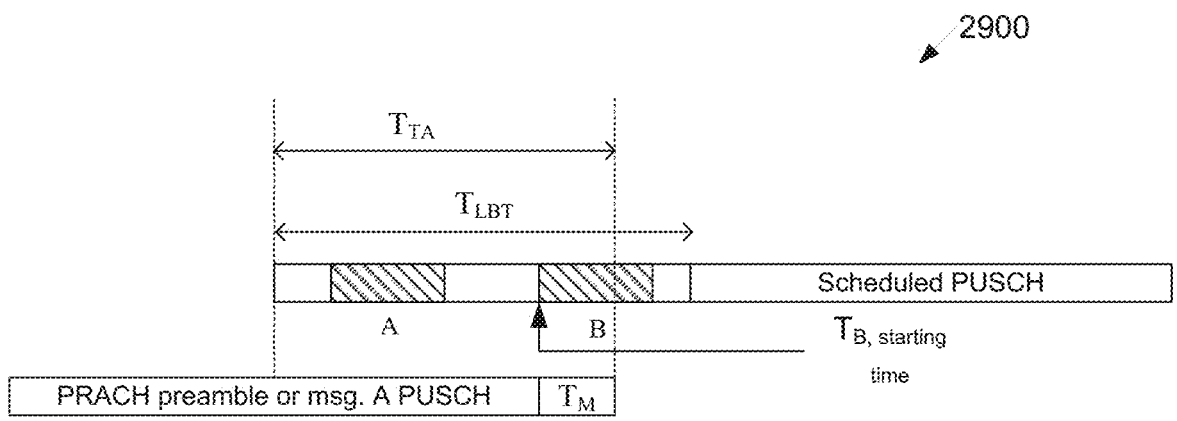
FIG. 29 illustrates another example scheduled PUSCH transmission according to embodiments of the present disclosure.

FIG. 29 illustrates another example scheduled PUSCH transmission 2900 according to embodiments of the present disclosure. An embodiment of the scheduled PUSCH transmission 2900 shown in FIG. 29 is for illustration only. One or more of the components illustrated in FIG. 29 can be implemented in specialized circuitry configured to perform the noted functions or one or more of the components can be implemented by one or more processors executing instructions to perform the noted functions. Other embodiments are used without departing from the scope of the present disclosure.

Otherwise, if $T_{TA}$ is such large as in FIG. 29, a gNB can set time duration for muting time, $T_M$ as non-zero in order to protect LBT performance of the (scheduled) PUSCH/PUCCH transmission on the next slot. The amount of time for muting can be minimized if the UE is enforced to gather/detect energy of other signals only on the second part, e.g., B in FIG. 29. Then, $T_M \geq T_A - T_{B,starting\ time}$ In one embodiment, an LBT bandwidth is much larger than preamble/data transmission bandwidth.

In the current NR-U discussion and wireless system in the unlicensed band, the bandwidth for LBT (or CCA) and the transmission bandwidth are the same or similar. For example, in 802.11n/ac WLAN systems, all stations perform CCA at least over the 20 MHz and their data transmission bandwidth is in the unit of 20 MHz so there is no discrepancy between the CCA bandwidth and data transmission bandwidth. On the other hand, cellular systems use dynamic resource allocation and adaptation and UEs share the whole system bandwidth so that a UE may transmit a portion of the system bandwidth.

Considering this, a UE behavior in NR-UE can be further clarified especially on the very high frequencies such as over 60 GHz. It might be hard to justify that the NR-U UE performs LBT over only small portion of bandwidth for the protection of the existing incumbent signals or for the co-existence with WiFi devices.

At the same time, an NR-U system can be still based on the NR utilizing dynamic MCS/bandwidth adaptation and PRACH preamble and/or msg. A PUSCH may not occupy over the whole minimum LBT bandwidth. In other words, (scheduled) PUSCH/PUCCH and RO/PO can be FDMed within the system bandwidth/LBT bandwidth.

Figure 30:
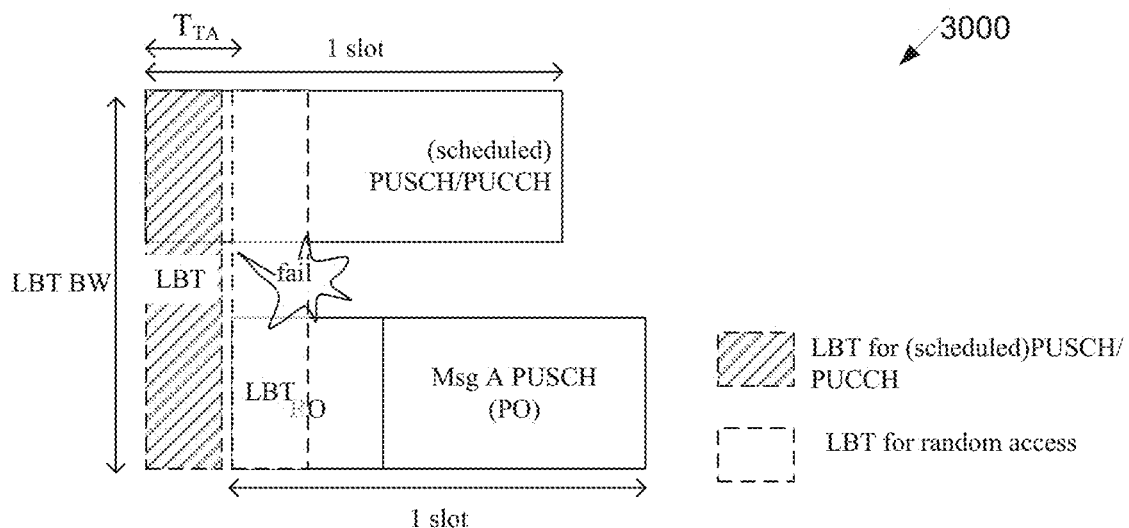
FIG. 30 illustrates yet another example scheduled PUSCH transmission according to embodiments of the present disclosure.

In such environment, TA adjustment of connected UEs' uplink transmission potentially blocks channel access for UEs who want to attempt random access, as shown in FIG. 30.

FIG. 30 illustrates yet another example scheduled PUSCH transmission 3000 according to embodiments of the present disclosure. An embodiment of the scheduled PUSCH transmission 3000 shown in FIG. 30 is for illustration only. One or more of the components illustrated in FIG. 30 can be implemented in specialized circuitry configured to perform the noted functions or one or more of the components can be implemented by one or more processors executing instructions to perform the noted functions. Other embodiments are used without departing from the scope of the present disclosure.

Even though resources for uplink data and random-access transmission are FDMed, timing advanced PUSCH/PUCCH transmission on the disjoint frequency resource with RO/PO affects LBT performance of random-access channels since random access UEs also need to perform LBT over larger bandwidth than that of preamble/msg. A PUSCH.

Figure 31:
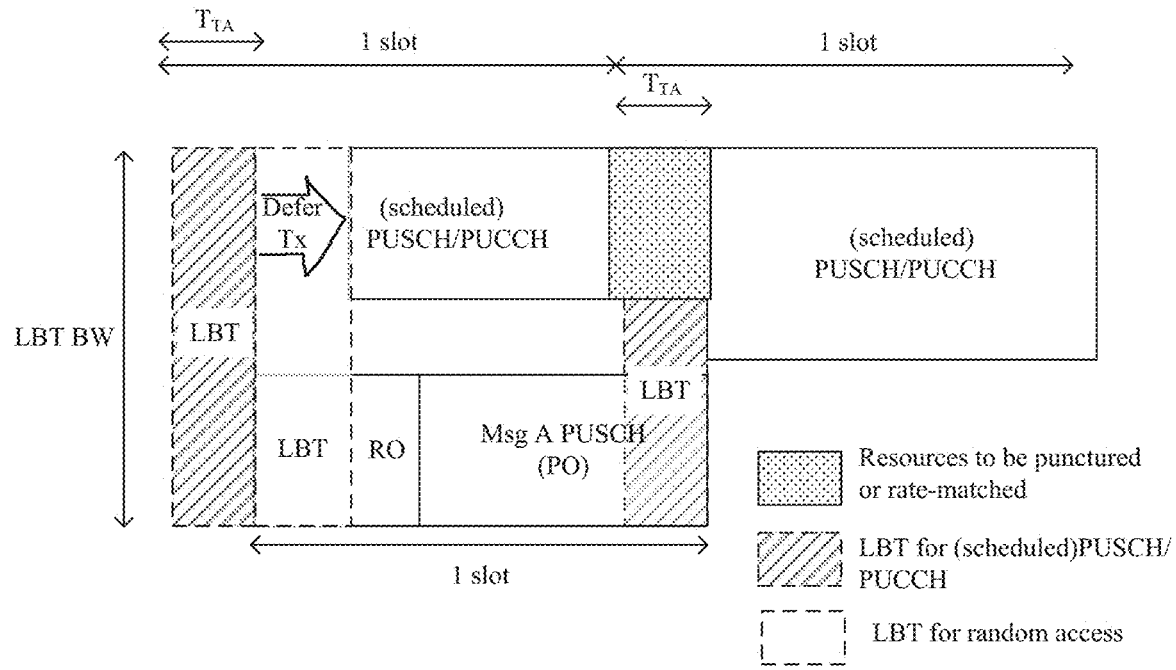
FIG. 31 illustrates yet another example scheduled PUSCH transmission according to embodiments of the present disclosure.
Figure 32:
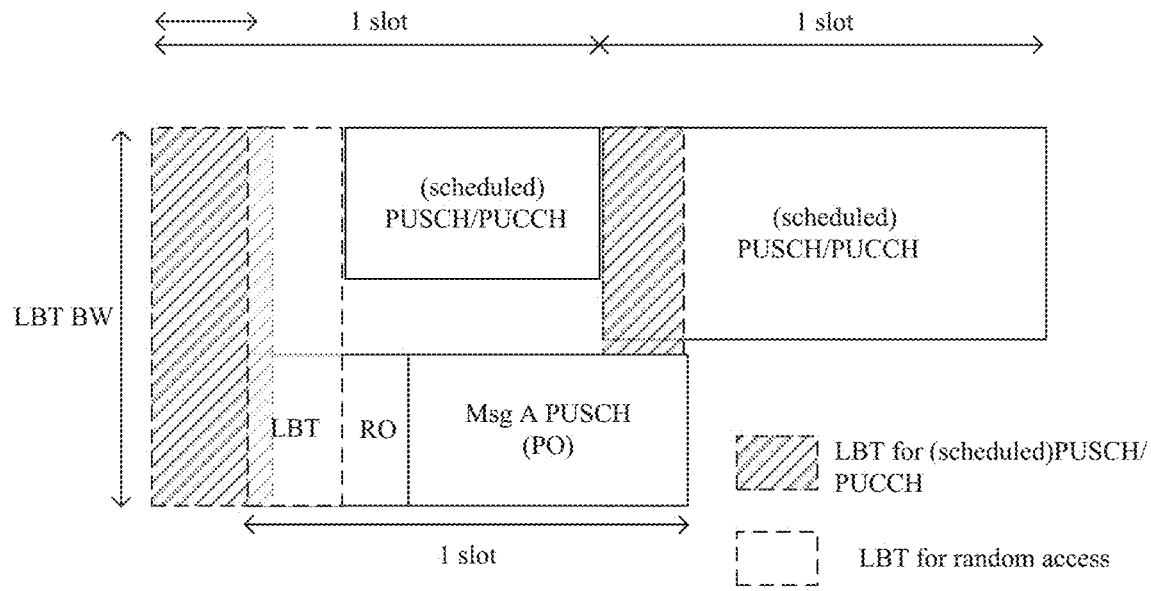
FIG. 32 illustrates yet another example scheduled PUSCH transmission according to embodiments of the present disclosure.

Potential solutions are disclosed in the following by either deferring transmission of scheduled or extending LBT of the PUSCH/PUCCH transmission as shown in FIG. 31 and FIG. 32.

FIG. 31 illustrates yet another example scheduled PUSCH transmission 3100 according to embodiments of the present disclosure. An embodiment of the scheduled PUSCH transmission 3100 shown in FIG. 31 is for illustration only. One or more of the components illustrated in FIG. 31 can be implemented in specialized circuitry configured to perform the noted functions or one or more of the components can be implemented by one or more processors executing instructions to perform the noted functions. Other embodiments are used without departing from the scope of the present disclosure.

FIG. 32 illustrates yet another example scheduled PUSCH transmission 3200 according to embodiments of the present disclosure. An embodiment of the scheduled PUSCH transmission 3200 shown in FIG. 32 is for illustration only. One or more of the components illustrated in FIG. 32 can be implemented in specialized circuitry configured to perform the noted functions or one or more of the components can be implemented by one or more processors executing instructions to perform the noted functions. Other embodiments are used without departing from the scope of the present disclosure.

One embodiment is shown in FIG. 31, deferring uplink transmission. Since every UEs have information on the RO and PO resource allocation and when a UE is scheduled in a FDM manner with the RO/PO, the scheduled UE can defer an uplink transmission until random access UEs finish the LBT and start transmission right after at the end of the LBT for random access. When a UE defers a transmission, the resources can be punctured or rate matched as much as amount of time deferred as in FIG. 31.

Another embodiment is described in FIG. 32, (scheduled) PUSCH/PUCCH resource can be muted while random access UEs perform LBT and then start transmission at the end of the LBT. Alternatively, the UEs scheduled for transmission of PUSCH/PUCCH which are co-scheduled with RO/PO with FDM manner can be signaled to perform LBT for a longer duration till random access UEs finishes their LBT.

In one embodiment, in case LBT bandwidth and PRACH preamble bandwidth are the same, and the transmission bandwidth for msg A PUSCH is smaller than the PRACH preamble transmission bandwidth.

Unlicensed spectrum over at very high frequencies such as over 60 GHz frequencies maybe ready for release in near future and as the carrier frequency goes high, subcarrier spacing can be larger due to short coherence time at the higher frequency ranges. 3GPP NR standard specification has defined 60 kHz and 120 kHz subcarrier spacing for higher carrier frequencies and thee higher carrier frequencies can be applied not only for data transmission but also for PRACH preamble transmission. Assuming 60 kHz subcarrier spacing with length 139 with four times of repetition, then the preamble transmission bandwidth becomes 33.360 MHz which is approximately 48 RBs with 60 kHz subcarrier spacing.

Transmission of PRACH preamble over a such larger bandwidth is to satisfy regulation as mentioned above, to occupy a certain amount of resources, however allocation of 48RBs for msg. A PUSCH transmission can be hard to justify because the resources can be shared by anonymous multiple UEs, the modulation and coding rate can be highly limited and the receiver (gNB) may need to (partially) blindly detect/decode the received signals. Therefore, it may not be a good choice to allocate large size of bandwidth for msg. A PUSCH transmission but can be limited.

On the other hand, to fully utilize the reduced steps of RACH procedure, msg. A PUSCH can be transmitted right after the preconfigured timing gap, $T_G$ after PRACH preamble transmission. If this msg. A PUSCH transmission coincides with LBT for (scheduled)PUSCH/PUCH, the msg. A PUSCH transmission may block the scheduled PUSCH/PUCCH UEs transmissions as illustrated in FIG. 33.

Figure 33:
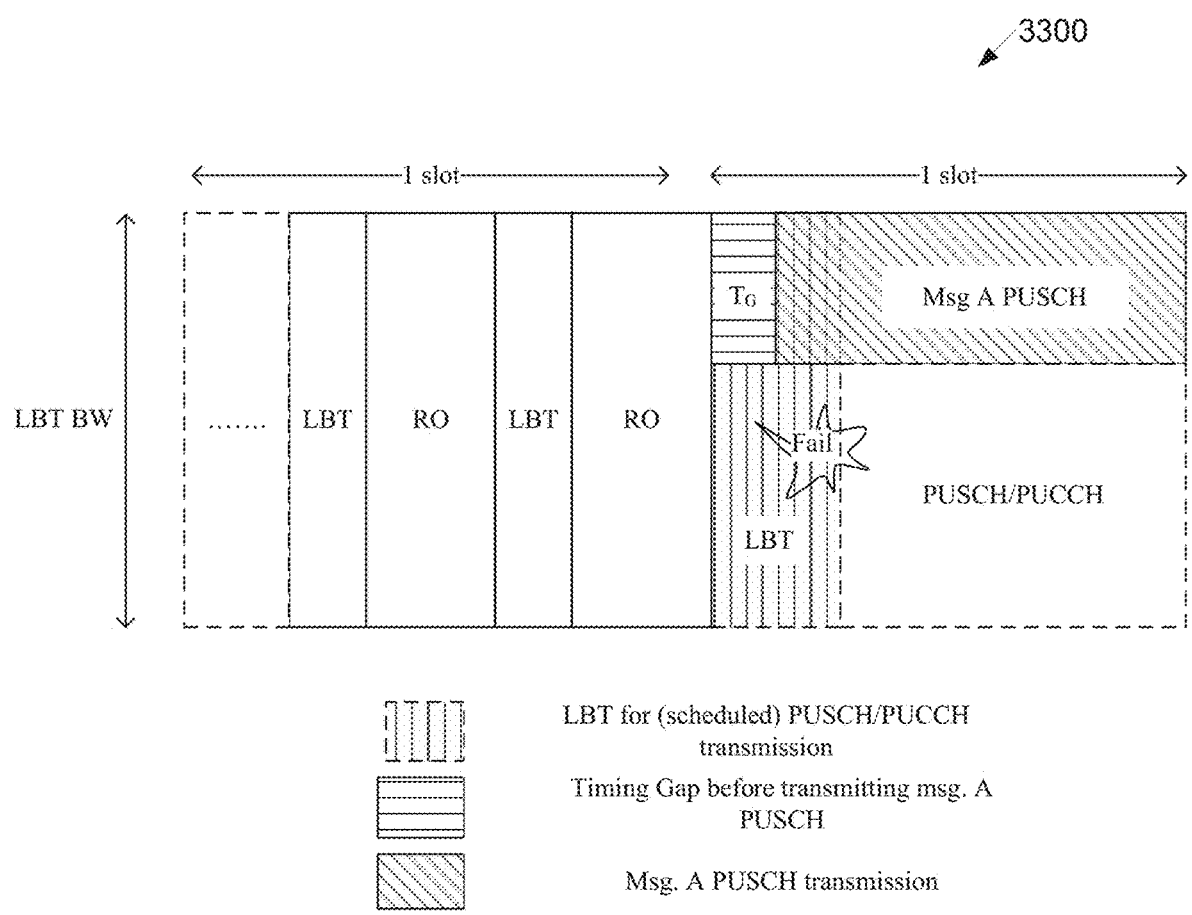
FIG. 33 illustrates yet another example scheduled PUSCH transmission according to embodiments of the present disclosure.

FIG. 33 illustrates yet another example scheduled PUSCH transmission 3300 according to embodiments of the present disclosure. An embodiment of the scheduled PUSCH transmission 3300 shown in FIG. 33 is for illustration only. One or more of the components illustrated in FIG. 33 can be implemented in specialized circuitry configured to perform the noted functions or one or more of the components can be implemented by one or more processors executing instructions to perform the noted functions. Other embodiments are used without departing from the scope of the present disclosure.

Therefore, at least at a slot or timing instances where msg. A PUSCH and scheduled PUSCH/PUCCH can be multiplexed, LBT type or LBT duration for a scheduled PUSCH/PUCCH transmission can be set differently than on other slots, which can be separately set and signaled as a part of system information so that the duration can be equal or smaller than the timing gap, $T_G$.

In one embodiment, signaling or enforcement is provided for the scheduled UEs to measure the energy/interference level on the front side of LBT duration, which can be fit in the time duration of $T_G$. This information can also be signaled as a part of system information.

Figure 34:
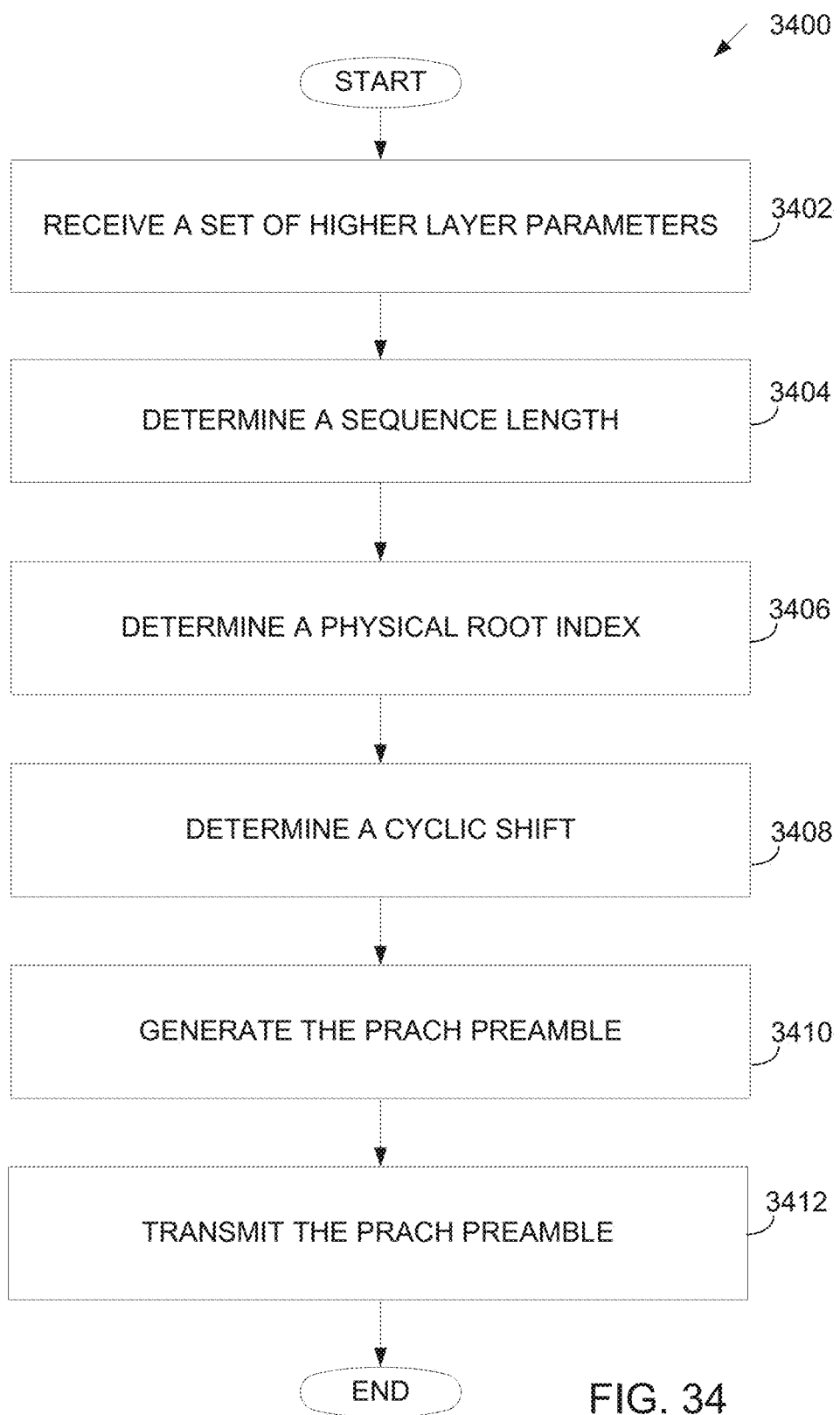
FIG. 34 illustrates a flow chart of a method for wideband PRACH configuration according to embodiments of the present disclosure.

FIG. 34 illustrates a flow chart of a method 3400 for wideband PRACH configuration for NR unlicensed according to embodiments of the present disclosure, as may be performed by a UE (e.g., 111-116 as illustrated in FIG. 1). An embodiment of the method 3400 shown in FIG. 34 is for illustration only. One or more of the components illustrated in FIG. 34 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 34, the method 3400 begins at step 3402. In step 3402, a UE receives, from a base station (BS), a set of higher layer parameters including a subcarrier spacing of a physical random access channel (PRACH) preamble, a logical root index ($i_{log}$) for the PRACH preamble, and an index (zeroCorrelationZoneConfg).

In one embodiment, the set of higher layer parameters further includes information to configure a gap for performing listen-before-talk (LBT) process before a transmission of the PRACH preamble and the gap for performing LBT process is determined as a RACH occasion with an even index, and the transmission of the PRACH preamble is transmitted in a next RACH occasion with an odd index.

Subsequently, in step 3404, the UE determines a sequence length ($L_{RA}$) for the PRACH preamble based on the subcarrier spacing of the PRACH preamble.

In one embodiment, the sequence length ($L_{RA}$) is set to 1151 when the subcarrier spacing of the PRACH preamble is 15 kHz; and the sequence length ($L_{RA}$) is set to 571 when the subcarrier spacing of the PRACH preamble is 30 kHz.

In such embodiment, when the $L_{RA}$=1171, the cyclic shift ($N_{cs}$) is determined as: $N_{CS}$=0, when the index (zeroCorrelationZoneConfg) is 0; $N_{CS}$=17, when the index (zeroCorrelationZoneConfg) is 1; $N_{CS}$=20, when the index (zeroCorrelationZoneConfg) is 2; $N_{CS}$=25, when the index (zeroCorrelationZoneConfg) is 3; $N_{CS}$=30, when the index (zeroCorrelationZoneConfg) is 4; $N_{CS}$=35, when the index (zeroCorrelationZoneConfg) is 5; $N_{CS}$=44, when the index (zeroCorrelationZoneConfg) is 6; $N_{CS}$=52, when the index (zeroCorrelationZoneConfg) is 7; $N_{CS}$=63, when the index (zeroCorrelationZoneConfg) is 8; $N_{CS}$=82, when the index (zeroCorrelationZoneConfg) is 9; $N_{CS}$=104, when the index (zeroCorrelationZoneConfg) is 10; $N_{CS}$=127, when the index (zeroCorrelationZoneConfg) is 11; $N_{CS}$=164, when the index (zeroCorrelationZoneConfg) is 12; $N_{CS}$=230, when the index (zeroCorrelationZoneConfg) is 13; $N_{CS}$=383, when the index (zeroCorrelationZoneConfg) is 14; and $N_{CS}$=575, when the index (zeroCorrelationZoneConfg) is 15.

In such embodiment, when $L_{RA}$=571, the cyclic shift $N_{CS}$ is determined as: $N_{CS}$=0, when the index (zeroCorrelationZoneConfg) is 0; $N_{CS}$=8, when the index (zeroCorrelationZoneConfg) is 1; $N_{CS}$=10, when the index (zeroCorrelationZoneConfg) is 2; $N_{CS}$=12, when the index (zeroCorrelationZoneConfg) is 3; $N_{CS}$=15, when the index (zeroCorrelationZoneConfg) is 4; $N_{CS}$=17, when the index (zeroCorrelationZoneConfg) is 5; $N_{CS}$=21, when the index (zeroCorrelationZoneConfg) is 6; $N_{CS}$=25, when the index (zeroCorrelationZoneConfg) is 7; $N_{CS}$=31, when the index (zeroCorrelationZoneConfg) is 8; $N_{CS}$=40, when the index (zeroCorrelationZoneConfg) is 9; $N_{CS}$=51, when the index (zeroCorrelationZoneConfg) is 10; $N_{CS}$=63, when the index (zeroCorrelationZoneConfg) is 11; $N_{CS}$=81, when the index (zeroCorrelationZoneConfg) is 12; $N_{CS}$=114, when the index (zeroCorrelationZoneConfg) is 13; $N_{CS}$=190, when the index (zeroCorrelationZoneConfg) is 14; and $N_{CS}$=285, when the index (zeroCorrelationZoneConfg) is 15.

Subsequently, in step 3406, the UE determines a physical root index ($i_{phy}$) for the PRACH preamble based on the logical root index ($i_{log}$).

In one embodiment, the physical root index ($i_{phy}$) is determined as $i_{phy}$=i+1 for the logical root index $i_{log}$=2·i and the physical root index ($i_{phy}$) is determined as $i_{phy}$=$L_{RA}$-i-1 for the logical root index $i_{log}$=2·i+1, where 0≤i≤($L_{RA}$-1)/2-1.

Subsequently, in step 3408, the UE determines a cyclic shift ($N_{CS}$) for the PRACH preamble based on the index (zeroCorrelationZoneConfg).

Next, in step 3410, the UE generates the PRACH preamble based on the determined sequence length $L_{RA}$, the determined physical root index $i_{phy}$, and the determined cyclic shift $N_{CS}$.

Finally, in step 3412, the UE transmits, to the base station (BS) over the shared spectrum channel, the PRACH preamble.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined only by the claims.

What is claimed is:

1. A user equipment (UE) in a wireless communication system supporting a shared spectrum channel access, the UE comprising:
a transceiver configured to:
receive, from a base station (BS), a set of higher layer parameters including:
a subcarrier spacing of a physical random access channel (PRACH) preamble,
a logical root index ($i_{log}$) for the PRACH preamble, and
an index (zeroCorrelationZoneConfg); and
a processor operably connected to the transceiver, the processer configured to:
determine a sequence length ($L_{RA}$) for the PRACH preamble based on the subcarrier spacing of the PRACH preamble,
determine a physical root index ($i_{phy}$) for the PRACH preamble based on the logical root index ($i_{log}$) as $i_{phy}$=i+1 for the logical root index $i_{log}$=2·i and as $i_{phy}$=$L_{RA}$-i-1 for the logical root index $i_{log}$=2·i+1, where 0≥i≥($L_{RA}$-1)/2-1,
determine a cyclic shift ($N_{CS}$) for the PRACH preamble based on the index (zeroCorrelationZoneConfg), and
generate the PRACH preamble based on the determined sequence length $L_{RA}$, the determined physical root index $i_{phy}$, and the determined cyclic shift $N_{CS}$,
wherein the transceiver is further configured to transmit, to the base station (BS) over the shared spectrum channel, the PRACH preamble.

2. The UE of claim 1, wherein:
the sequence length ($L_{RA}$) is set to 1151 when the subcarrier spacing of the PRACH preamble is 15 kHz; and the sequence length ($L_{RA}$) is set to 571 when the subcarrier spacing of the PRACH preamble is 30 kHz.

3. The UE of claim 1, wherein when the $L_{RA}$=1171, the cyclic shift ($N_{CS}$) is determined as:
$N_{CS}$=0, when the index (zeroCorrelationZoneConfg) is 0;
$N_{CS}$=17, when the index (zeroCorrelationZoneConfg) is 1;
$N_{CS}$=20, when the index (zeroCorrelationZoneConfg) is 2;
$N_{CS}$=25, when the index (zeroCorrelationZoneConfg) is 3;
$N_{CS}$=30, when the index (zeroCorrelationZoneConfg) is 4;
$N_{CS}$=35, when the index (zeroCorrelationZoneConfg) is 5;
$N_{CS}$=44, when the index (zeroCorrelationZoneConfg) is 6;
$N_{CS}$=52, when the index (zeroCorrelationZoneConfg) is 7;
$N_{CS}$=63, when the index (zeroCorrelationZoneConfg) is 8;
$N_{CS}$=82, when the index (zeroCorrelationZoneConfg) is 9;
$N_{CS}$=104, when the index (zeroCorrelationZoneConfg) is 10;
$N_{CS}$=127, when the index (zeroCorrelationZoneConfg) is 11;
$N_{CS}$=164, when the index (zeroCorrelationZoneConfg) is 12;
$N_{CS}$=230, when the index (zeroCorrelationZoneConfg) is 13;
$N_{CS}$=383, when the index (zeroCorrelationZoneConfg) is 14; and
$N_{CS}$=575, when the index (zeroCorrelationZoneConfg) is 15.

4. The UE of claim 1, wherein when $L_{RA}$=571, the cyclic shift $N_{CS}$ is determined as:
$N_{CS}$=0, when the index (zeroCorrelationZoneConfg) is 0;
$N_{CS}$=8, when the index (zeroCorrelationZoneConfg) is 1;
$N_{CS}$=10, when the index (zeroCorrelationZoneConfg) is 2;
$N_{CS}$=12, when the index (zeroCorrelationZoneConfg) is 3;
$N_{CS}$=15, when the index (zeroCorrelationZoneConfg) is 4;
$N_{CS}$=17, when the index (zeroCorrelationZoneConfg) is 5;
$N_{CS}$=21, when the index (zeroCorrelationZoneConfg) is 6;
$N_{CS}$=25, when the index (zeroCorrelationZoneConfg) is 7;
$N_{CS}$=31, when the index (zeroCorrelationZoneConfg) is 8;
$N_{CS}$=40, when the index (zeroCorrelationZoneConfg) is 9;
$N_{CS}$=51, when the index (zeroCorrelationZoneConfg) is 10;
$N_{CS}$=63, when the index (zeroCorrelationZoneConfg) is 11;
$N_{CS}$=81, when the index (zeroCorrelationZoneConfg) is 12;
$N_{CS}$=114, when the index (zeroCorrelationZoneConfg) is 13;
$N_{CS}$=190, when the index (zeroCorrelationZoneConfg) is 14; and
$N_{CS}$=285, when the index (zeroCorrelationZoneConfg) is 15.

5. The UE of claim 1, wherein the set of higher layer parameters further includes information to configure a gap for performing listen-before-talk (LBT) process before the transmission of the PRACH preamble.

6. The UE of claim 5, wherein the gap for performing LBT process is determined as a RACH occasion with an even index, and the transmission of the PRACH preamble is transmitted in a next RACH occasion with an odd index.

7. A base station (BS) in a wireless communication system supporting a shared spectrum channel access, the BS comprising:
a processor configured to identify a set of higher layer parameters including a subcarrier spacing of a physical random access channel (PRACH) preamble, a logical root index ($i_{log}$) for the PRACH preamble, and an index (zeroCorrelationZoneConfg); and
a transceiver operably connected to the processor, the transceiver configured to:
transmit, to a user equipment (UE), the set of higher layer parameters; and
receive, from the UE over the shared spectrum channel, a PRACH preamble based on a sequence length $L_{RA}$, a physical root index $i_{phy}$, and a cyclic shift $N_{CS}$,
wherein:
the sequence length ($L_{RA}$) is determined for the PRACH preamble based on the subcarrier spacing of the PRACH preamble,
the physical root index ($i_{phy}$) is determined for the PRACH preamble based on the logical root index ($i_{log}$) as $i_{phy}=i+1$ for the logical root index $i_{log}=2\cdot i$ and as $i_{phy}=L_{RA}-i-1$ for the logical root index $i_{log}=2\cdot i+1$, where $0 \ge i \ge (L_{RA}-1)/2-1$, and
the cyclic shift ($N_{CS}$) is determined for the PRACH preamble based on the index (zeroCorrelationZoneConfg).

8. The BS of claim 7, wherein:
the sequence length ($L_{RA}$) is set to 1151 when the subcarrier spacing of the PRACH preamble is 15 kHz; and
the sequence length ($L_{RA}$) is set to 571 when the subcarrier spacing of the PRACH preamble is 30 kHz.

9. The BS of claim 7, wherein when the $L_{RA}=1171$, the cyclic shift ($N_{CS}$) is determined as:
$N_{CS}=0$, when the index (zeroCorrelationZoneConfg) is 0;
$N_{CS}=17$, when the index (zeroCorrelationZoneConfg) is 1;
$N_{CS}=20$, when the index (zeroCorrelationZoneConfg) is 2;
$N_{CS}=25$, when the index (zeroCorrelationZoneConfg) is 3;
$N_{CS}=30$, when the index (zeroCorrelationZoneConfg) is 4;
$N_{CS}=35$, when the index (zeroCorrelationZoneConfg) is 5;
$N_{CS}=44$, when the index (zeroCorrelationZoneConfg) is 6;
$N_{CS}=52$, when the index (zeroCorrelationZoneConfg) is 7;
$N_{CS}=63$, when the index (zeroCorrelationZoneConfg) is 8;
$N_{CS}=82$, when the index (zeroCorrelationZoneConfg) is 9;
$N_{CS}=104$, when the index (zeroCorrelationZoneConfg) is 10;
$N_{CS}=127$, when the index (zeroCorrelationZoneConfg) is 11;
$N_{CS}=164$, when the index (zeroCorrelationZoneConfg) is 12;
$N_{CS}=230$, when the index (zeroCorrelationZoneConfg) is 13;
$N_{CS}=383$, when the index (zeroCorrelationZoneConfg) is 14; and
$N_{CS}=575$, when the index (zeroCorrelationZoneConfg) is 15.

10. The BS of claim 7, wherein when $L_{RA}=571$, the cyclic shift $N_{CS}$ is determined as:
$N_{CS}=0$, when the index (zeroCorrelationZoneConfg) is 0;
$N_{CS}=8$, when the index (zeroCorrelationZoneConfg) is 1;
$N_{CS}=10$, when the index (zeroCorrelationZoneConfg) is 2;
$N_{CS}=12$, when the index (zeroCorrelationZoneConfg) is 3;
$N_{CS}=15$, when the index (zeroCorrelationZoneConfg) is 4;
$N_{CS}=17$, when the index (zeroCorrelationZoneConfg) is 5;
$N_{CS}=21$, when the index (zeroCorrelationZoneConfg) is 6;
$N_{CS}=25$, when the index (zeroCorrelationZoneConfg) is 7;
$N_{CS}=31$, when the index (zeroCorrelationZoneConfg) is 8;
$N_{CS}=40$, when the index (zeroCorrelationZoneConfg) is 9;
$N_{CS}=51$, when the index (zeroCorrelationZoneConfg) is 10;
$N_{CS}=63$, when the index (zeroCorrelationZoneConfg) is 11;
$N_{CS}=81$, when the index (zeroCorrelationZoneConfg) is 12;
$N_{CS}=114$, when the index (zeroCorrelationZoneConfg) is 13;
$N_{CS}=190$, when the index (zeroCorrelationZoneConfg) is 14; and
$N_{CS}=285$, when the index (zeroCorrelationZoneConfg) is 15.

11. The BS of claim 7, wherein the set of higher layer parameters further includes information to configure a gap for performing listen-before-talk (LBT) process before the transmission of the PRACH preamble.

12. The BS of claim 11, wherein the gap for performing LBT process is determined as a RACH occasion with an even index, and the transmission of the PRACH preamble is transmitted in a next RACH occasion with an odd index.

13. A method of a user equipment (UE) in a wireless communication system supporting a shared spectrum channel access, the method comprising:
receiving, from a base station (BS), a set of higher layer parameters including a subcarrier spacing of a physical random access channel (PRACH) preamble, a logical root index ($i_{log}$) for the PRACH preamble, and an index (zeroCorrelationZoneConfg);
determining a sequence length ($L_{RA}$) for the PRACH preamble based on the subcarrier spacing of the PRACH preamble;
determining a physical root index ($i_{phy}$) for the PRACH preamble based on the logical root index ($i_{log}$) as $i_{phy}=i+1$ for the logical root index $i_{log}=2\cdot i$ and as $i_{phy}=L_{RA}-i-1$ for the logical root index $i_{log}=2\cdot i+1$, where $0 \ge i \ge (L_{RA}-1)/2-1$;
determining a cyclic shift ($N_{CS}$) for the PRACH preamble based on the index (zeroCorrelationZoneConfg);
generating the PRACH preamble based on the determined sequence length $L_{RA}$, the determined physical root index $i_{phy}$, and the determined cyclic shift $N_{CS}$; and transmitting, to the base station (BS) over the shared spectrum channel, the PRACH preamble.

14. The method of claim 13, wherein:
the sequence length ($L_{RA}$) is set to 1151 when the subcarrier spacing of the PRACH preamble is 15 kHz; and
the sequence length ($L_{RA}$) is set to 571 when the subcarrier spacing of the PRACH preamble is 30 kHz.

15. The method of claim 13, wherein when the $L_{RA}$=1171, the cyclic shift ($N_{CS}$) is determined as:
$N_{CS}$=0, when the index (zeroCorrelationZoneConfg) is 0;
$N_{CS}$=17, when the index (zeroCorrelationZoneConfg) is 1;
$N_{CS}$=20, when the index (zeroCorrelationZoneConfg) is 2;
$N_{CS}$=25, when the index (zeroCorrelationZoneConfg) is 3;
$N_{CS}$=30, when the index (zeroCorrelationZoneConfg) is 4;
$N_{CS}$=35, when the index (zeroCorrelationZoneConfg) is 5;
$N_{CS}$=44, when the index (zeroCorrelationZoneConfg) is 6;
$N_{CS}$=52, when the index (zeroCorrelationZoneConfg) is 7;
$N_{CS}$=63, when the index (zeroCorrelationZoneConfg) is 8;
$N_{CS}$=82, when the index (zeroCorrelationZoneConfg) is 9;
$N_{CS}$=104, when the index (zeroCorrelationZoneConfg) is 10;
$N_{CS}$=127, when the index (zeroCorrelationZoneConfg) is 11;
$N_{CS}$=164, when the index (zeroCorrelationZoneConfg) is 12;
$N_{CS}$=230, when the index (zeroCorrelationZoneConfg) is 13;
$N_{CS}$=383, when the index (zeroCorrelationZoneConfg) is 14; and
$N_{CS}$=575, when the index (zeroCorrelationZoneConfg) is 15.

16. The method of claim 13, wherein when $L_{RA}$=571, the cyclic shift $N_{CS}$ is determined as:
$N_{CS}$=0, when the index (zeroCorrelationZoneConfg) is 0;
$N_{CS}$=8, when the index (zeroCorrelationZoneConfg) is 1;
$N_{CS}$=10, when the index (zeroCorrelationZoneConfg) is 2;
$N_{CS}$=12, when the index (zeroCorrelationZoneConfg) is 3;
$N_{CS}$=15, when the index (zeroCorrelationZoneConfg) is 4;
$N_{CS}$=17, when the index (zeroCorrelationZoneConfg) is 5;
$N_{CS}$=21, when the index (zeroCorrelationZoneConfg) is 6;
$N_{CS}$=25, when the index (zeroCorrelationZoneConfg) is 7;
$N_{CS}$=31, when the index (zeroCorrelationZoneConfg) is 8;
$N_{CS}$=40, when the index (zeroCorrelationZoneConfg) is 9;
$N_{CS}$=51, when the index (zeroCorrelationZoneConfg) is 10;
$N_{CS}$=63, when the index (zeroCorrelationZoneConfg) is 11;
$N_{CS}$=81, when the index (zeroCorrelationZoneConfg) is 12;
$N_{CS}$=114, when the index (zeroCorrelationZoneConfg) is 13;
$N_{CS}$=190, when the index (zeroCorrelationZoneConfg) is 14; and
$N_{CS}$=285, when the index (zeroCorrelationZoneConfg) is 15.

17. The method of claim 13, wherein:
the set of higher layer parameters further includes information to configure a gap for performing listen-before-talk (LBT) process before the transmission of the PRACH preamble; and
the gap for performing LBT process is determined as a RACH occasion with an even index, and the transmission of the PRACH preamble is transmitted in a next RACH occasion with an odd index.

* * * * *